Nov. 15, 1966  H. J. CHALL ETAL  3,285,510
DIVISION CONTROL FOR CALCULATING MACHINE
Filed May 22, 1964  35 Sheets-Sheet 30

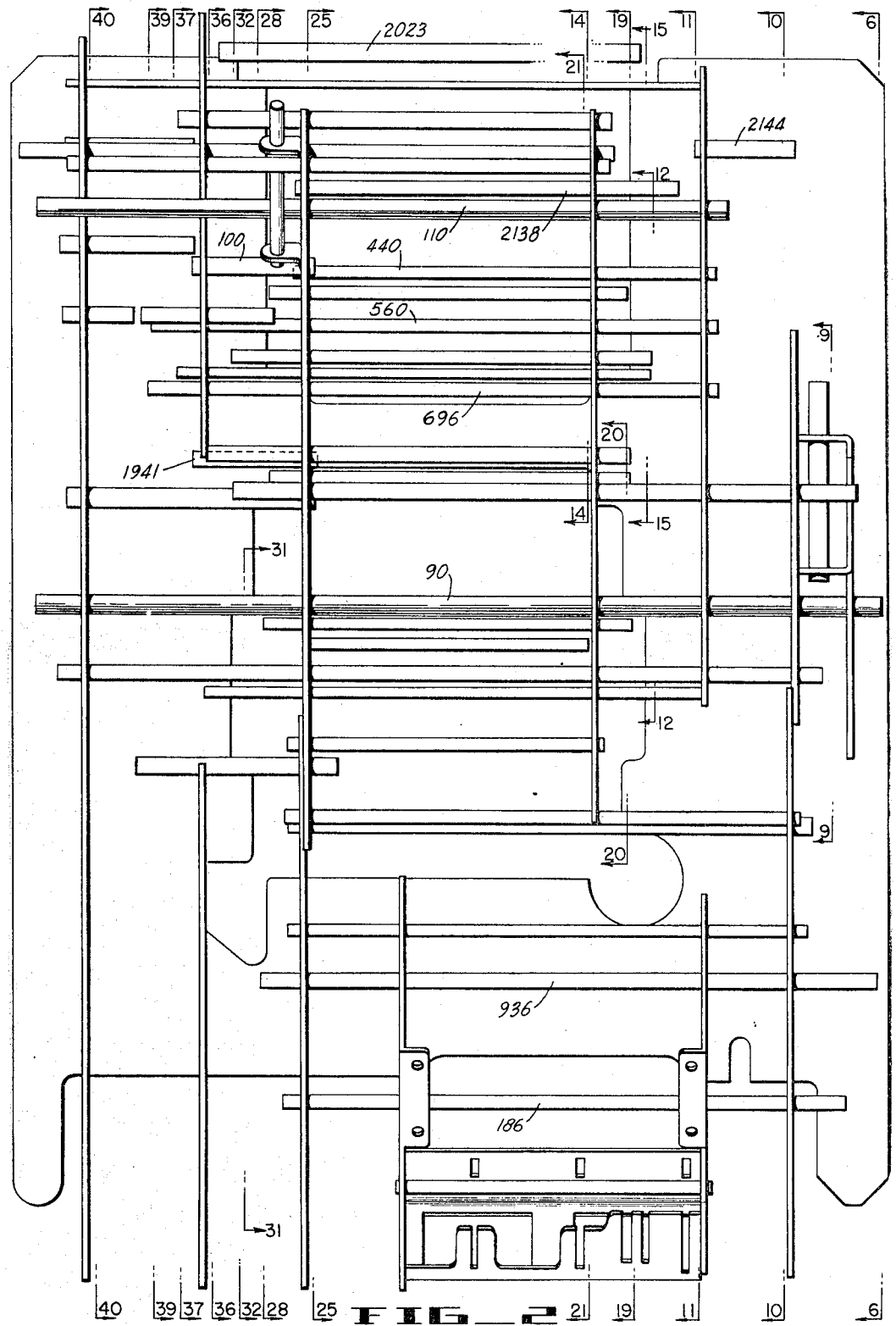

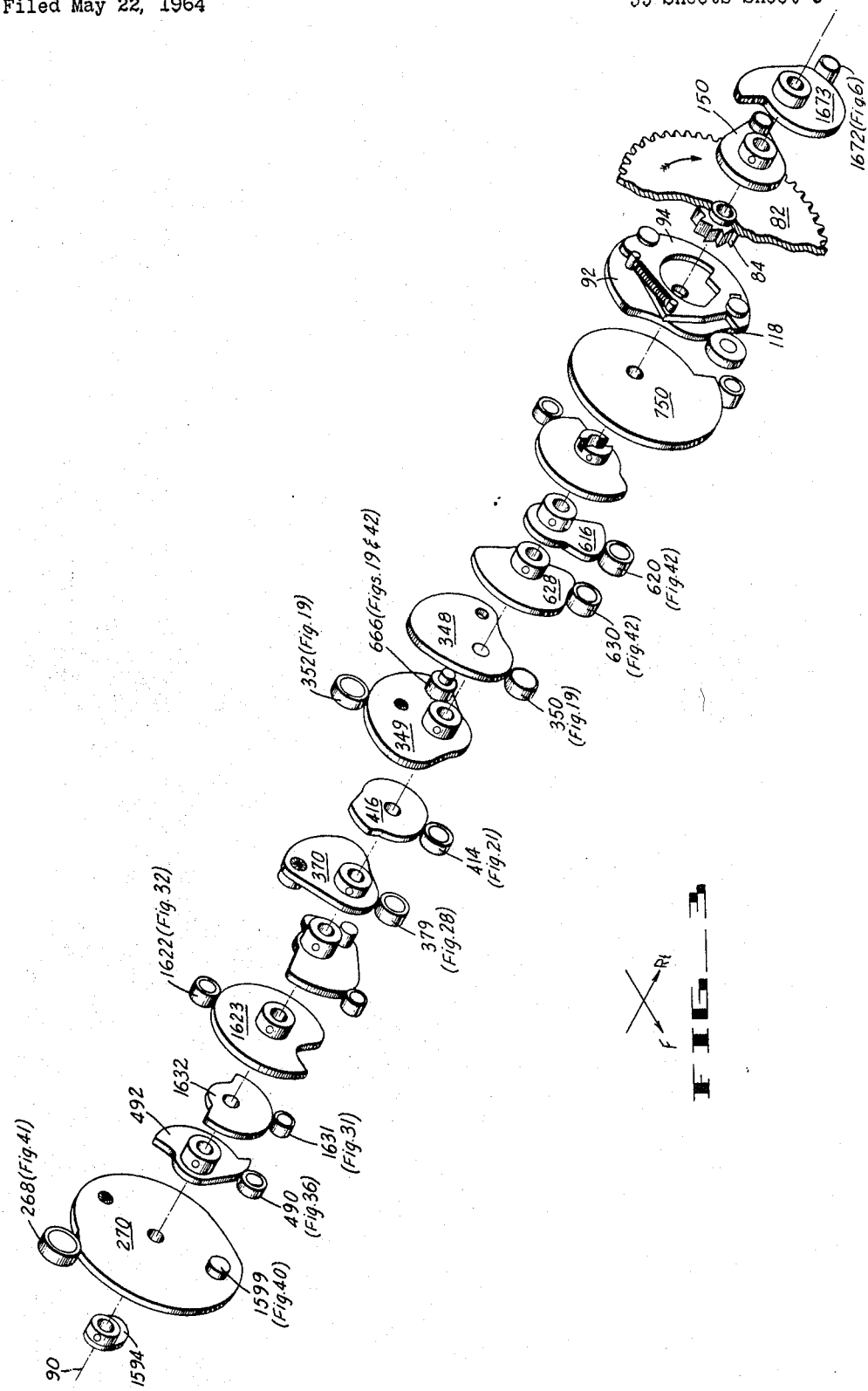

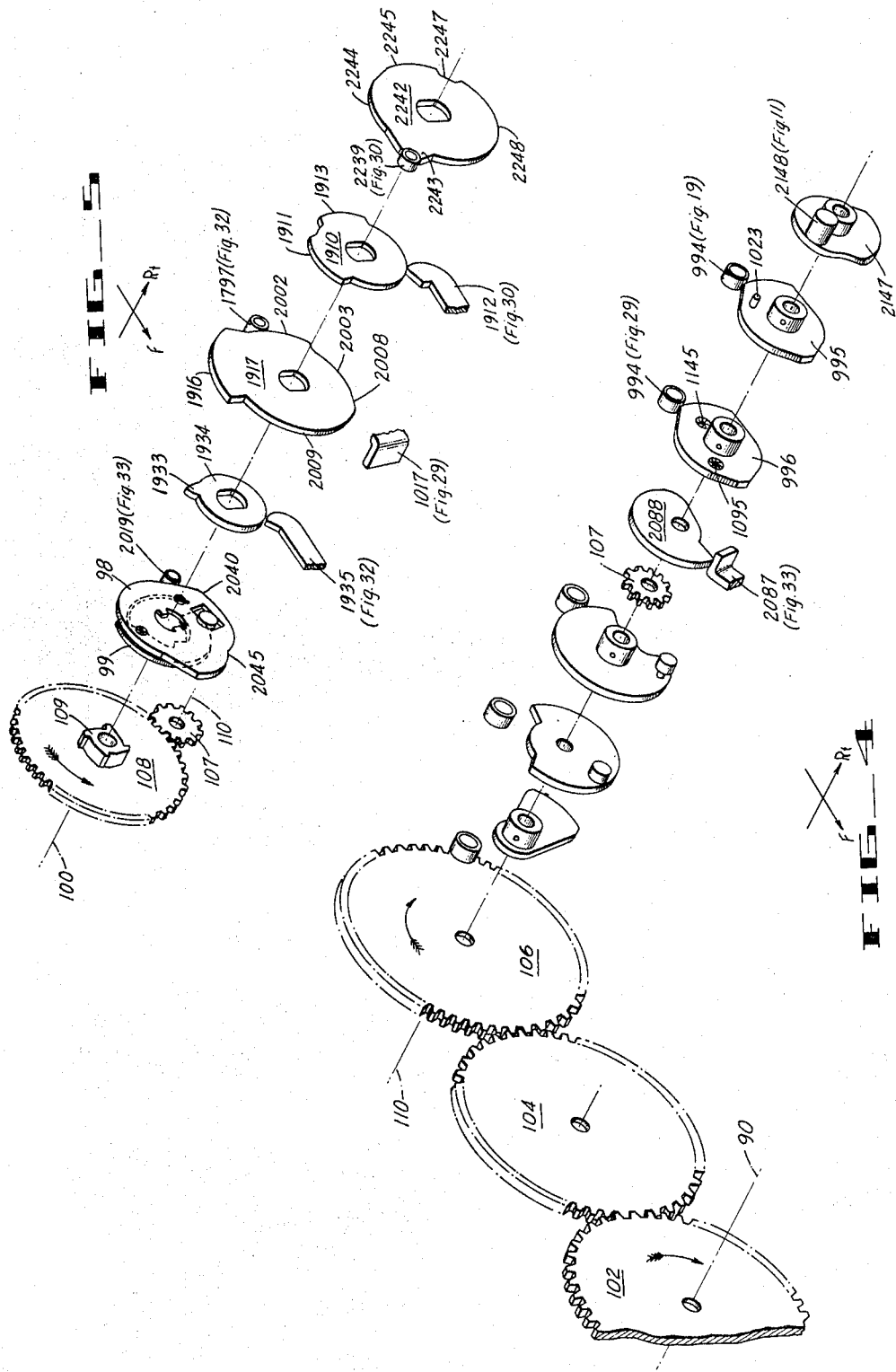

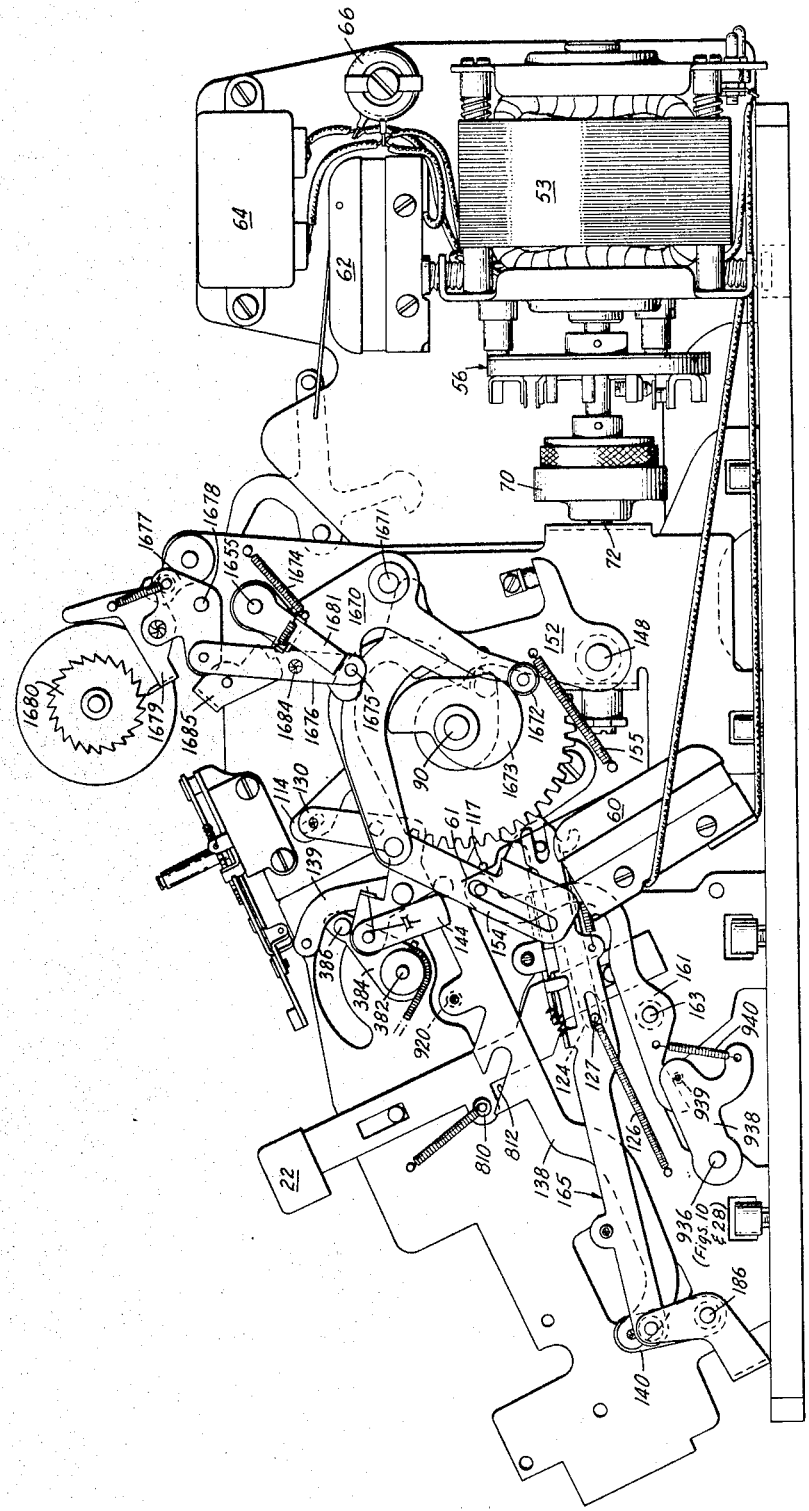

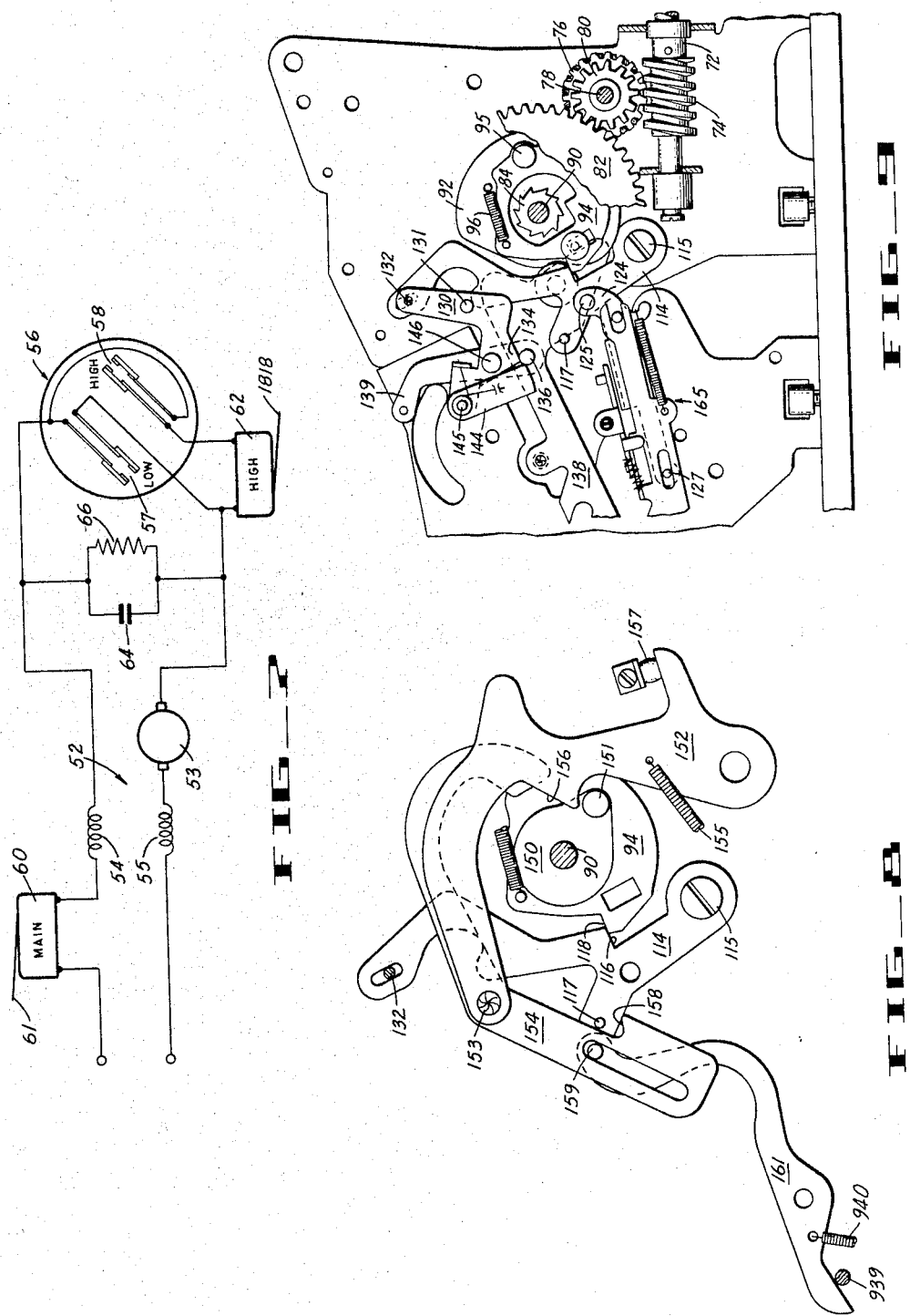

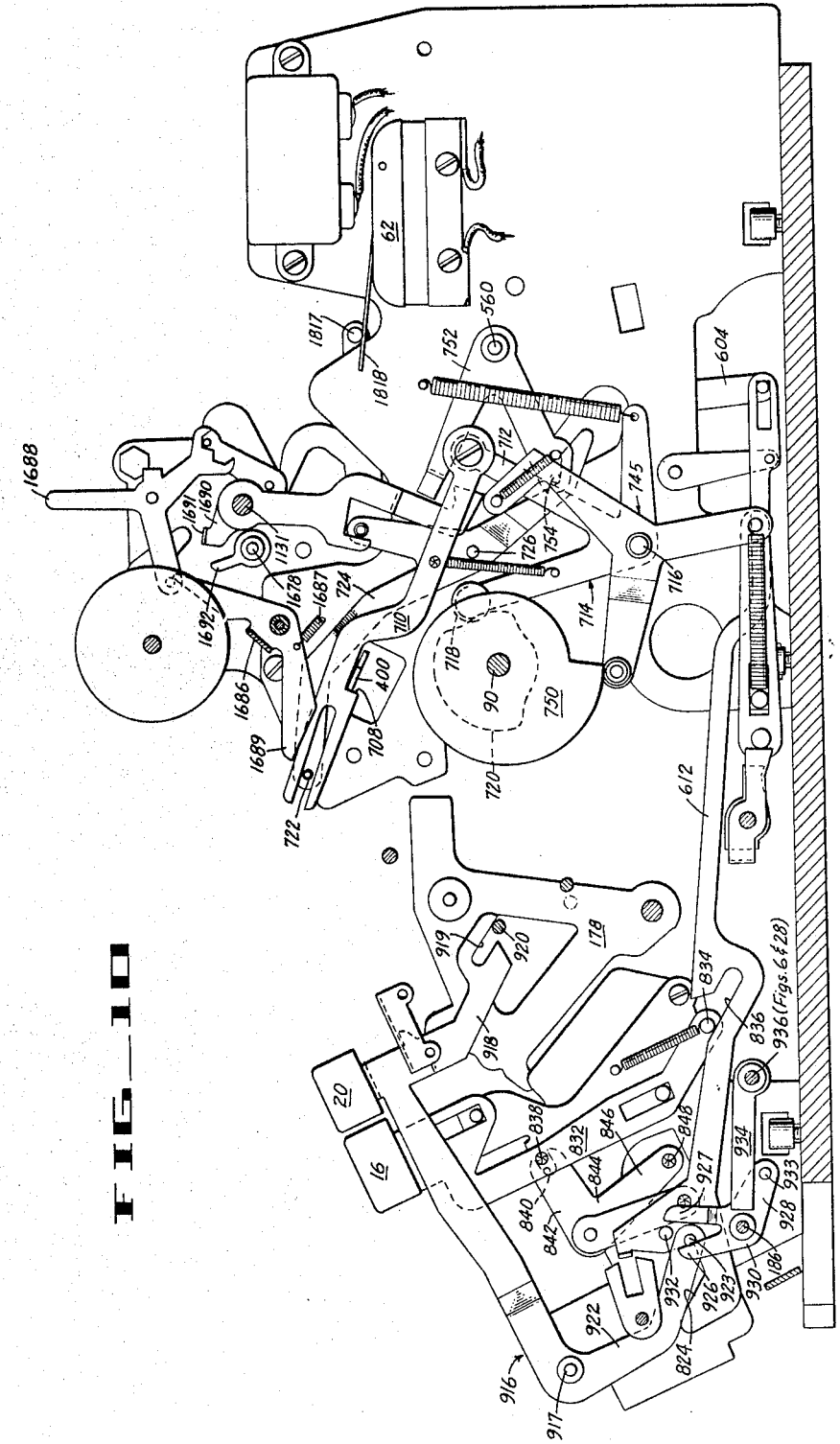
FIG_10

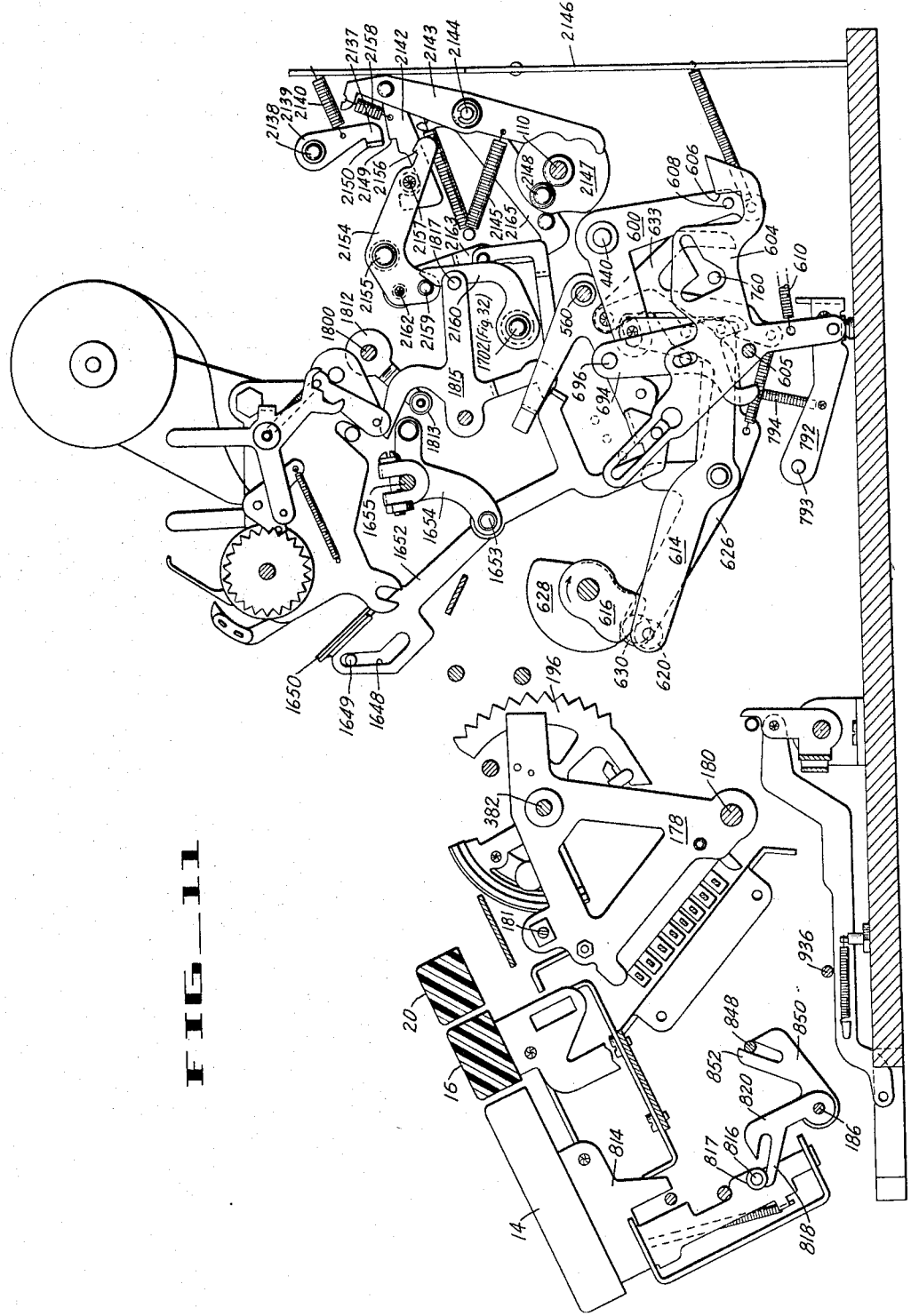
FIG_11

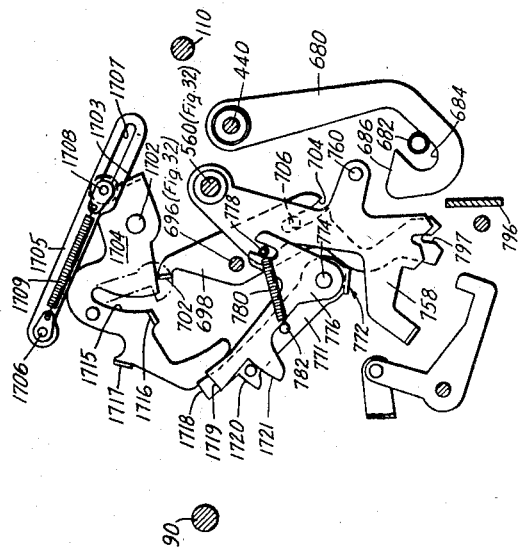
FIG_12
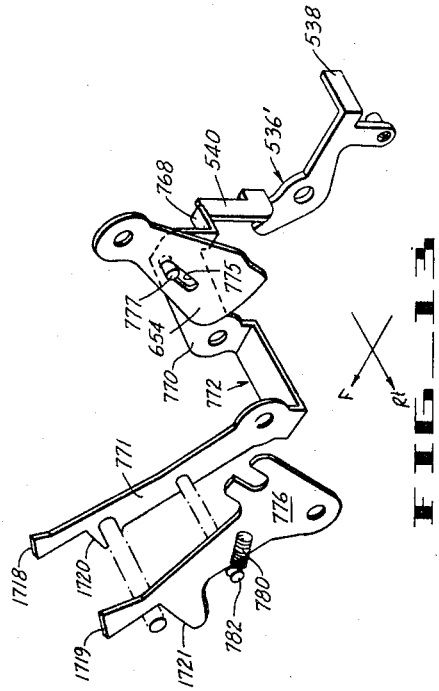
FIG_13
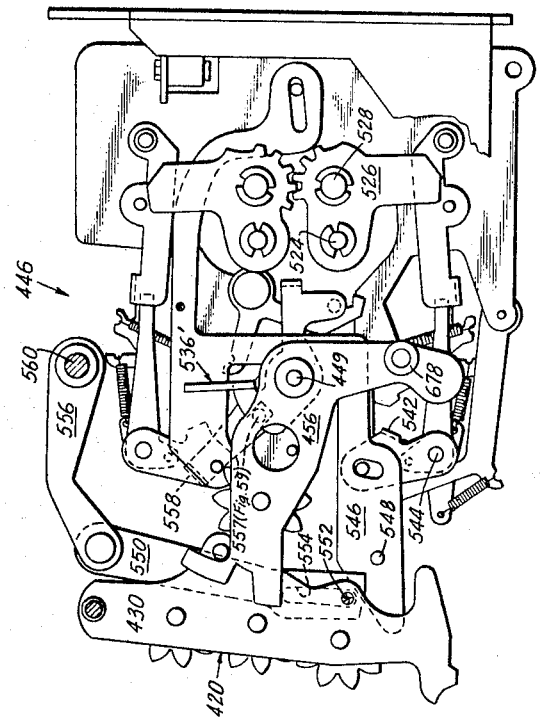
FIG_14

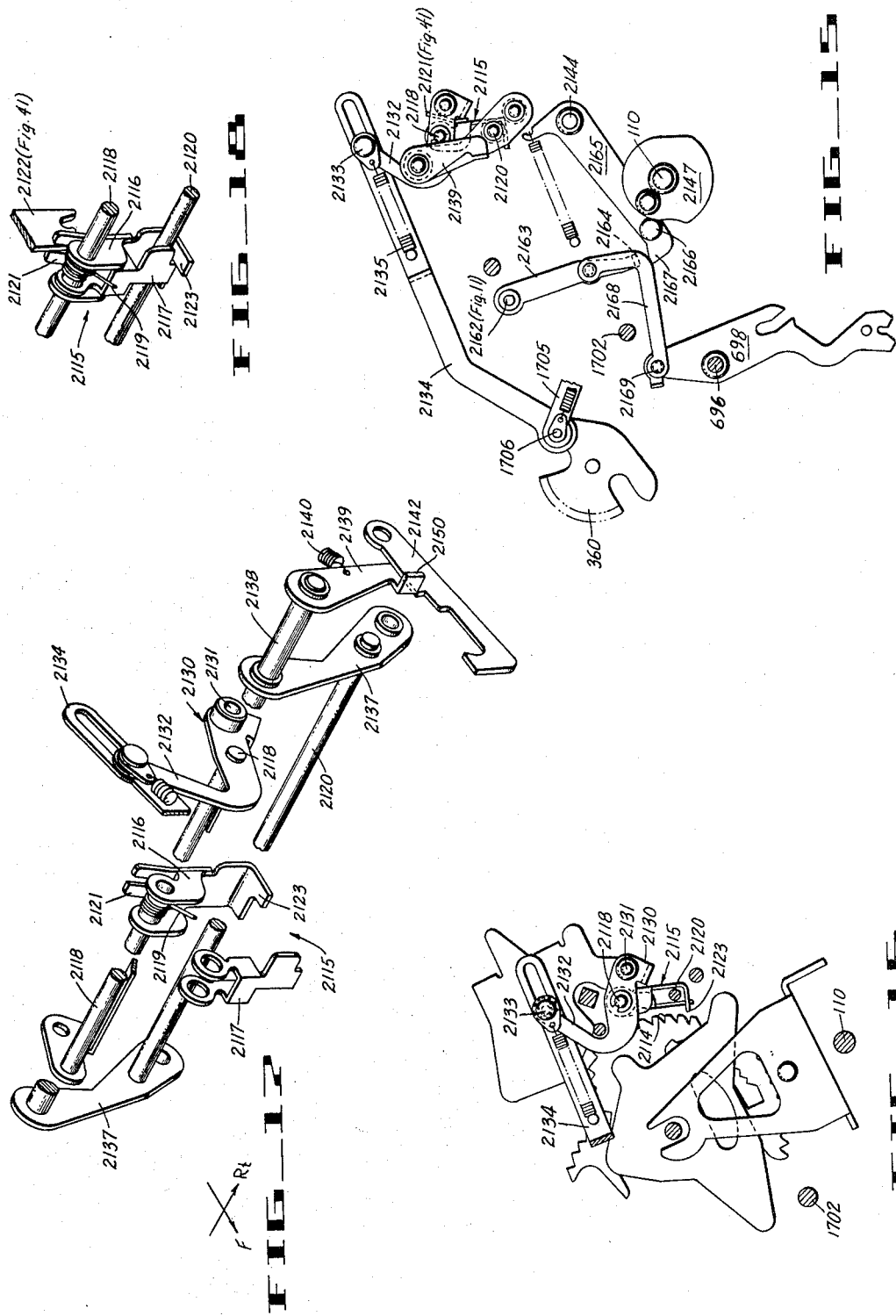

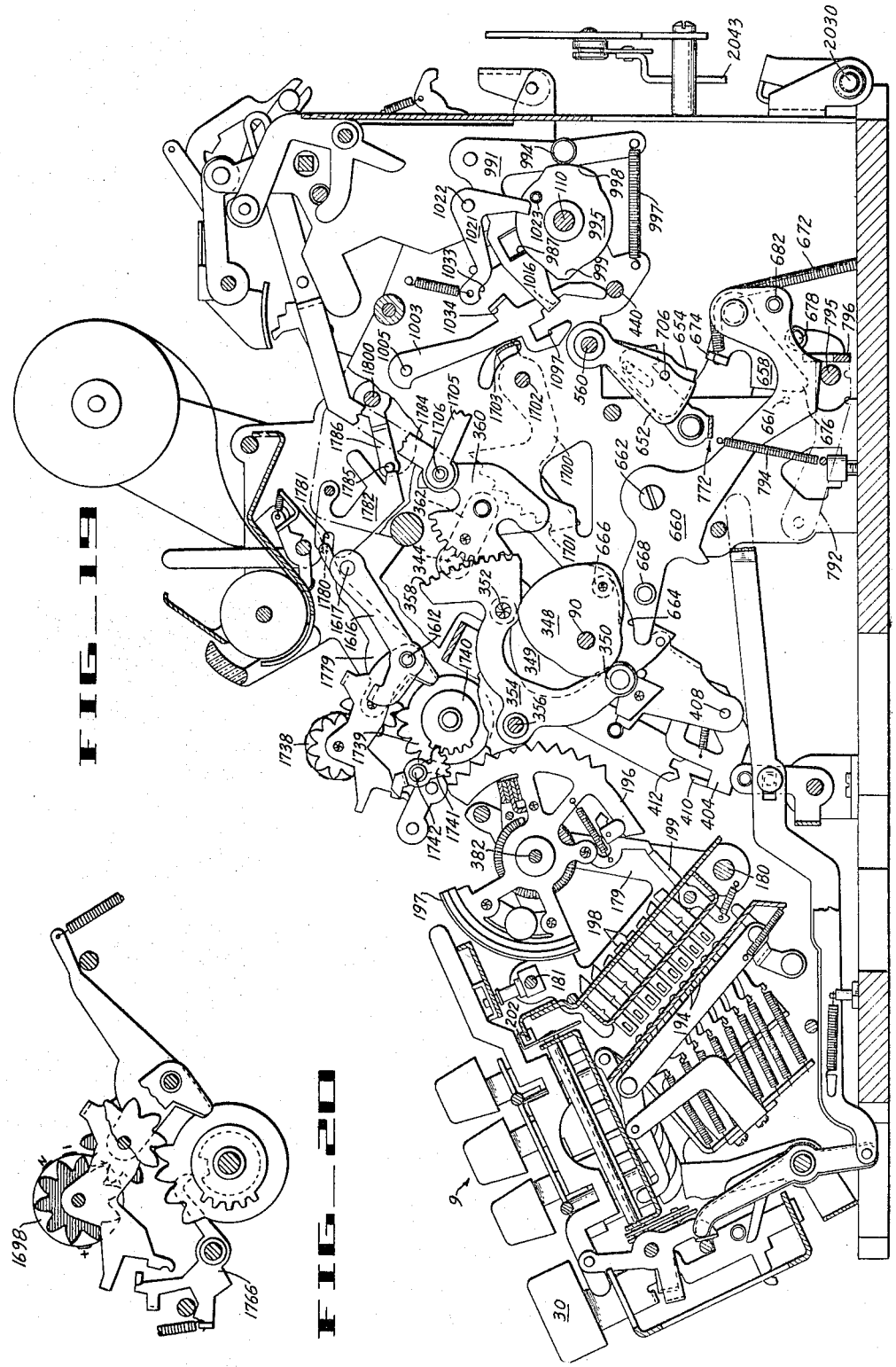

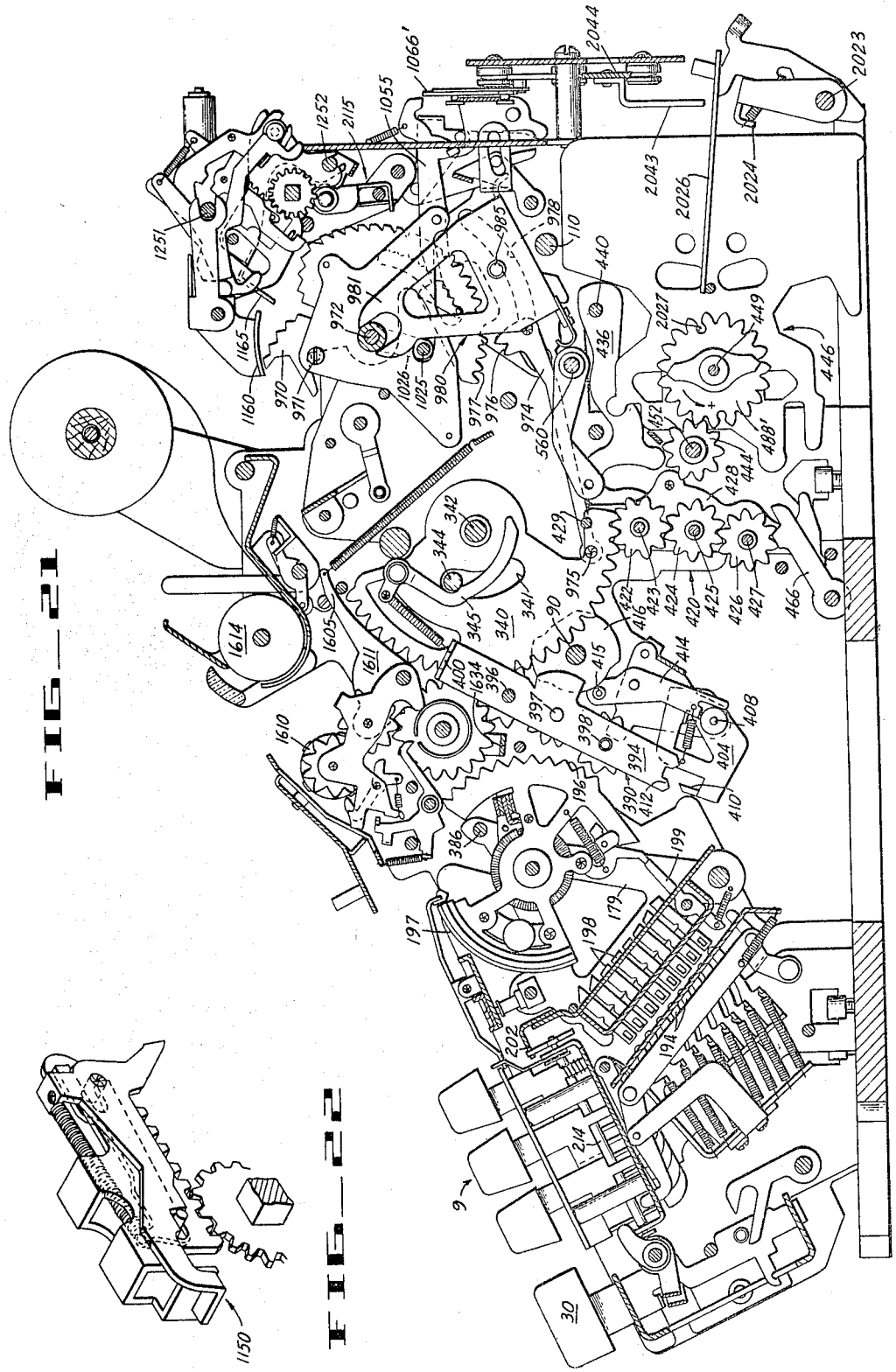

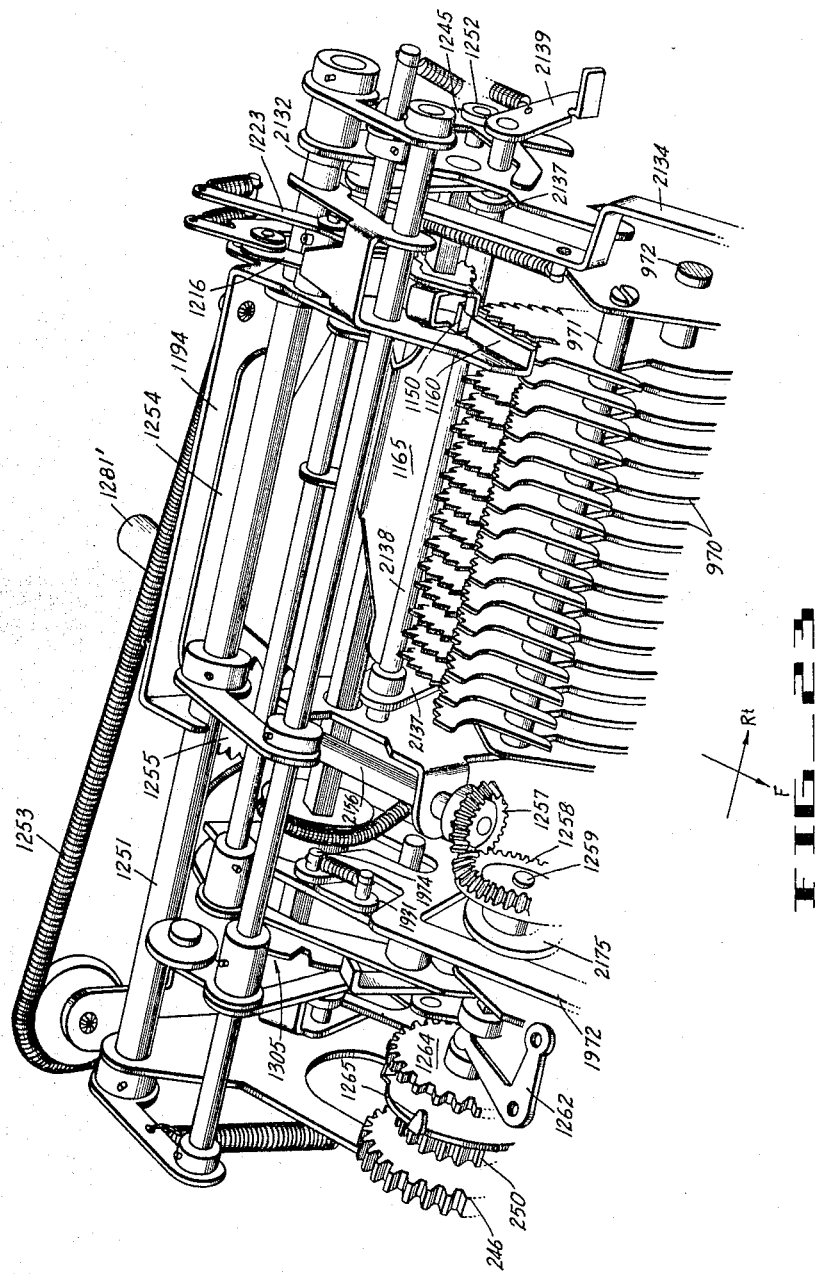

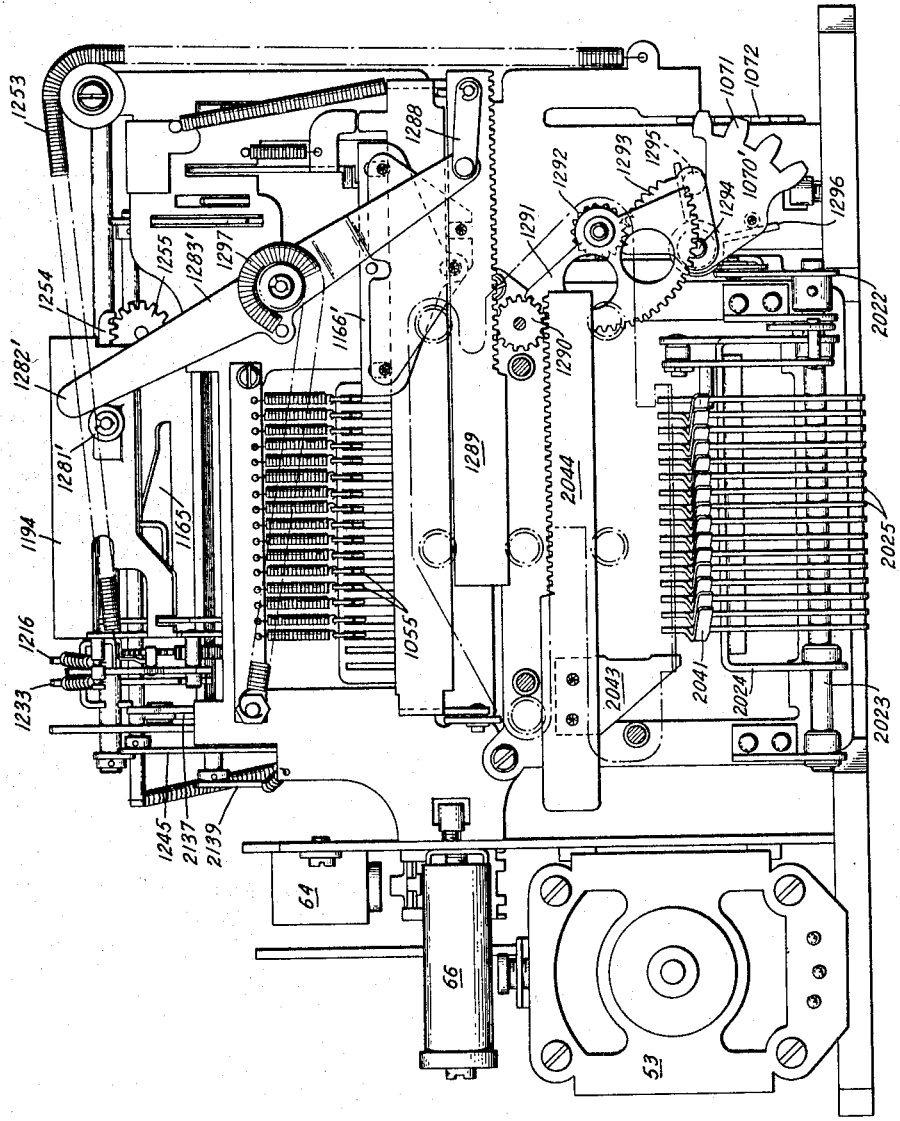

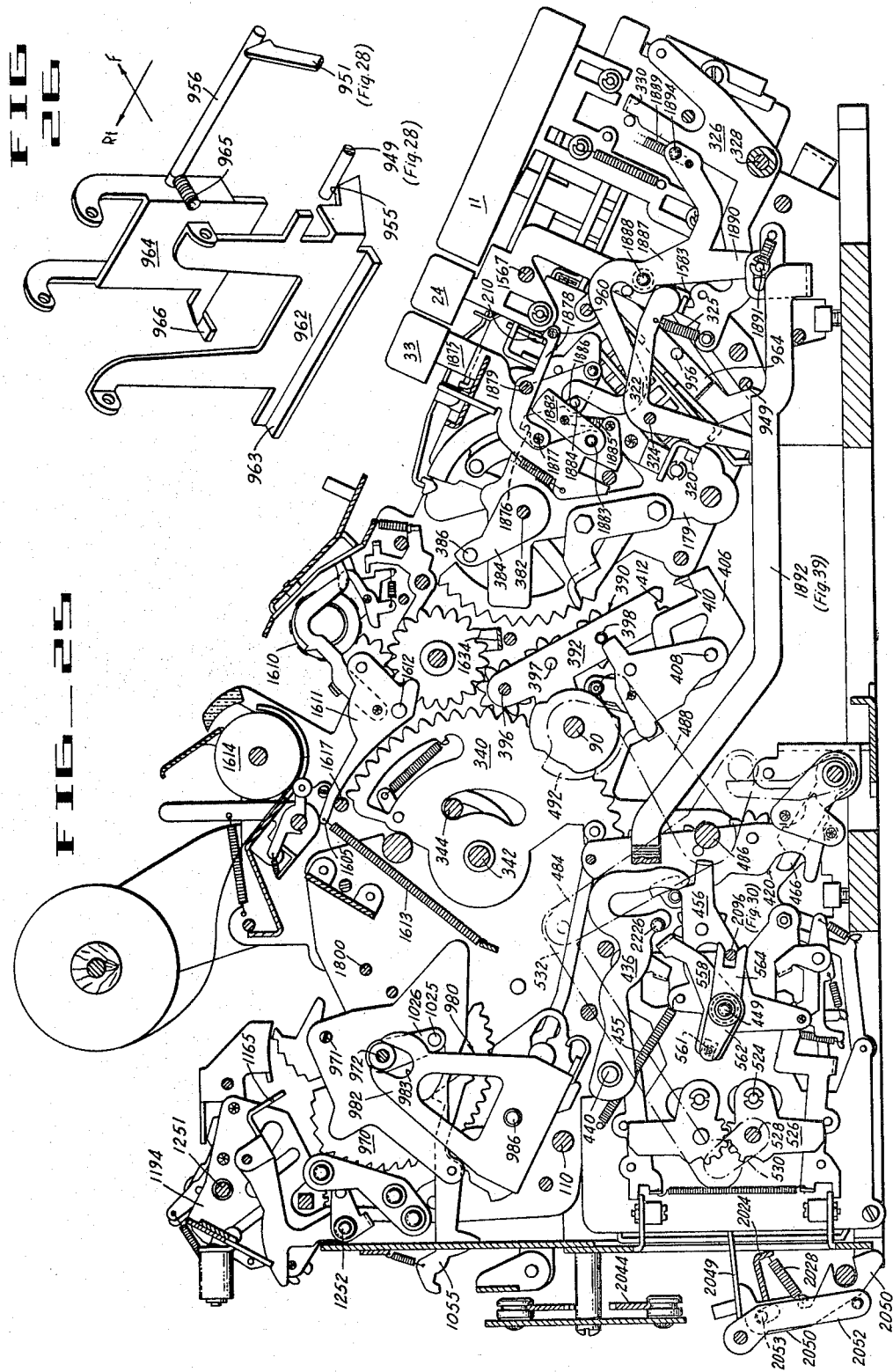

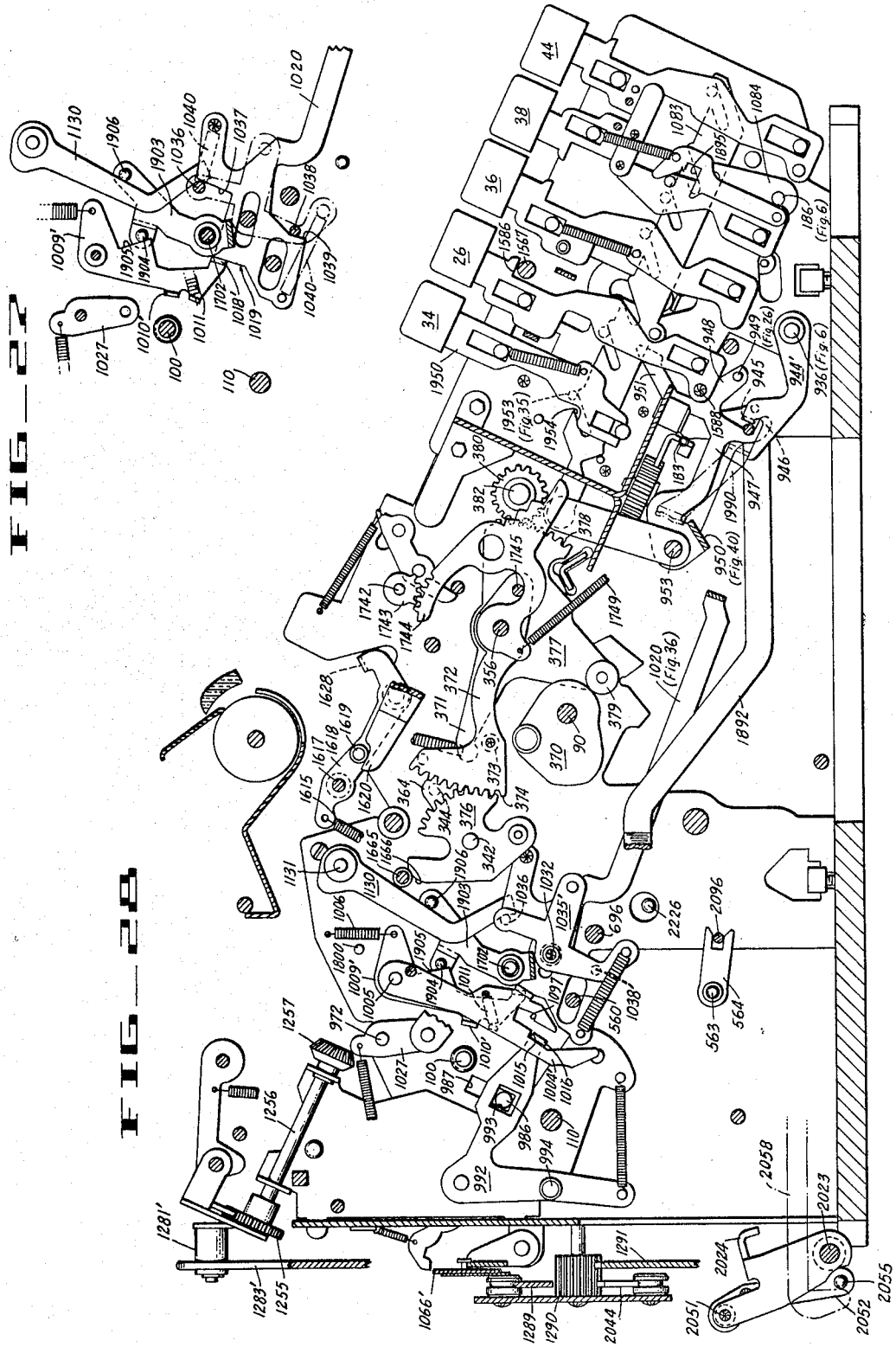

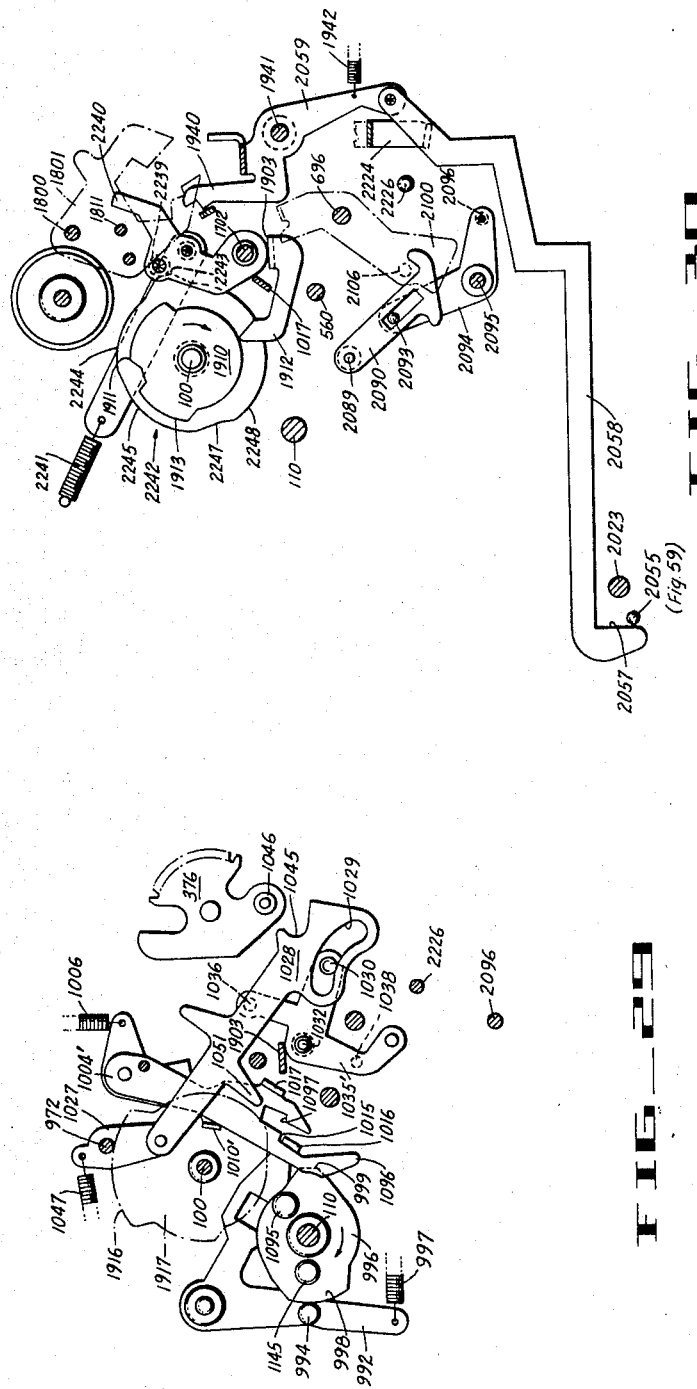

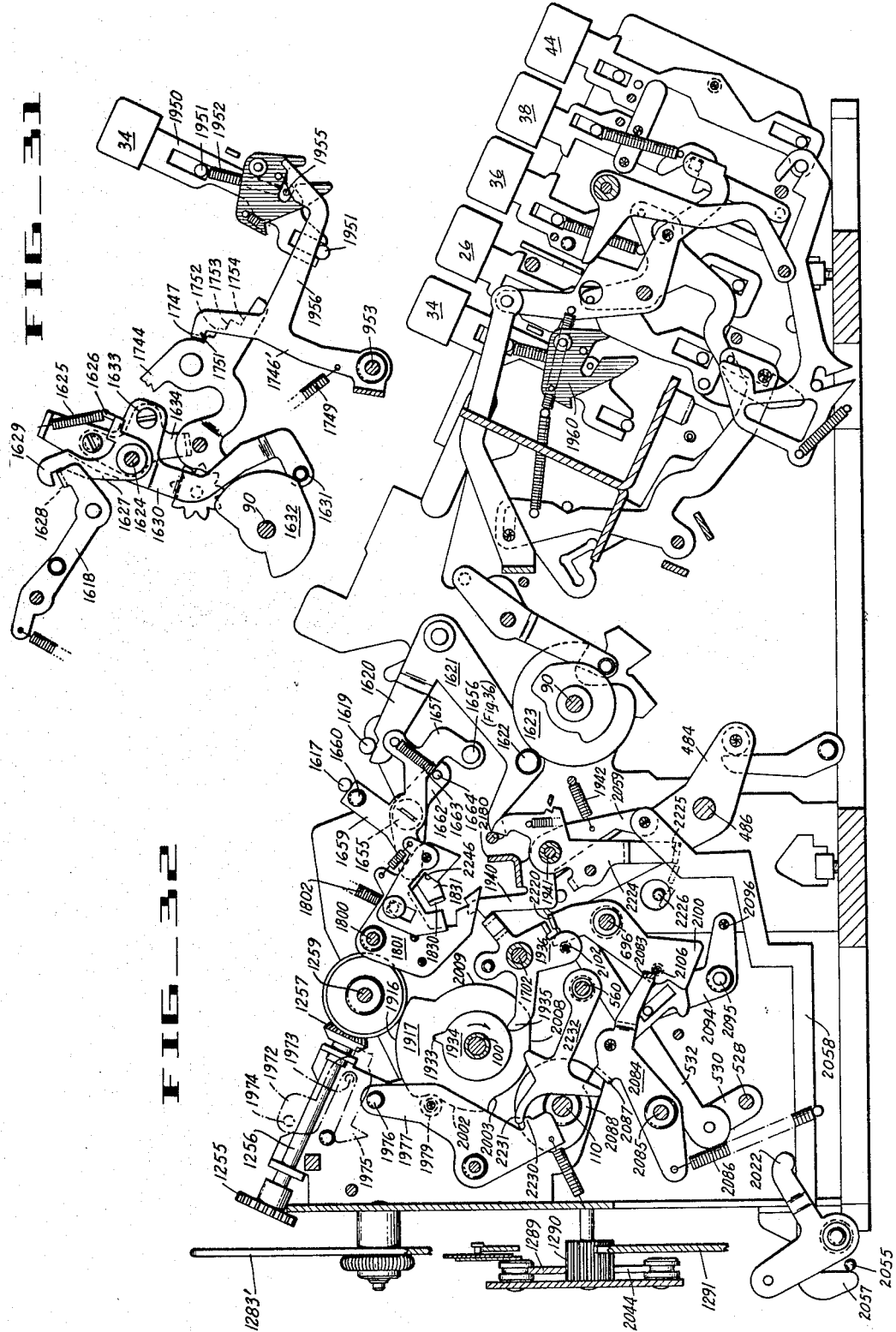

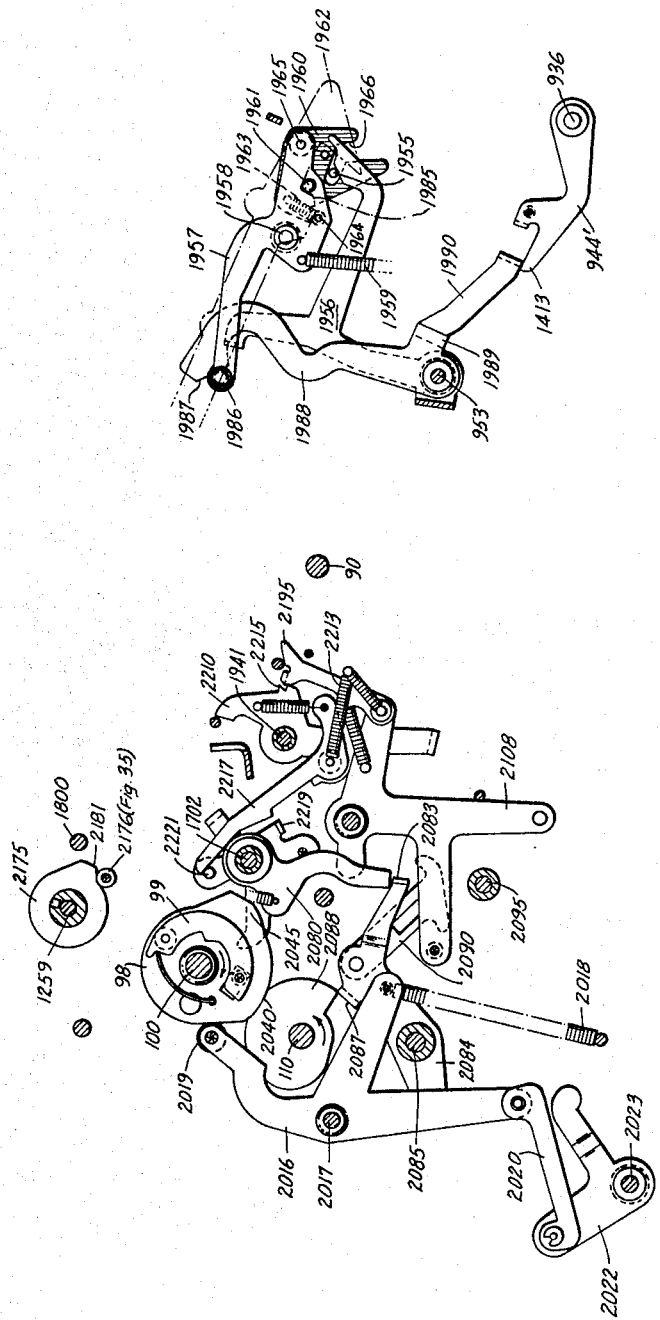

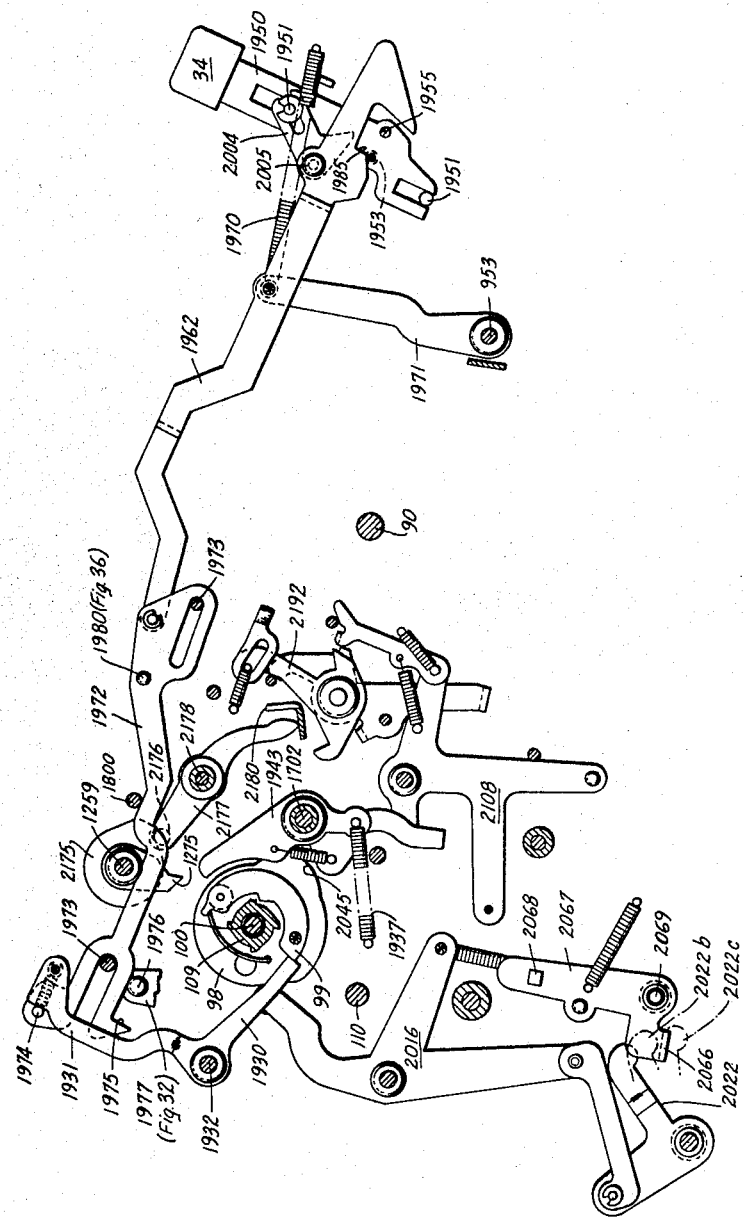

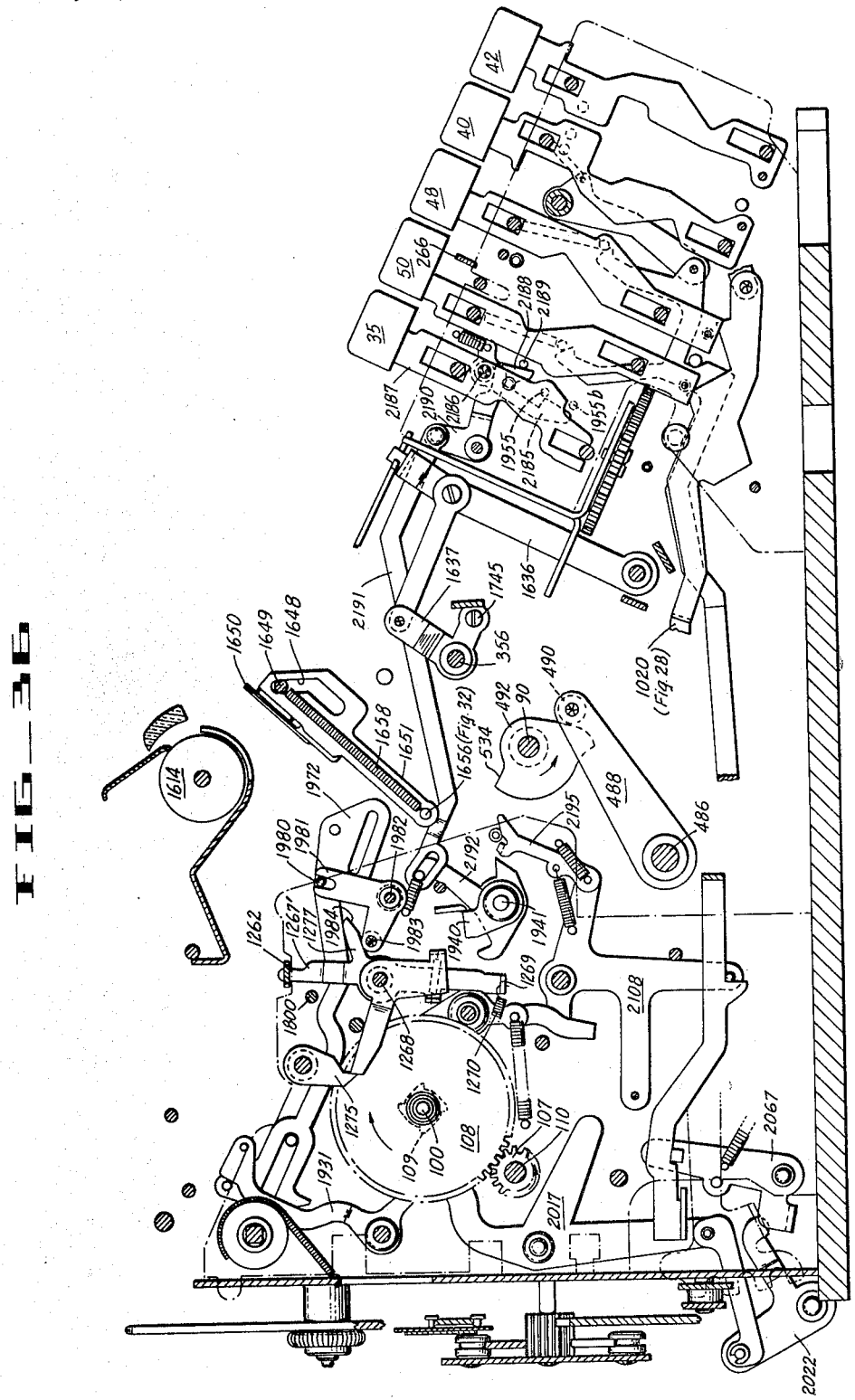
FIG_36

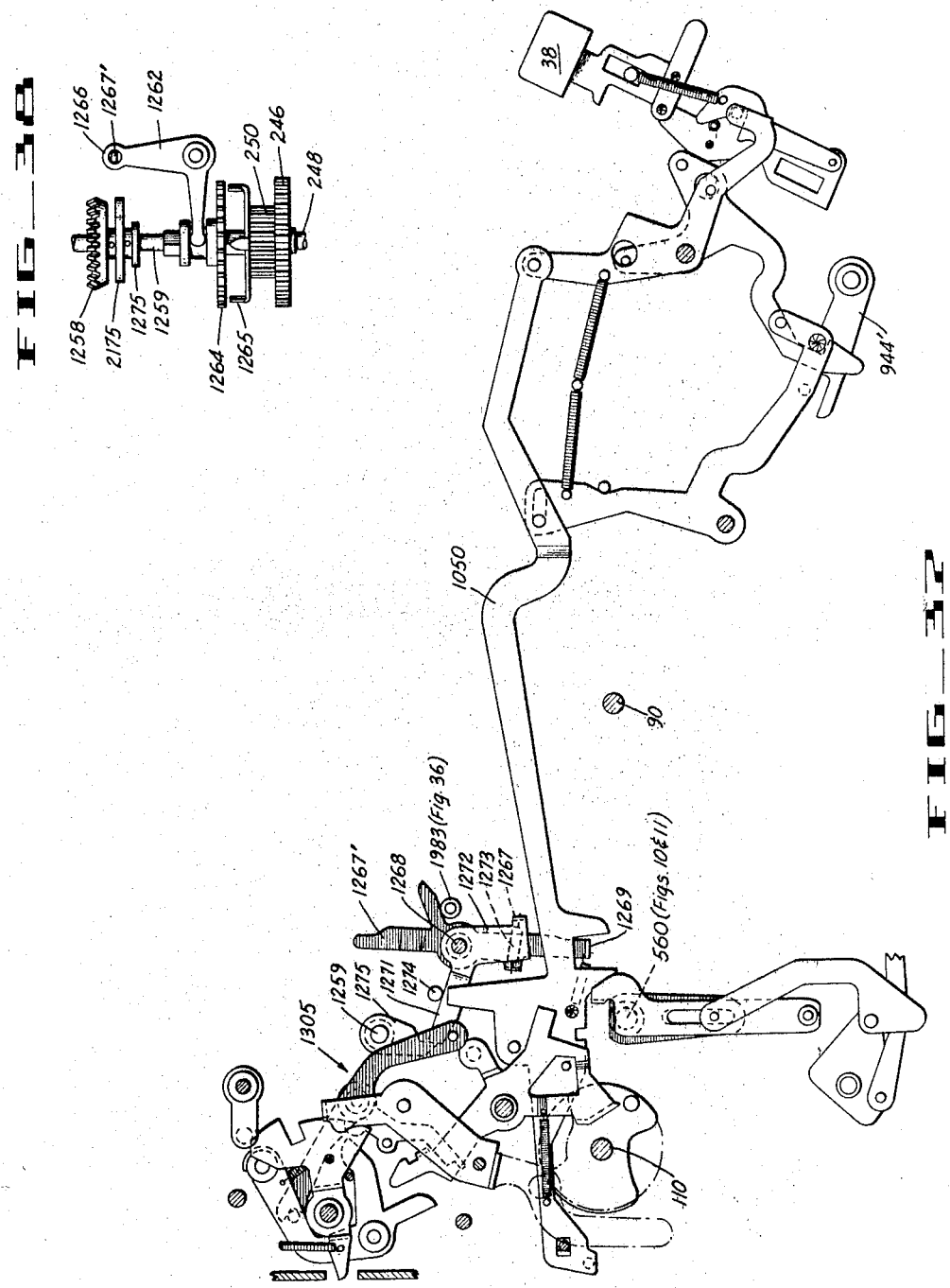

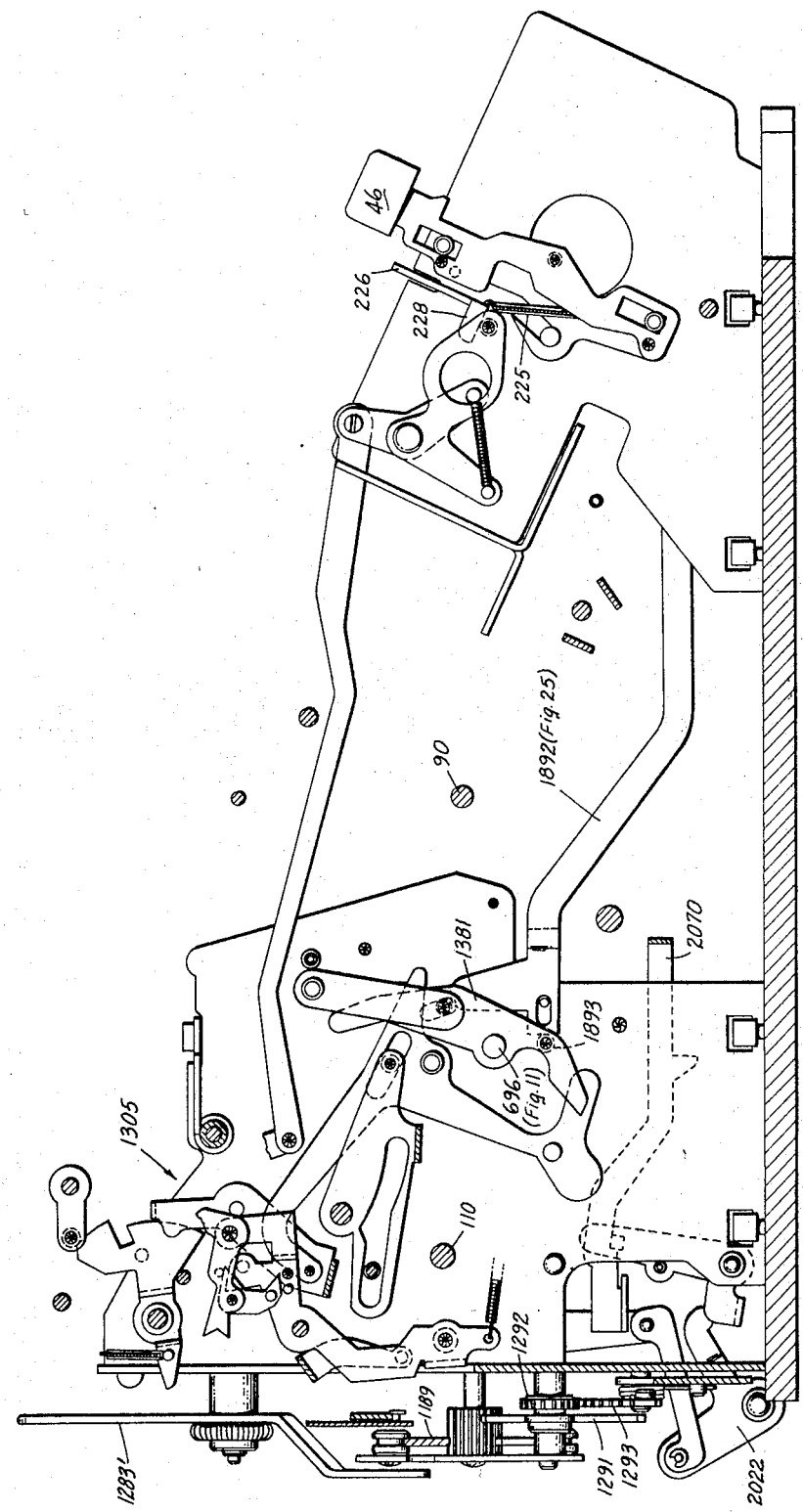

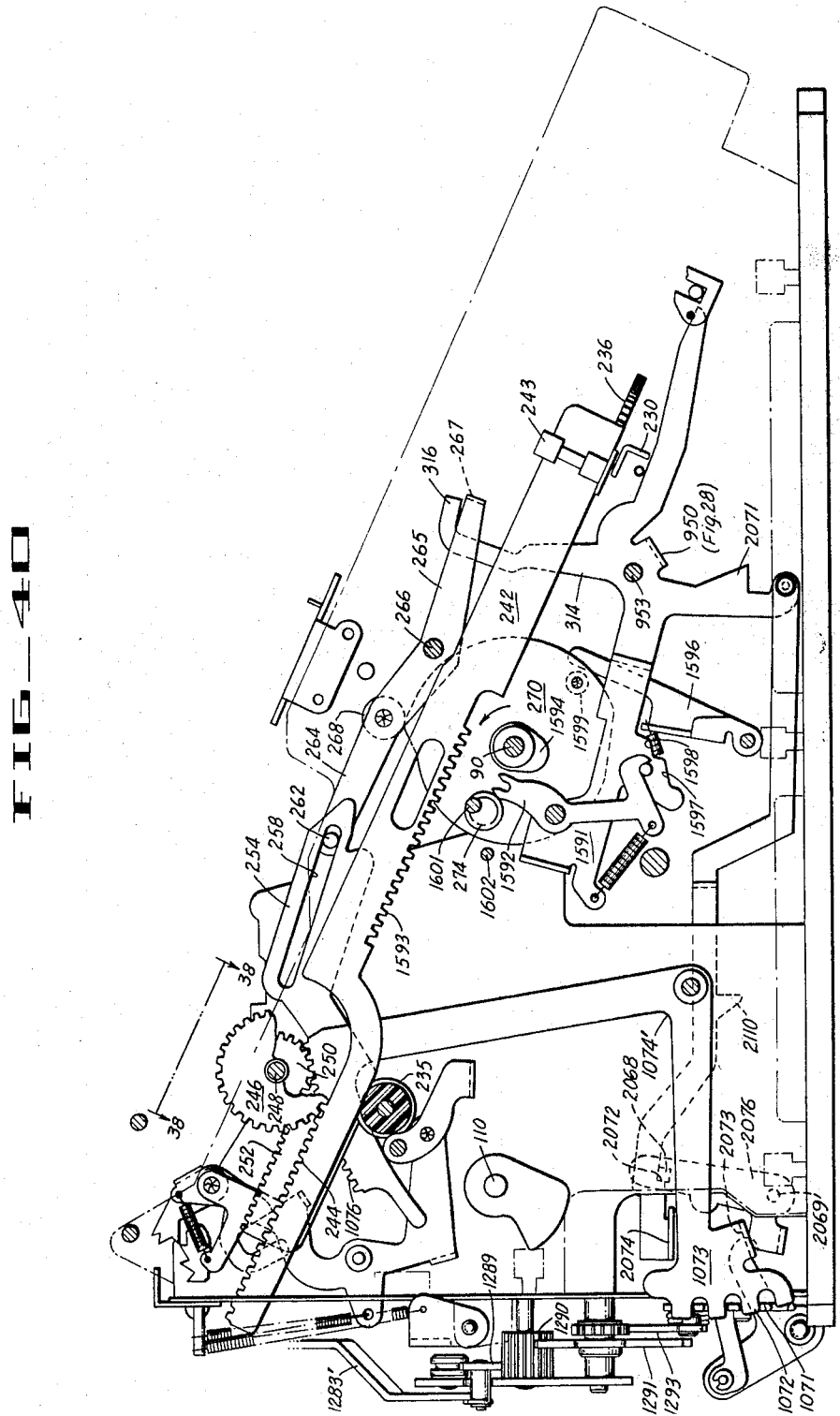

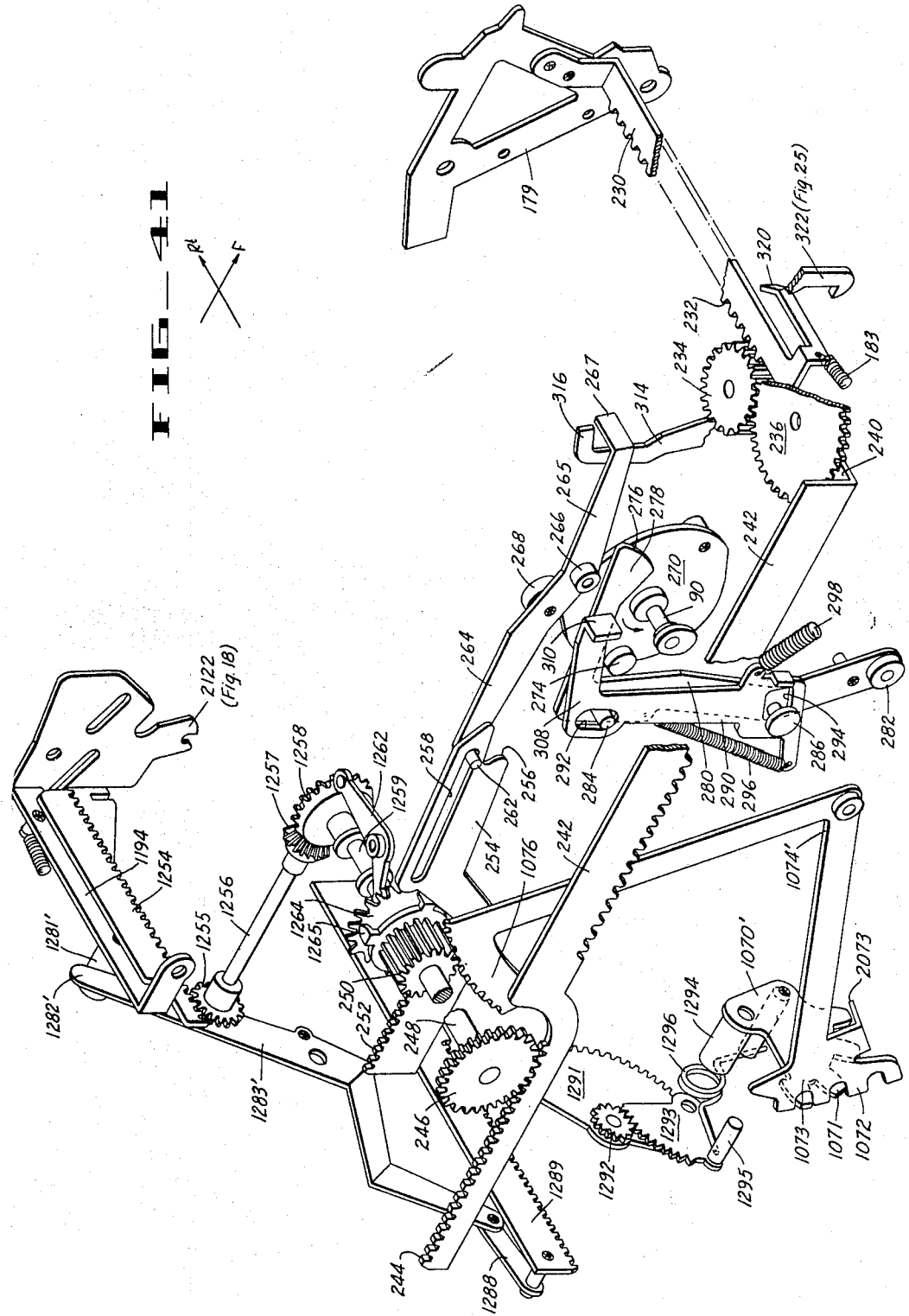

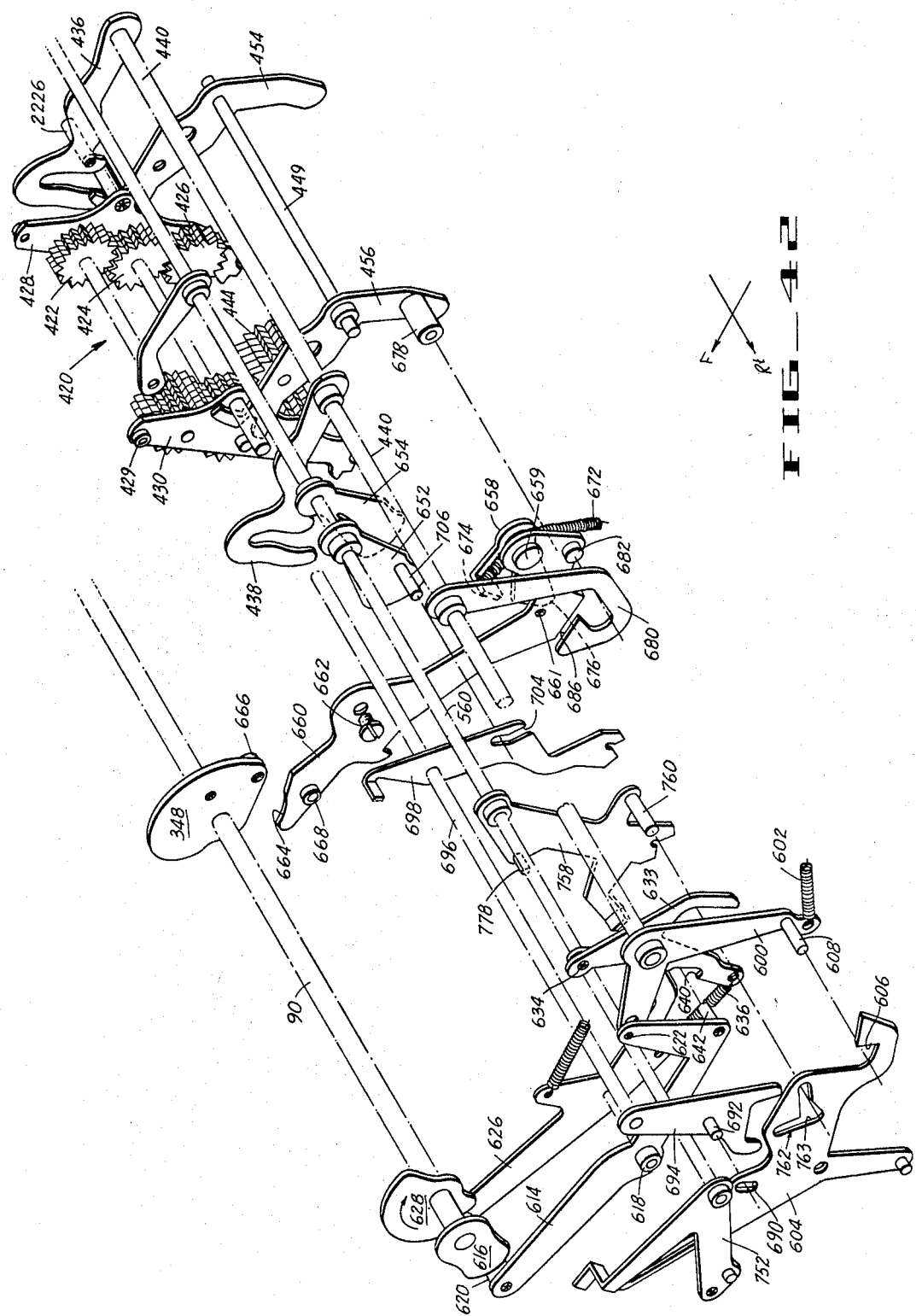

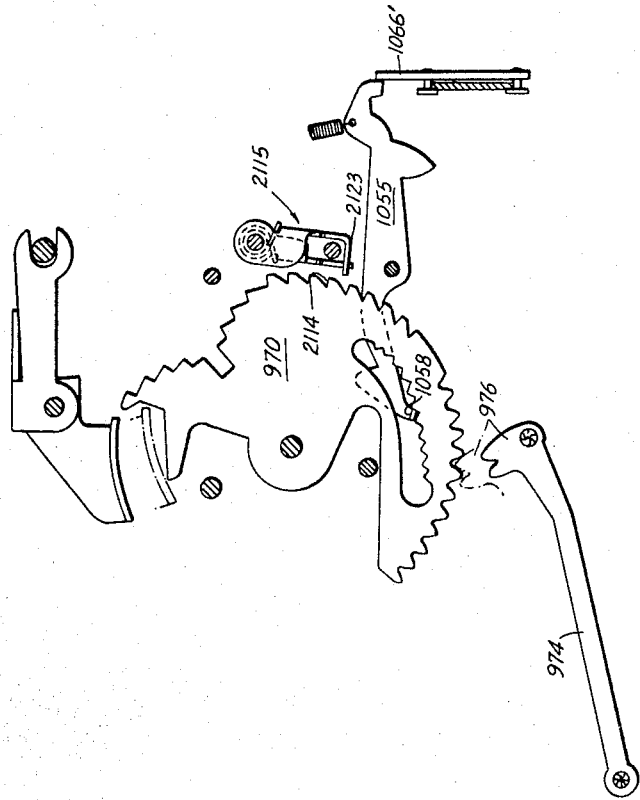
FIG_44
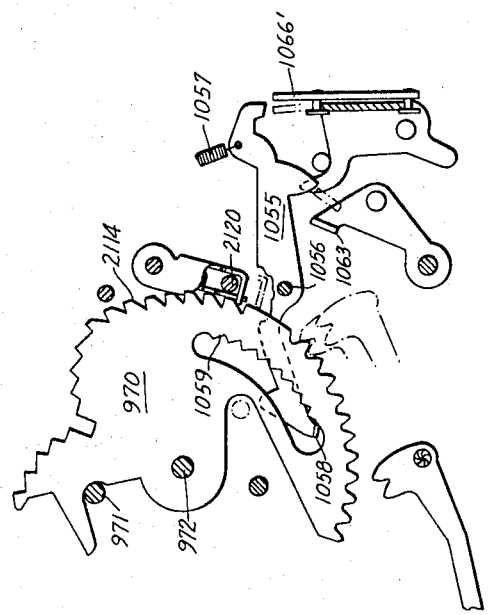
FIG_43

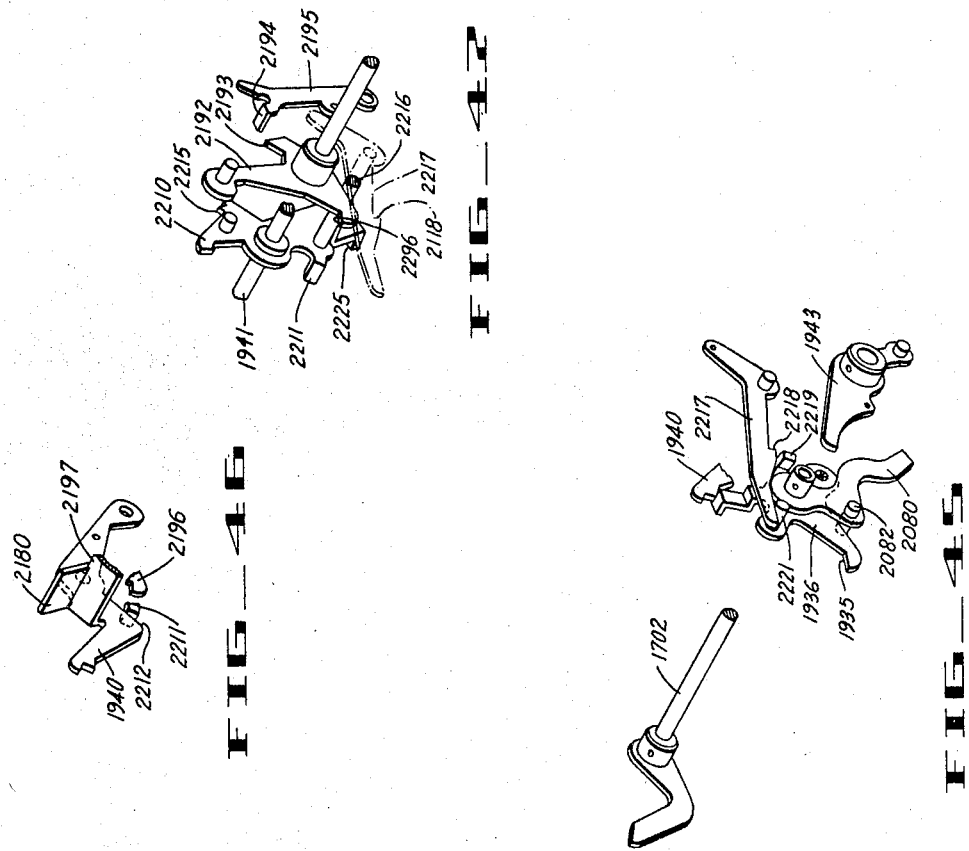

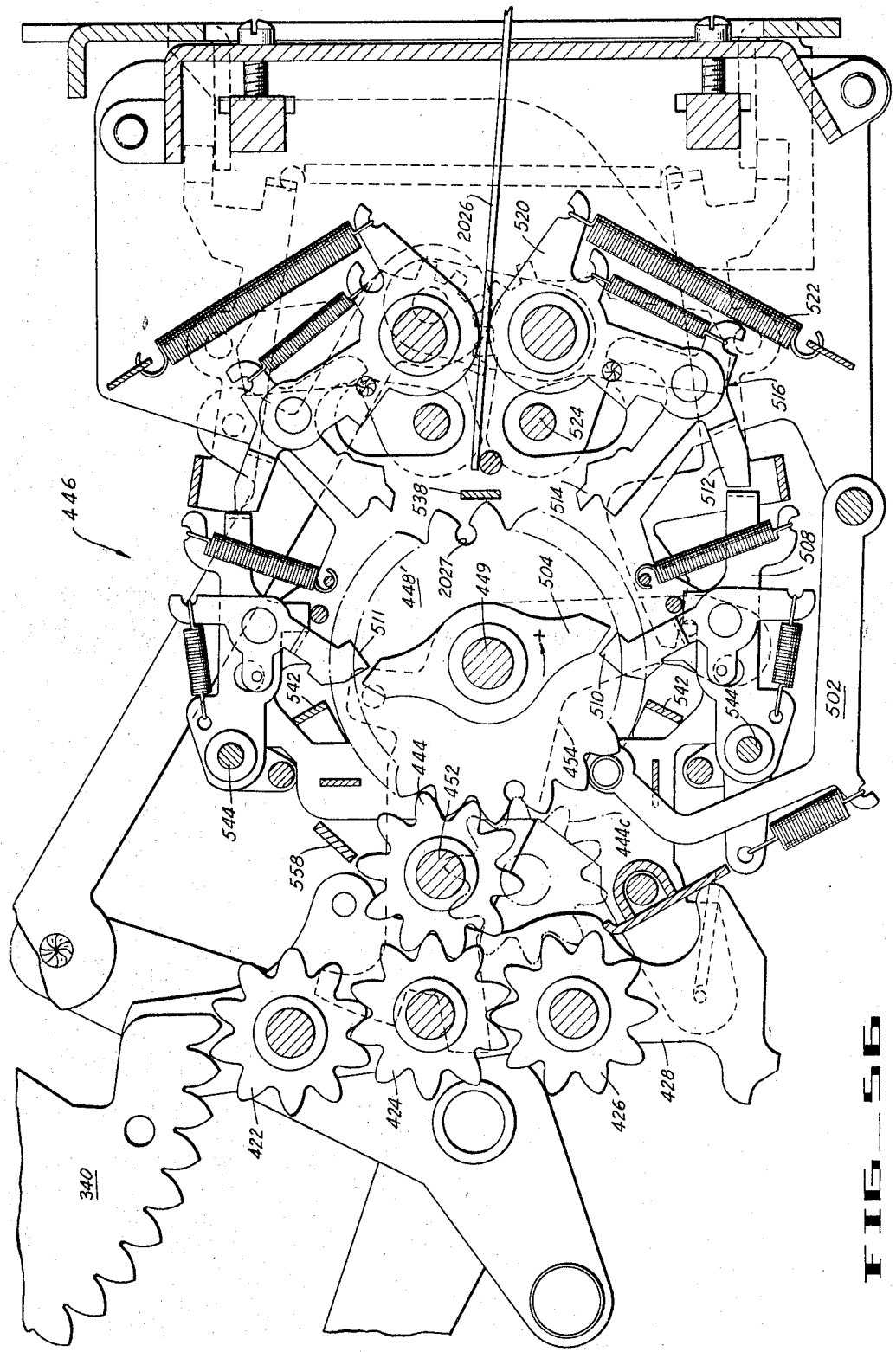
FIG_56

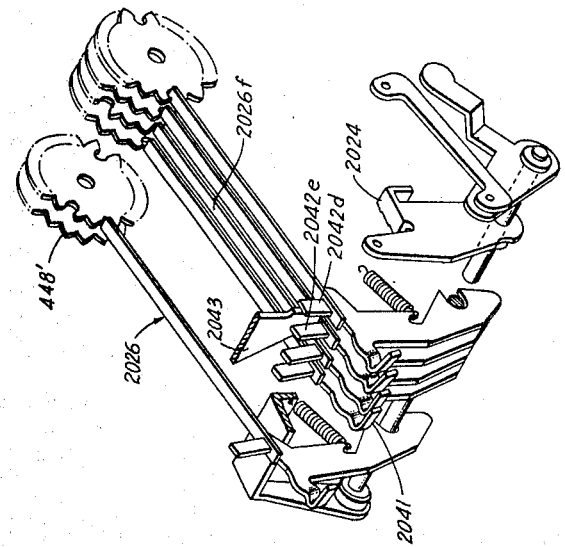
FIG_58
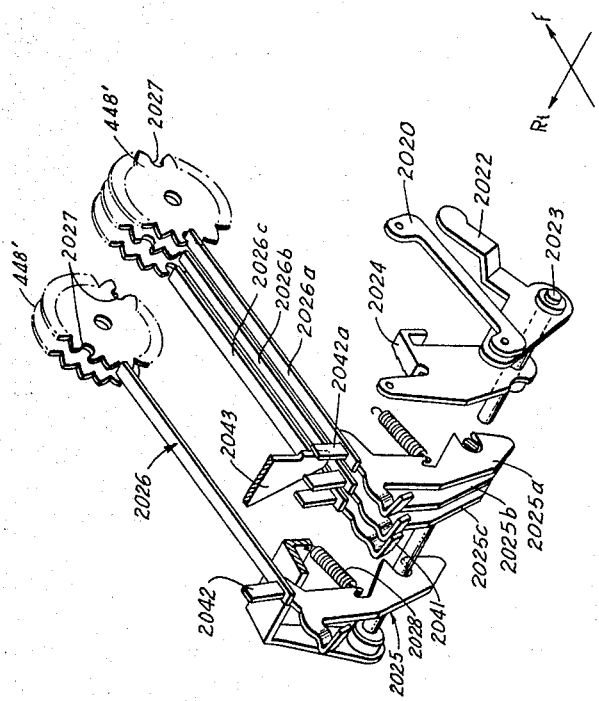
FIG_57

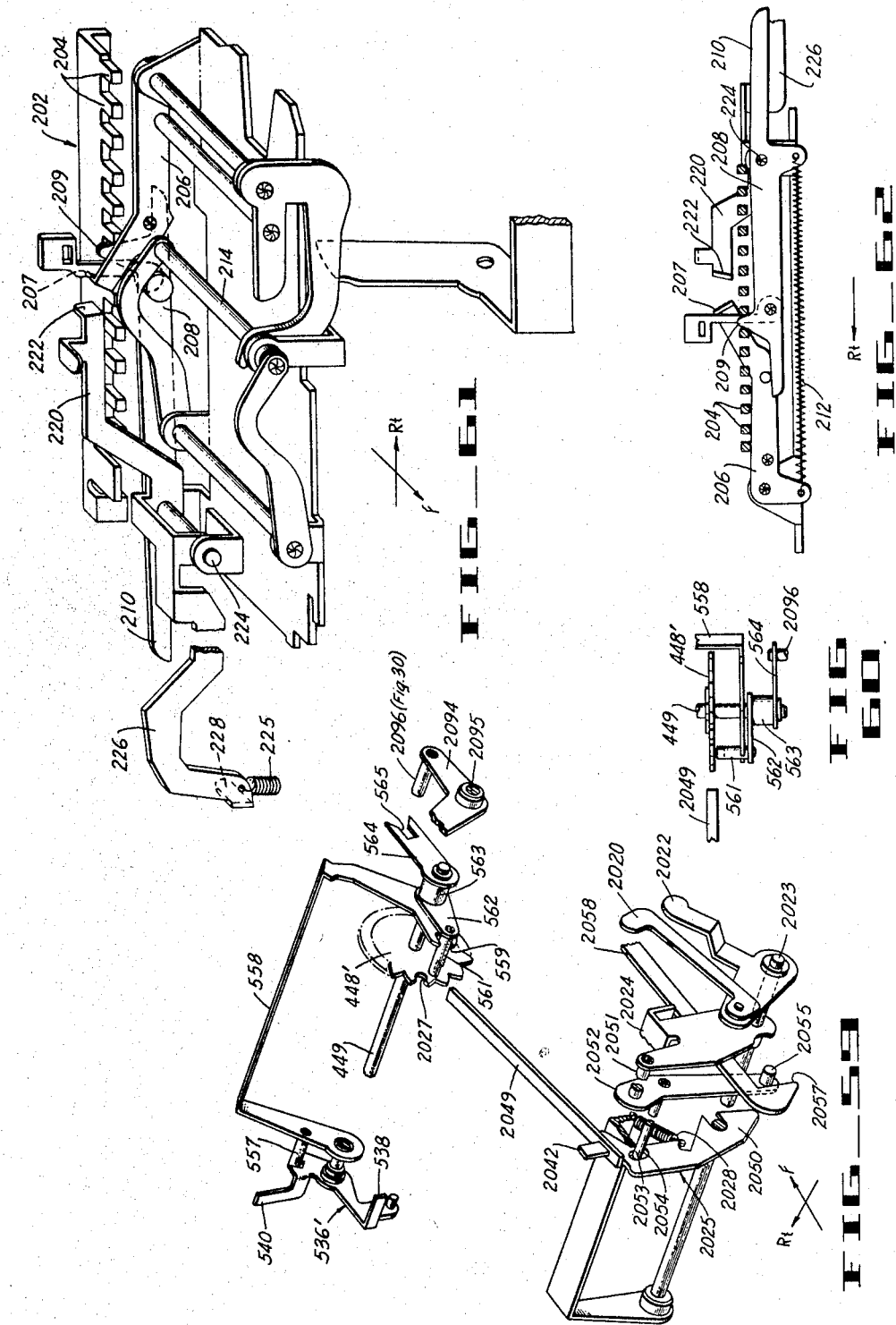

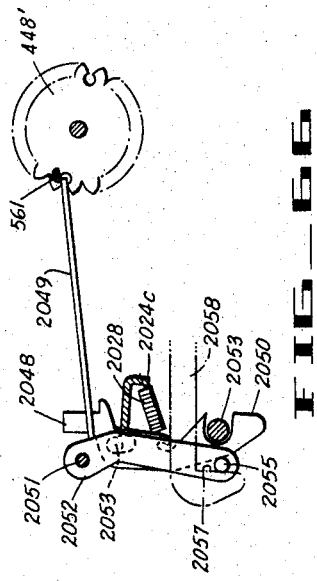
FIG_66
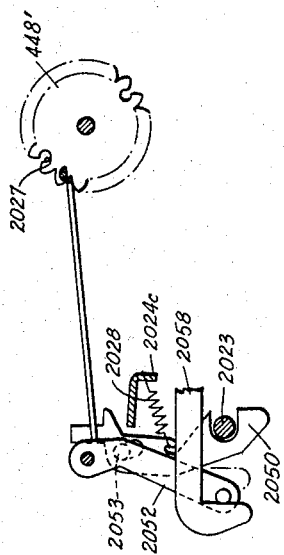
FIG_67
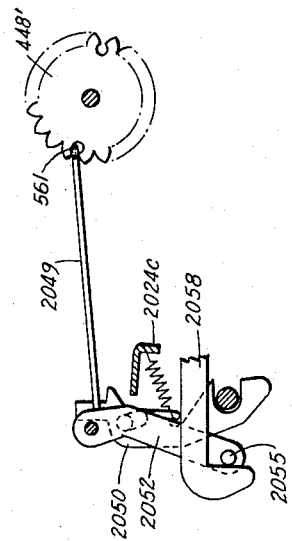
FIG_68
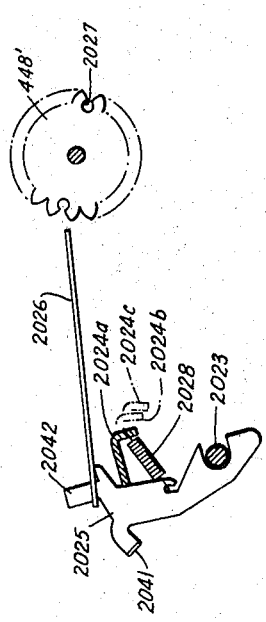
FIG_63
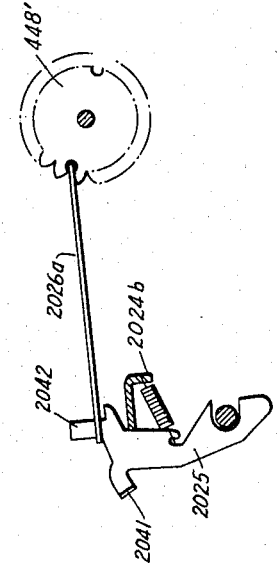
FIG_64
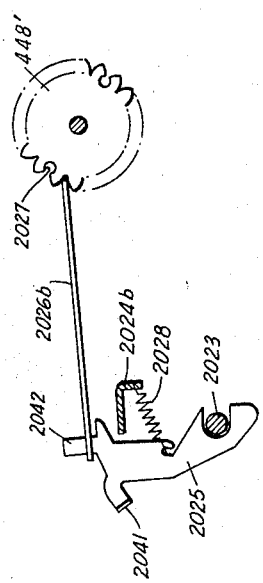
FIG_65

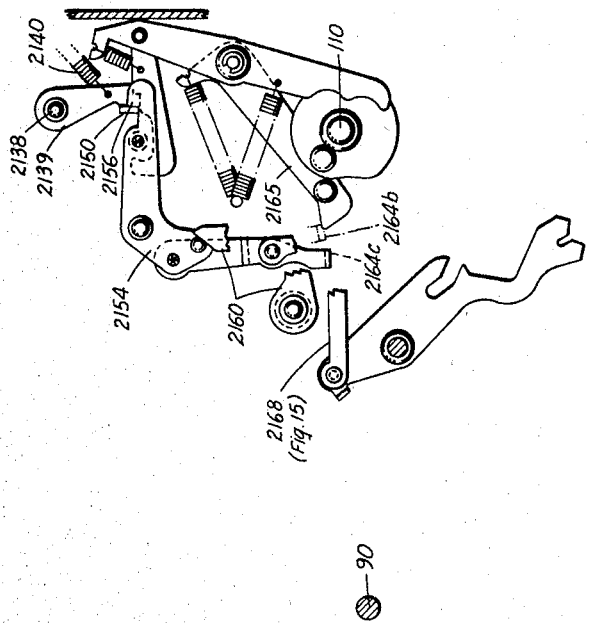
FIG_70
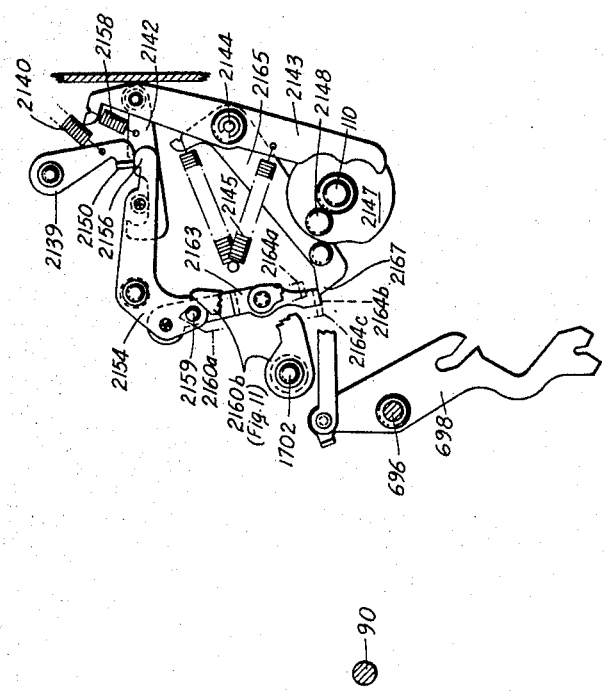
FIG_69

United States Patent Office 3,285,510
Patented Nov. 15, 1966

3,285,510
DIVISION CONTROL FOR CALCULATING MACHINE
Harold J. Chall, Castro Valley, and Cecil G. Olson, San Francisco, Calif., assignors to Friden, Inc., a corporation of Delaware
Filed May 22, 1964, Ser. No. 369,488
4 Claims. (Cl. 235—60)

TABLE OF CONTENTS

| | Column |
|---|---|
| I. General Operation | 4 |
| II. Drive System | 5 |
| III. Single Cycle Action | 6 |
| IV. Selection Unit | 7 |
|    1. Homing the Selection Carriage | 9 |
|    2. Zero Interlock | 10 |
| V. Actuator | 10 |
| VI. Selector Clearing Bail | 11 |
| VII. Front Gear Pendant | 11 |
| VIII. Rear Gear Pendant | 11 |
| IX. Accumulator Drive Gears | 12 |
| X. Accumulator | 12 |
| XI. Mechanism for Controlling Entries into, and Readouts From, the Accumulator | 14 |
|    1. Swinging the Rear Gear Pendant | 14 |
|    2. Shifting the Accumulator Drive Gears | 15 |
|    3. Interlocking the Drive Gears and Rear Pendant | 15 |
|    4. Accumulator Entries | 16 |
|    5. Total and Subtotal | 16 |
|    6. Aligning Lever 792 | 17 |
| XII. Right Side Control Keys | 19 |
| XIII. Operational Control of Symbols for Right Side Operations | 20 |
| XIV. Clear Keyboard and Backspace | 21 |
| XV. Enter Dividend | 22 |
| XVI. Memory Unit and Quotient Register | 23 |
|    1. Operation of Actuator Pawls 974 | 24 |
|    2. Memory Clearing Bail | 24 |
|    3. Input Cycle | 24 |
|    4. Clearing Cycle | 25 |
|    5. Readout Cycle | 26 |
| XVII. General Operation in Division | 28 |
| XVIII. Rear carriage | 28 |
|    1. Carriage Clutch | 29 |
|    2. Homing the Rear Carriage | 29 |
| XIX. Division Program Shaft and Main Division Lever | 30 |
| XX. Division Key | 32 |
| XXI. Aligning the Divisor With the Dividend | 34 |
| XXII. Backspace After Divisor-Aligning | 34 |
| XXIII. Testing the Dividend | 36 |
| XXIV. Division Calculation | 37 |
| XXV. Division Counter | 39 |
| XXVI. Division Counting Operation | 40 |
| XXVII. Stop After Full Length Division Calculation | 41 |
| XXVIII. Early Stop With Division Stop Key | 42 |
| XXIX. Early Stop With "0" Remainder | 44 |
| XXX. Division Print-Out Cycles | 44 |
| XXXI. Printing, Ribbon and Paper | 46 |
| XXXII. Division Symbol | 47 |
| XXXIII. Control of Printing, Symbols and Speed During Division | 47 |
| XXXIV. Multiplication | 48 |

The present invention relates to printing calculating machines, and more particularly to machines for performing division automatically.

In particular, the invention constitutes an improvement on the well-known Friden ten-key adding machine, shown, for example, in Chall, Patent No. 2,832,530. In part, it also constitutes an improvement on the printing calculating machine shown and described in the copending applications of Chall and Wiedeman, Serial No. 117,096 filed June 14, 1961, now Patent No. 3,108,745 issued October 29, 1963, and Chall, Serial No. 138,645 filed Sept. 18, 1961, now U.S. Patent No. 3,145,923. The specification and drawings of this application are substantially identical to those of the application of Harold J. Chall, Serial No. 253,853, filed January 25, 1963.

Objects of the invention include the provision of an improved control for an automatic division program in a printing calculator, and the provision of program cams for controlling all division preparatory and concluding operations, that is, all the division operations except the calculation itself.

A further object is the provision of an improved control for a stop key.

And it is a further object of the present invention to provide an improved high speed printing calculator.

These and other objects and advantages of the present invention will be apparent from the following description of a specific embodiment thereof, and from the claims, taken in connection with the accompanying drawings in which:

FIG. 2 is a skeleton plan view of the machine, showing the locations of certain of the frame members and shafts.

FIGS. 3, 4 and 5 are exploded perspective views from the upper right front showing the cams on the main drive shaft, the rear drive shaft, and the division program shaft, respectively.

FIG. 6 is a right elevational section taken along the plane indicated by the line 6—6 of FIG. 2, showing particularly part of the drive system and clutch control.

FIG. 7 is an electric circuit diagram for the motor.

FIG. 8 is an enlarged detail of part of the single-cycle, clutch-control action, shown also in FIGS. 6 and 9.

FIG. 9 is a right elevational partial section taken along the plane indicated by the line 9—9 of FIG. 2, showing the clutch.

Figure 1:
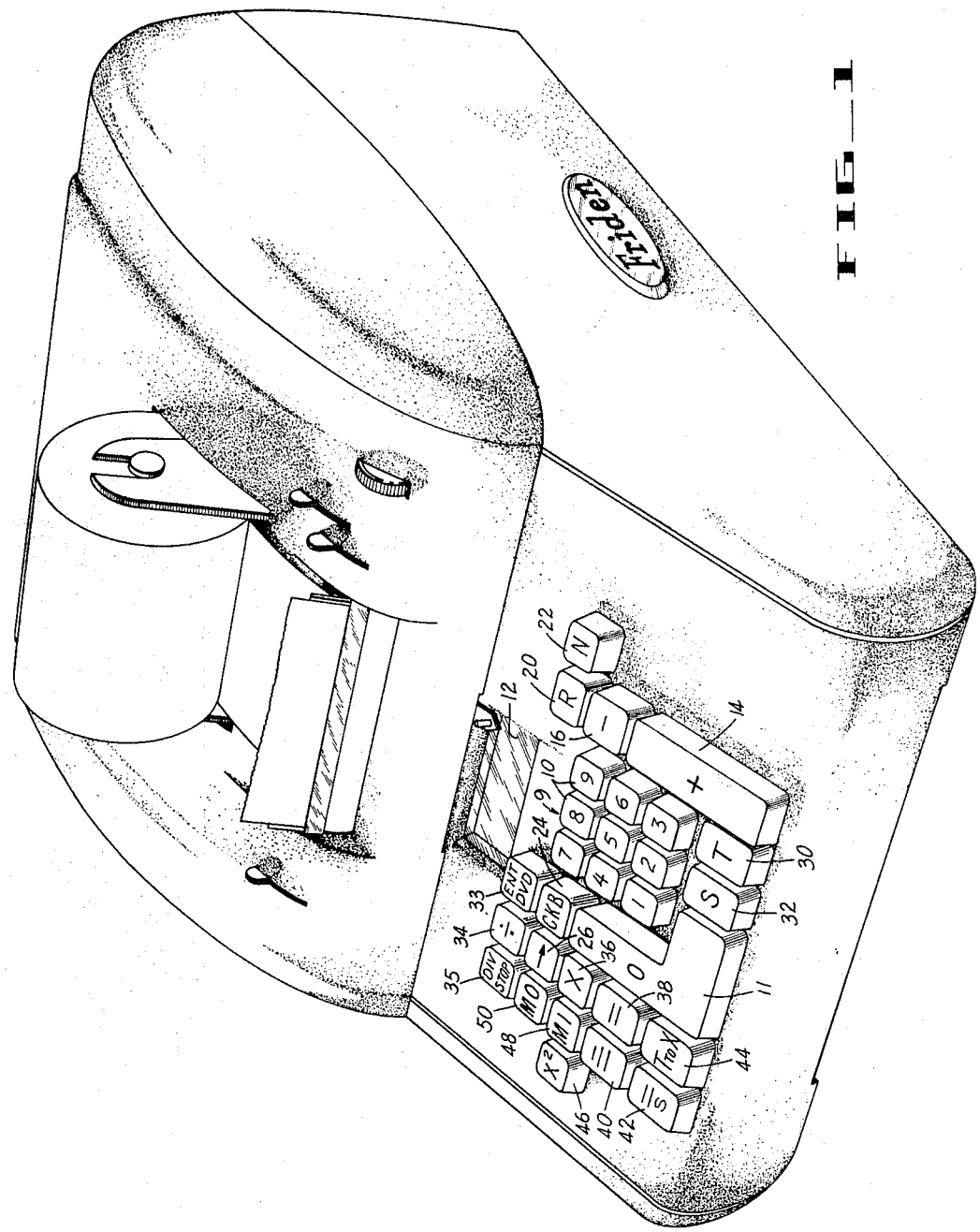
FIG. 1 is an external, perspective view of a machine, complete with case, embodying our present invention, taken from the upper right front.

FIGS. 10 and 11 are right elevational sections taken along the planes indicated by the lines 10—10 and 11—11, respectively, in FIG. 2, showing, for example, some of the mechanism for accumulator entry and total operations.

FIG. 12 is a right elevational partial section taken along the planes indictated by the line 12—12 of FIG. 2, showing mechanism for accumulator entries and totals.

FIG. 13 is an exploded perspective taken from the upper right rear for explaining the operation of the mechanism appearing in FIGS. 12, 14 and 19, for testing the sign of the number in the accumulator.

FIG. 14 is a right elevation showing the accumulator and its gear pendant in the lower rear portion of the machine, the view being taken substantially along the plane indicated by the line 14—14 in FIG. 2.

FIG. 15 is a right elevational partial section taken substantially along the plane indicated by the line 15—15 of FIG. 2 showing part of the division counter mechanism.

FIG. 16 is a right elevational partial section taken substantially along the plane indicated by the line 14—14 in FIG. 2, showing parts of the memory unit and the division counter.

FIGS. 17 and 18 are perspective views from the upper right front, showing part of the division counter, FIG. 17 being exploded.

FIG. 19 is a right elevational section taken along the plane indicated by the line 19—19 in FIG. 2.

FIG. 20 is a right elevational partial section taken substantially along the plane indicated by the line 20—20 of FIG. 2, showing the mechanism for blocking the symbol print wheel for the right side controls.

FIG. 21 is a right elevational section taken along the plane indicated by the line 21—21 in FIG. 2.

FIG. 22 is a perspective view from approximately the right front showing the digit sensor of the multiplier unit.

FIG. 23 is a perspective from the upper right front of the upper rear portion of the machine, showing the multiplier-quotient storage, or memory, sectors and parts of the multiplication and division control mechanisms.

FIG. 24 is a rear elevation of the machine.

FIG. 25 is a left elevational section taken substantially along the plane indicated by the line 25—25 of FIG. 2.

FIG. 26 is an exploded perspective view from approximately the upper left rear showing the blocking bails for the zero latches of the selector unit, which blocks are used during the repeat and backspace operations.

FIG. 27 is a left elevational partial section taken along the plane indicated by the line 28—28 in FIG. 2, showing the control mechanism for the memory unit which mechanism also appears in FIG. 28.

FIG. 28 is a left elevational section taken along the plane indicated by the line 28—28 in FIG. 2.

FIG. 29 is a left elevational partial section showing parts of the memory control mechanism in the upper rear portion of the machine, taken substantially along a plane slightly to the left of the line 28—28 in FIG. 2.

FIG. 30 is a left elevational partial section showing parts of the division control mechanism, in the upper rear portion of the machine, taken substantially along a plane slightly to the right of line 32—32 in FIG. 2.

FIG. 31 is a left elevational partial section showing the division key and division symbol control, taken substantially along the plane indicated by the line 31—31 in FIG. 2.

FIG. 32 is a left elevational section taken substantially along the plane indicated by the line 32—32 in FIG. 2, showing, for example, part of the division control mechanism.

FIGS. 33, 34 and 35 are left elevational partial sections showing parts of the division control mechanism, taken along the planes indicated by the line slightly to the left of line 32—32 in FIG. 2.

FIG. 36 is a left elevational section taken substantially along the plane indicated by the line 36—36 in FIG. 2, showing some of the mechanism for the "DIV STOP" operation.

FIG. 37 is a left elevational partial section showing part of the multiplication control mechanism, taken approximately along the plane indicated by the line 37—37 in FIG. 2.

FIG. 38 is a top detail view of the carriage clutch, taken substantially along the plane indicated by the line 38—38 in FIG. 40.

FIG. 39 is a left elevational section taken substantially along the plane indicated by the line 39—39 in FIG. 2 showing parts of the multiplication, carriage, and divisor-aligning controls.

FIG. 40 is a left elevational section taken substantially along the plane indicated by the line 40—40 in FIG. 2, showing particularly parts of the backspace and carriage control mechanisms.

FIG. 41 is a perspective from the upper left front showing the mechanism for interconnecting and controlling the carriages for the selector unit and the rear carriage.

FIG. 42 is an exploded perspective view from the upper right rear showing parts of the mechanism that controls the entry into, and readout from, the accumulator.

FIGS. 43 and 44 are enlarged right elevational details for explaining the operation of the multiplier-quotient, or memory, unit.

FIGS. 45, 46 and 47 are perspective views from the upper left rear showing the main division control lever and some of the parts of that co-operate with it.

Figure 51:
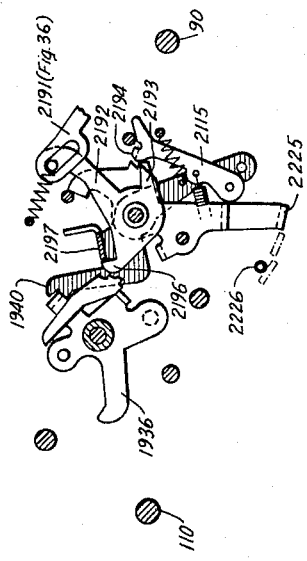
Figure 48:
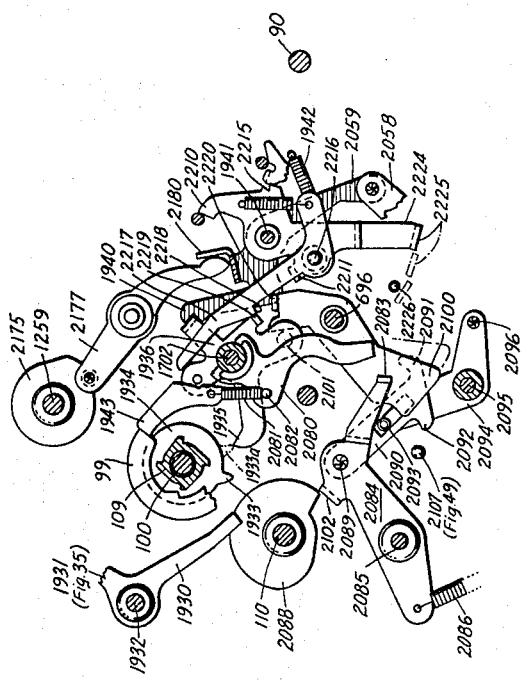

FIGS. 48 and 51 are left elevational details showing the operation of the division control mechanism which appears, for example, in FIGS. 32, 33, 35 and 36.

FIGS. 52 to 55 are left elevational details showing the operation of the division key, which appears, for example, in FIGS. 31 and 35.

FIG. 56 is an enlarged right elevational section for showing the accumulator and its gear pendant, and for explaning their operation.

FIGS. 57 and 58 are partially exploded perspectives, from the upper left rear showing the accumulator test mechanism in the divisor aligning operation.

FIG. 59 is a partially exploded perspective from the upper left rear showing the accumulator test mechanism in the test of the dividend.

FIG. 60 is a plan detail part of the mechanism of FIG. 59.

FIG. 61 is a perspective from the upper right front of the escapement mechanism of the selector unit.

FIG. 62 is a rear elevational partial section showing the escapement mechanism of the selector unit.

FIGS. 63 to 68, inclusive, are left elevational details for explaining the operation of the accumulator test mechanism in the divisor aligning and dividend testing operations.

FIGS. 69 and 70 are right elevational details for explaining the operation of the division counter.

(I) GENERAL OPERATION

The calculating machine herein shown and described includes the mechanism shown in said copending applications, Serial Nos. 117,096 and 138,645, most of it in identical form, and reference is hereby made to those applications for supplementing the description herein. For convenience, identical parts are identified by the same reference numerals in this and those copending applications.

A number may be entered in a movable selector unit by means of selection keys 9 (FIG. 1), which include the nine numeral keys 10 and the zero key 11, and the number so entered appears in a check window 12 on the check dials 197 of selector segments 196 (FIG. 20). Depression of an addition key 14 or a subtraction key 16 (FIGS. 1 and 11) then initiates an operation that transfers the number to the actuator sectors 340 (FIG. 21) and also to the accumulator 446 (FIG. 21), and prints it, the operation clearing the number from the selector unit. Depression of a repeat (R) key 20 (FIG. 1) causes a number in the selector to be entered additively in the accumulator without clearing it from the selector. Simultaneous depression of the repeat key 20 and subtract key 16 similarly enters the number subtractively into the accumulator without clearing it from the selector. A print only (N) key 22 causes the number in the selector to be printed and cleared. A clear keyboard (CKB) key 24 causes the number in the selector to be cleared therefrom and the selector unit to be returned to its home position. A backspace key 26 causes the movable selector carriage to move one space to the right and clear out the digit last entered. A depression of a total (T) key 30 causes the number in the accumulator to be transferred to the actuator and to be printed, leaving the accumulator clear. Depression of a subtotal (S) key 32 similarly transfers the value from the accumulator to the actuator for printing, but in addition returns it to the accumulator.

With a number in the selector unit, and showing in the check window 12, depression of a multiplier-entry (X) key 36 transfers the number from the selector to the actuator, and also to the memory storage sectors 970 (FIG. 21) of a multiplier-quotient register, or memory unit and prints the number, leaving the selector clear. A multiplicand may then be entered in the selector by means of selection keys 9. Then depression of a multiplication (=) key 38 causes the multiplicand to be printed once, the multiplication to be performed automatically, the product to be accumulated additively in the accumulator and the product to be printed out of the accumulator in a total operation. Alternatively the multiplication operation may be initiated by the depression of an accumulative multiplication (= S) key 42, which causes a similar multiplication operation but ends with a subtotal operation, thereby leaving the accumulated product in the accumulator. Depression of a negative multiplication (− =) key 40 causes an operation similar to that of multiplication key (=) 38, but enters the product negatively in the accumulator. A depression of a product transfer (T to X) key 44 produces the same operation as the multiplication key 38, with the addition that the final value in the accumulator is transferred to the memory unit. Any combination of the keys 38, 40, 42 and 44 may be depressed simultaneously.

With a number in the selector, a squaring entry ($X^2$) key 46 may be depressed to cause the number in the selector to be entered in the memory unit and also retained in the selector. Then any of the keys 38, 40, 42 or 44 may be depressed to cause an automatic multiplication for producing the square of the number.

With a number in the selector, a dividend entry (ENT DVD) key 33 may be depressed to cause the selector to its extreme left and the number therein entered in the accumulator by an addition operation. With numbers in the accumulator and the selector, a division (÷) key 34 may be depressed for causing an automatic division operation. This operation includes a programed alignment of the divisor with the dividend, the actual division calculation, which generates the quotient in the memory unit, and the printing of the quotient and remainder. With a division operation in progress, the division stop (DIV STOP) key 35 may be depressed for stopping the calculation at the next completion of a digit of the quotient. The print-out will then show a partial but correct quotient and the remainder corresponding thereto.

A memory input (MI) key 48 and a memory output (MO) key 50 are preparatory keys and do not, by themselves, cause operations of the machine. The memory input key 48 may be depressed previously to, or simultaneously with, keys 14, 16, 20, 22, 30 or 32 to cause the number that is printed to also be entered in the memory unit for use, for example, as a multiplier. The memory output key 50 may similarly be used with the print-only key 22 for printing out the number, either a multiplier or a quotient, standing in the storage or memory unit. The memory output key 50 may also be used with either the addition key 14 or subtraction key 16 for printing the number in the storage unit and entering it additively or subtractively, respectively, into the accumulator. No memory output operation leaves the memory unit clear. The number is transferred to the actuator for printing, and then is returned to the memory unit. Clearing of the memory, or storage, unit is performed only in preparation for the entry of a new number, as in the multiplier-entry (X) and division (÷) operations. Thus a number, whether entered from the selector or accumulator, or generated as a quotient, may be stored in the memory unit during add and subtract operations, used repeatedly as a multiplier, repeatedly entered into the accumulator, and printed out at will.

(II) DRIVE SYSTEM

As shown in FIGS. 6, 7, and 9, a motor 52 includes an armature 53 and fields coils 54 and 55, and is provided with a governor 56 having two pairs of centrifugally operated contacts 57 and 58 adjusted to open at two different speeds of the motor. A main switch 60 supplies current through low speed contacts 57 to the motor 52 for operation at low speed. The series combination of a high speed switch 62 and the high speed governor contacts 58 is connected across the low speed contacts 57 so that when both switches 60 and 62 are closed, the motor operates at high speed. The action of the governor is simply to open the contacts and interrupt the power to the motor when the speed exceeds the value for which the contacts are set. Since contacts 58 open at a higher speed than do contacts 57, they will maintain the circuit up to the higher speed even though the low speed contacts 57 open. A capacitor 64 and a resistor 66 constitute a filter for suppressing electric arcs and electric noise at the contacts 57 and 58. Automatic multiplication and division are begun and ended at low speed and are otherwise operated at high speed. All other key-initiated operations are performed at low speed.

The motor 52 (FIG. 6), through a coupling 70, drives a shaft 72 carrying a worm 74 (FIG. 9), which drives a worm gear 76 fixed to a shaft 78, which in turn carries a pinion 80, which drives a clutch ratchet gear 82 clockwise as seen in FIG. 6 (see also FIG. 3). Gear 82 and a clutch ratchet 84 fixed to it, rotate free on a main drive shaft 90. Fixed to the main drive shaft 90 is a clutch plate 92 which carries a clutch pawl 94 which is journalled at 95 and urged by a spring 96 to engage the ratchet 84 for completing the drive connection between the motor 52 and the main drive shaft 90.

The main clutch, which includes ratchet 84 and pawl 94, is controlled by a dog 114, best shown in FIGS. 8 and 9. In the home position of the main drive shaft 90 a shoulder 116 on the dog 114 intercepts a shoulder 118 of the clutch pawl 94 and holds the pawl tooth 120 clear of the drive ratchet 84. When the dog 114 swings forward (counter-clockwise in FIG. 9) on its support 115, its shoulder 116 disengages the shoulder 118 of pawl 94, so that the spring 96 swings the pawl clockwise as seen in FIG. 9, about its support 95 for engaging the clutch and causing the drive shaft 90 to be rotated clockwise. If then, the clutch dog 114 is returned to its home position, in which it is shown in FIG. 9, its shoulder 116 intercepts the shoulder 118 of the pawl 94, so that the rotation of the clutch plate 92 forces the pawl to disengage the ratchet 84. The rotated position in which the drive shaft 90 is thus stopped by the dog 114 establishes the home position of the drive mechanism. Each revolution of main shaft 90, from home to home, constitutes a machine cycle. A pin 117 on clutch dog 114 moves against the operating arm 61 (FIG. 6) of the main switch 60 for energizing motor 52 before the dog releases clutch pawl 94.

Shaft 90 extends through to the left of the machine where, as shown in FIG. 4, a gear 102 is fixed to it. This gear drives an idler 104 which, in turn, drives a gear 106 fixed to a rear drive shaft 110. Gears 102 and 106 have the same number of teeth, so that shaft 110 is driven in synchronism with the main drive shaft 90.

Rear drive shaft 110 (FIG. 4) carries a pinion 107 which drives a clutch-ratchet gear 108 (FIGS. 5 and 36). This gear, and a clutch-ratchet 109 fixed to it, turn free on a division program shaft 100 (counter-clockwise in FIG. 5 and clockwise in FIG. 36) at one-fourth the speed of the drive shafts 90 and 110. Fixed to the division program shaft 100 is a clutch plate 98 (FIGS. 5 and 35) carrying a clutch pawl 99 which is similar to pawl 94 (FIG. 9) and biased into engagement with ratchet 109 for driving shaft 100 thereby. Ratchet 109 has four equally spaced teeth to ensure a definite predetermined synchronization between the quarter turns of shaft 100 and the cycles of the machine. As will be described, this program shaft 100 is driven a half turn during two preparatory program cycles at the beginning of a division operation, and another half turn during two print-out cycles at the end of the division operation.

(III) SINGLE CYCLE ACTION

In FIGS. 6 and 9 a link 124 is articulately pinned at 125 to the clutch dog 114, and a spring 126 is connected to a pin 127 (FIG. 6) at the forward end of this link for biasing the clutch dog 114 forward, that is, to its pawl-releasing, or clutch-enabling, position. Link 124 is part of an extensible connector 165 which is part of an overlapping keyboard action described in the applications Serial Nos. 117,096 and 138,645 previously referred to.

Clutch dog 114 is controlled, and normally held in its pawl-intercepting position, by a latch 130 (FIGS. 6 and 9) journalled on a pin 131 on the frame of the machine. The upper end of this latch carries a pin 132 which engages a slot in the upper end of the dog 114. A lower front corner 134 on the latch 130 constitutes a shoulder which normally is blocked by a pin 136 on the clutch control bar 138. This bar is supported for longitudinal movement on links 139 (FIG. 9) and 140 (FIG. 6) and is arranged to be moved forward, in a well-known manner, by all the keys (FIG. 1) that are required to set the machine into operation. Latch 130 has a live tip 144 journalled on a pin 145 at its upper forward corner and spring-urged against a stop pin 146. This live tip, in its normal position, shown in FIG. 9, covers the forward face of the shoulder 134 and extends below the lower edge thereof. When clutch bar 138 is moved forward (left in FIG. 9)

pin 136 pushes the lower end of live tip 144 forward and lets the shoulder 134 fall behind the pin 136 so that the latch 130 holds the clutch bar 138 forward. This counter-clockwise motion of the latch 130, through pin 132, permits the clutch dog 114, driven by spring 126, to swing counter-clockwise for disengaging the shoulder 118 of pawl 94, thereby engaging the clutch so that the entire clutch mechanism and the drive shaft 90 rotate counter-clockwise with the motor-driven ratchet 84.

Near the end of the first revolution of shaft 90, the mechanism shown in FIG. 8 returns the clutch dog 114 to its pawl-intercepting position. In FIG. 8, a cam 150 (see also FIG. 3) is fixed to the main drive shaft 90 and carries a roller 151 that actuates a rocker arm 152. This arm is journalled on a pin 148 and is biased forward by a spring 155 against a stop 157, and has a forward extension carrying a pin 153 on which is journalled a hook 154. As cam 150 is rotated (clockwise in FIG. 8), roller 151 descends against a cam face 156 on the rocker arm 152 and rocks the arm rearward. The resulting clockwise swing of arm 152 lifts the pin 153 and hook 154. This upward movement of hook 154 is guided by a pin 159 on a lever arm 161, journalled at 163, to cause a shoulder 158 on hook 154 to engage pin 117 on the dog latch 114 for swinging the dog 114 (clockwise in FIG. 8) to intercept the shoulder 118 of pawl 94 for stopping the drive shaft 90 in its home position.

This clockwise motion of dog 114 swings the dog latch 130 (FIG. 9) to which it is connected (clockwise in this figure) so that shoulder 134 is lifted to release pin 136 for rearward motion. If at this time the clutch control bar 138 is free to move rearward, the parts return to their home positions shown in FIG. 9. However, if bar 138 is held forward, as when an operator maintains finger pressure on an operating key, the clockwise rotation of the dog latch 130 lifts the live tip 144 and lets it swing rearward, under force of its own spring, to lie above the pin 136 which lies forward (to the left in FIG. 9) of its home position. It will be noted in FIG. 8 that when the cam 150 and roller 151 reach their home position, the rocker arm 152 is free to swing (counter-clockwise in this figure) under the force of the spring 155, and no longer holds the clutch dog 114, which is urged toward its clutch-operating position by spring 126. However, because the live tip 144 overlies the pin 136, the dog 114 is held in its clutch-disengaging position, even though the clutch control bar 138 is held forward by the continued depression of an operating key. Thereafter the release of the key by the operator permits the bar 138 to move rearward and return the parts to the position of FIG. 9 so that another depression of the operating key will produce a cycle of machine operation. This operation of the mechanism thus limits the machine operation to a single cycle in response to each separate depression of an operating key. For repeat operation, under control of repeat key 20 (FIG. 1) and during the multiplication and division programs, the guide pin 159 (FIGS. 5 and 8) is moved by its arm 161, to lift the hook 154 clear of the pin 117.

Arm 161 is biased, counter-clockwise in FIGS. 6 and 8, by a spring 940 against a pin 939 on a lever 938 fixed to a shaft 936 which carries an arm 934 (FIG. 10) for actuation during repeat operations. It is to be noted that the roller 151 (FIG. 8) engages the cam face 156 of lever 152 at about five-sixths of the way through the machine cycle and, therefore, it is at that time that the position of lever 161 and hook 154 determines whether the machine operation will be continued into the next cycle.

(IV) SELECTION UNIT

The selection unit is similar to the constructions shown in U.S. Patents, Nos. 2,371,752, 2,832,530 and 2,832,532. A stationary portion includes the digit keys 9 (FIG. 1) and setting levers 194 (FIGS. 19 and 21), the location of which constitutes a selection station. A selection carriage, including right and left frame members 178 and 179 (FIGS. 11 and 19), slides transverse the machine on rods 180 and 181, and is spring-biased toward the left by a spring 183 (FIGS. 28 and 41). The carriage also includes the selection sector 196 in each of sixteen numerical orders, and a column of stop pins 198 and a zero latch 199 for each sector. As is explained in the prior patents referred to initially, the leftmost order of the selector is aligned with the setting levers 194 at the selection station. Depression of one of the digit keys 10 differentially sets the selector segment 196 of that order in accordance with the number, and indexes the carriage one order to the left to bring that order into alignment with the rightmost order of the actuator, and to bring the next order of the selector carriage in line with the setting levers 194. Each selector sector 196 carries a check dial 197 bearing numerals which are exposed through the check window 12 for showing the number set in the selector unit.

In FIGS. 61 and 62, the selector carriage includes a rack 202 having teeth 204. An escapement mechanism on the stationary part of the selector unit co-operates with these teeth for indexing the selector carriage order-by-order to the left as digits are entered. As seen in FIG. 62, the escapement includes levers 206 and 208 which carry teeth 207 and 209, respectively. These levers are biased by a spring 212 for holding tooth 209 in engagement with the rack teeth 204 for blocking movement of the selection carriage and for holding tooth 207 above and clear of the rack teeth 204. Whenever a digit key 10 (FIG. 1) is depressed, a bar 214 (FIGS. 21 and 61) is depressed, to depress lever 206 which, in turn, depresses lever 208. This depression and subsequent return of the two levers 206 and 208 indexes the selector carriage one order to the left (to the right as seen in FIG. 62), as explained in the aforementioned patents.

A lever 220 (FIGS. 61 and 62) similarly indexes the selector carriage to the left order-by-order during a multiplication operation. Lever 220 is journalled on the same pin 224 as is lever 208, and carries an ear 222 which operates similarly to tooth 207. A leftward extending arm 226 of lever 220 carries an ear 228 (see also FIG. 39) by which it is actuated. A spring 225 holds ear 222 normally above, and clear of rack 202.

Escapement lever 208 (FIGS. 61 and 62) includes a leftward extending arm 210, arranged to be lifted by the dividend entry key 33 (FIGS. 1 and 25), as will be described.

A selector clearing bail includes bail arms 384 (FIGS. 6 and 25) fixed to shaft 382 and carrying bail rod 386 for positively sweeping all the selector sectors 196 to their "0" positions during each machine cycle, as will be described in connection with the operation of the actuator under "Selector Clearing Bail."

Journalled on a rod 960 (FIG. 25) are two blocking bails 962 and 964, which are shown best in FIG. 26. The purpose of these bails is to block the zero latches 199 (FIG. 19) for preventing the resetting of the selector sectors during repeat and backspace operations in the manner shown and described, for example, in U.S. Patent No. 2,832,532. Bail 964 is positioned in front (to the right in FIGS. 25 and 26) of the bail 962 and is drawn to it by a spring 965. A bail edge 966 on the bail 964 is aligned with the zero latch of the lowest order of the number that has been entered in the selector for blocking it, and a ledge 963 on the bail 962 is arranged to block the zero latches of the second and all higher orders of the selector. During repeat operations, the bail 962 is swung rearward (to the left as seen in FIGS. 25, 26 and 28) by a pin 949 acting against a cam edge 955, and the bail 964 is moved with it by force of its spring 965 so that the two blocking ledges 963 and 966 block the zero latches 199 (FIG. 19) of all orders of the selector to the left of the selection position, that is, all orders that are aligned with the actuator. For backspacing operations the bail 962 is similarly moved rearward (to the left in FIG. 26) and the bail 964 is blocked by a bail arm 951 (FIG. 28) which moves into position to obstruct pin 956.

(1) Homing the selection carriage

The selector carriage is moved rightward to its home position by means of a mechanism shown in FIGS. 40 and 41, which mechanism also serves other functions. The left frame member 179 of the selector carries an angle bar 230 which extends to the left. This bar includes a rearward facing rack portion 232 (FIG. 41) which is coupled through a pair of gears 234 and 236 to a rack portion 240 of an angle bar 242 extending longitudinal of the machine and guided by a roller 243 and a spool 245 (FIG. 40). The rear end of this bar carries an upward facing rack 244 which meshes with a gear 246 fixed to a shaft 248, which also carries a broadfaced gear 250. In mesh with this gear 250 is the upward facing rack 252 of an interponent 254, which also slides in a groove of spool 245. This interponent has a longitudinal slot 258 for receiving a guide pin 262 carried by lever 264 journalled at 266. Lever 264 carries a roller 268 which rides on the cam 270 on the main drive shaft 90. Cam 270 carries a roller 274 which, during the second half of each machine cycle, is driven by the rotation of the cam (counter-clockwise in FIG. 41) against the forward end 276 of a forward extending arm 278 of a lever 280 journalled to the machine frame at 282. Lever 280 carries pins 284 and 286 which support a lever 290 which has a vertical slot 292 at its upper end and a large square opening 294 at its lower end for receiving the pins 284 and 286, respectively. The lever 290 is thus movable on the pins 284 and 286, but springs 296 and 298 normally hold the lever 290 in the position shown in FIG. 41. Lever 290 (FIG. 41) includes a forward extending arm 308 with a left extending ear 310 at its forward end. An abutment face 256 at the forward end of interponent 254 is arranged to be engaged and driven by the ear 310 for returning the selector carriage to its extreme right, or home, position.

The mechanism in FIG. 41 is shown in its home position. When a number is entered into the selector unit by means of the entry keys 9 (FIG. 1), the selector carriage, and with it the frame member 179 (FIG. 41), moves to the left order-by-order, as previously described. This leftward movement is transmitted by the rack 232 through the gears 234 and 236 to the longitudinal bar 242 which moves forward in the machine as the selector carriage moves left. This motion drives the gear 246, the shaft 248 and gear 250 (counter-clockwise in FIG. 41) and moves the interponent 254 forward. In this forward movement, the interponent is guided by the pin 262. During an addition operation, for example, the shaft 90 and the cam 270 rotate counter-clockwise in FIG. 41. The initial rotation of cam 270 out of its home position lowers the lever 264 and the interponent 254 to align the abutment 256 with the ear 310 on the lever 290. Then, slightly past the mid-point of the cycle, roller 274 abuts the cam surface 276 of the lever 280 to carry the ear 310 rearward against the abutment face 256, for driving the interponent 254 rearward, and through the connections previously mentioned, for driving the rack 232 and the selector carriage right, beyond its home position. Near the end of the cycle, roller 274 runs off the cam face 276, permitting the levers 280 and 290 to return to their home positions, and also permitting the selector carriage to move left to its home, or first selection, position. Also, near the end of the cycle, cam 270 lifts roller 268 for lifting the interponent 254 and raising the abutment 256 clear of the ear 310.

The freedom of movement of lever 290 on the lever 280 is an overload-release device. Normally there is no movement between these two levers. However, the springs 296 and 298 must support the lever 290 in this position against the force exerted on it by the abutment 256. When this load exceeds the magnitude that the springs 296 and 298 will support, the lever 290 tilts, principally about the pin 284, so that the ear 310 slides under the interponent 254.

Lever 264 includes a forward extending arm 265 having an ear 267. A lever 314 has, at its upper end, a forward extending arm 316 arranged to be swung over the ear 267. During machine operations in which the number is not to be cleared out of the selector unit, such as repeat, multiplication and division, the arm 316 is swung over the ear 267 to prevent the lever 264 from being controlled by cam 270, and for holding the interponent 254 up and clear of the ear 310 on lever 290.

(2) Zero interlock

The front face 320 of the lower flange of the bar 230 (FIG. 41) constitutes a cam face for controlling a lever 322. As shown in FIG. 25, this lever 322 is a bellcrank journalled at 324 and co-operating with a second bellcrank 326 journalled at 328. The upward extending arm of this bellcrank 326 is bifurcated and the rear prong 330 lies under a part of the stem of the "0" key 11. When the selection carriage is in its home position, cam face 320 holds the lever 322 counter-clockwise, as seen in FIGS. 25 and 41. This action, through a spring 325, holds bellcrank 326 clockwise so that prong 330 lies under the "0" key 11 and blocks it. When the selection carriage moves left one order, that is, to its second order selection position, cam 320 (FIG. 41) permits lever 322 to swing clockwise, thereby moving prong 330 out of alignment with the flange of the "0" key 11, and thereby removing the block. This interlock arrangement requires that the first digit entered be a significant digit and so prevents the capacity of the machine from being reduced by the entry of initial "0's."

V. ACTUATOR

The actuator includes seventeen actuator sectors 340 (FIGS. 21 and 25) separately rotatable on a transverse actuator shaft 342. These sectors are similar in construction to those of the machine described in U.S. Patent No. 2,832,534, already referred to. A separate sector 340 is provided for each numerical order of the machine. These sectors are oscillated about the shaft 342 during each operating cycle of the machine by an actuator bail rod 344 which lies in slots 341 in the sectors.

Bail rod 344 is driven by actuator cams on the main drive shaft 90. A lead cam 348 and a trail cam 349 (FIGS. 19 and 3) engage two rollers 350 and 352, respectively, carried by a yoke 354 which is fixed to the right end of a transverse shaft 356. This yoke includes gear segment 358 (FIGS. 19) which meshes with a segment 360 fixed on the actuator shaft 342. A bail arm 362, fixed to the shaft 342, carries the right end of the bail rod 344, and a similar bail arm 364 (FIG. 28), also fixed to the actuator shaft 342, supports the left end of the bail rod 344. Also located on the left side of the machine (FIG. 28) is a second gear segment 376 similar to segment 360 and similarly fixed to the shaft 342. Gear segment 376 meshes with a gear segment 374 which is part of a lever 372 journalled on shaft 356. Lever 372 carries a pin 373 which lies under a rearward extending arm 371 of a lever 377 which carries a roller 379 riding a cam 370. During the first half of each operating cycle of the machine, the actuator cam 348 (FIG. 19), and the cam 370 through lever 377 and pin 373 (FIG. 28), drive the actuator bail 344 down (counter-clockwise in FIG. 21). During this motion, the bail 344 drives against a hook-shaped, spring-loaded member 345 on each actuator sector 340 for driving the sector as far (counter-clockwise is FIG. 21) as it is free to rotate. As is well known, the limit on the rotation of each actuator sector is imposed by the element, such as a selector section 196, from which a digit is being transferred to the actuator sector. During the second half of each operating cycle of the machine, the bail 344 is returned to its home position, shown in FIG.

21, for returning all of the actuator sectors 340 to their uppermost, or home, positions.

(VI) SELECTOR CLEARING BAIL

Cam follower 377 (FIG. 28) also includes a gear segment 378 which drives a pinion 380 on the shaft 382, which supports the selector sectors 196 (FIGS. 19 and 25), and carries the two bail arms 384 and bail rod 386 of the selector clearing bail previously described. The bail rod 386 provides an auxiliary drive for positively returning the selector sectors 196 to their "0," or home, position during each operating cycle of the machine. Under certain conditions it relieves the spring-controlled drive members 345 (FIG. 21) of the actuator of part of their load, and it ensures that all selector sectors 196 are returned to their home position whether they are aligned with actuator sectors or not. It also permits the clearing of the selector when the actuator is not available, as during the last cycle of the division operation, as will be described.

(VII) FRONT GEAR PENDANT

The actuator is arranged to be connected to the selector unit by means of a front gear pendant 390 (FIGS. 21 and 25) of well-known construction. It includes a pair of frame members 392 (FIG. 25) and 394 (FIG. 21) supported on a transverse shaft 396. This shaft 396 and shafts 397 and 398 carry three gears for each order, the uppermost gear being permanently in mesh with the actuator sector 340 and the lowest gear being arranged for movement into and out of mesh with the selector sector 196. Frame member 394 (FIG. 21) carries, at its upper end, an ear 400 which is normally embraced by a notch 708 of a link 710 (FIG. 10) for moving the pendant.

Link 710 extends forward from an upward extending arm 712 of a bell-crank 714 journalled at 716. A second arm carries a roller 718 riding a front pendant control cam 720 on the main drive shaft 90. Bellcrank 714 is spring-biased (counter-clockwise as seen in FIG. 10) for holding the roller 718 against the cam. Cam 720 moves the link 710 rearward early in each machine cycle, holds it there until midcycle, and then moves it forward again. With the link 710 engaging the ear 400 of the front gear pendant 390, this action swings the pendant into engagement with the selector sectors 196 (FIGS. 21) during the first half of the cycle so that the number set into the selector is transferred to the actuator, as is required in addition, subtraction, and certain other operations, and disengages the pendant from the selector at midcycle. The forward end of the link 710 is slotted, and guided on a pin 722 (FIG. 10) on a bellcrank 724, which is journalled at 726. For totaling, memory-output, clear keyboard, and backspace operations, the bellcrank 724 is rocked clockwise in FIG. 10 for lifting the link 710 and notch 708 clear of the ear 400.

An aligning mechanism for the pendant 390 includes left and right blocking levers 404 and 406 (FIGS. 19 and 25) fixed to opposite ends of a transverse shaft 408. These levers include ears 410 arranged to engage the forward and rear sides of projections 412 on the pendant frames 392 and 394 for holding the pendant in its home position and engaged position, respectively. These aligning levers 404, 406 are rocked by a lever 414 (FIG. 21), having a roller 415 riding a cam 416 on the main drive shaft 90. The aligning levers 404 and 406 hold the pendant 390 against movement during the downstroke, and again during the upstroke, of the acuator sectors 340, but release it for shifting at the home and half-way positions of the cycle.

(VIII) REAR GEAR PENDANT

A rear pendant, indicated generally by the reference numeral 420 (FIG. 21), includes an upper gear 422, a middle gear 424 and a lower gear 426 for each numerical order of the actuator. Left and right frame members 428 and 430 (see also FIG. 42) are journalled on pins 429 and, in turn, carry shafts 423, 425 and 427 on which the several gears 422, 424 and 426, respectively, turn free. The upper gears 422 (FIG. 21) are in constant mesh with their respective actuator sectors 340 and similarly the gears 422, 424 and 426 in each order are constantly in mesh. Left and right box cams 436 and 438 on a transverse shaft 440 (FIGS. 21, 25 and 42) are arranged to swing the pendant 420 rearward and forward to carry gears 424, or alternatively, the gears 426, as will be explained, into and out of engagement with drive gears 444 of an accumulator, indicated generally by the reference numeral 446.

(IX) ACCUMULATOR DRIVE GEARS

Each of the drive gears 444 (FIG. 21) is in constant mesh with a register gear 448' and is arranged to occupy its normal, upper, or home position, shown, for example, in solid lines in FIG. 56, and a lower, alternative position 444–c shown dotted in FIG. 56, for engagement with the gears 424 and 426, respectively. The drive gears 444 turn free on a shaft 452 carried by a pair of brackets 454 and 456 (FIGS. 25 and 56) journalled on a shaft 449 of the register gears 448, and are biased to their upper, normal position by a spring 455, as shown in FIG. 25.

In the operation of addition, a number is transferred, during the first half of the machine cycle, from the selector to the actuator and simultaneously from the actuator to the accumulator 446. In this operation the drive gears 444 remain in their upper or normal position and the pendant 420 is moved rearward for engaging the gears 424 with the drive gears 444. The register gears 448 accordingly rotate counter-clockwise as seen in FIG. 21 for the positive entries. The subtraction is performed similarly except that the drive gears 444 are moved to their lower position 444–c (FIG. 41) as will be described, and are engaged by the lowest pendant gears 426 for driving the register gears 448 clockwise in FIG. 21. When a total or subtotal is read out of the accumulator 446, the drive gears 444 are controlled by a credit balance indicator 536' (FIGS. 13 and 14), as will be described. For a negative value in the accumulator, the drive gears 444 remain in their upper, or normal, position for engagement with the pendant gears 424. For a positive value in the accumulator, the drive gears 444 move to their lower position for engagement with the lowest pendant gears 426. For a total operation, the number is read out of the accumulator during the first half-cycle of operation and is printed, leaving the accumulator clear. For a subtotal operation, the number is read out of the accumulator in the first half-cycle, printed and then returned to the accumulator during the second half-cycle.

Backup pawls 466 (FIGS. 21 and 25) engage the lowest gears 426 of the rear pendant, holding the actuator sectors stationary at mid-cycle during the short interval that the front and rear pendants 390 and 420 are disengaged from the actuator. These pawls are more fully described in the copending applications Serial Nos. 117,096 and 138,645 previously referred to. No special aligning device, such as the aligning lever 404 or 406 for the front pendant 390 (FIG. 19), is required for the rear pendant 420 because the box cams 436 and 438 (FIG. 42) provide a sufficiently rigid control of the rear pendant.

(X) ACCUMULATOR

The accumulator 446 is best shown in FIGS. 14 and 56 and includes mechanism shown and described in the U.S. Patent No. 2,832,530 already referred to. Thus, the accumulator (FIG. 56) includes, for each numerical order, the twenty-tooth register gear 448' which is provided with a spring-pressed detent 502 for centering it in each digital position.

Fixed to each gear 448' is a two-pointed cam 504 which initiates the tens-transfers. The tens-transfer mechanism operable for positive entries (counterclockwise in FIG. 56) includes a spring-urged lever, or gate, 508 carrying a spring-pressed live tip 510 arranged to be rocked by the cam 504 when the number in the gear changes from "9" to "0." When rocked, the gate 508 releases a tip 512 of a three-armed spring-urged lever 516, which is carried on a spring-driven lever 520. When the tip 512 is released, a spring 522 urges the lever 520 (clockwise as seen in FIG. 56). The pawl 514 at the tip of lever 516 is arranged to drive against a tooth of the register gear 448′ of the next higher order for driving it an additional tooth-space in the positive direction (counter-clockwise in FIG. 56) for effecting the tens-transfer. However, the transfer lever 520 is restrained by a bail rod 524 during the entry of the number from the actuator, and is permitted to operate only after the pendant gear has been disengaged from the drive gear 444 of the accumulator. The bail rod 524 is carried by a pair of similar brackets 526 (FIGS. 14 and 25) on a shaft 528, which also carries a lever 530. The lever 530 (FIGS. 25 and 32) is connected by a link 532 to a lever 484 which, through a shaft 486, a lever 488 and a roller 490, is controlled by a tens-transfer cam 492 (FIG. 36).

The tens-transfer cam 492 is shown in its home position in FIGS. 25 and the arm 488 down. This action swings the bail 524 (FIG. 56) to its lowest position for setting all the arms 520 and causing the tips 512 to engage the gates 508 for latching the levers 516 in a set position. By the time the pendant 420 (FIG. 21) has been engaged with the drive gear 444 and the motion of the actuator begun, the tens-transfer cam 492 (FIG. 36) has permitted the lever 488 to rise slightly and has raised the bail rod 524 (FIG. 56) enough to permit the levers 520 to be unlatched by operation of the gates 508 during the entry of the number from the actuator. Then at about mid-cycle, when the entry from the actuator has been completed, the shoulder 534 (FIG. 36) of the cam 492 passes the roller 490 to raise bail 524 to its uppermost position and permit the tens-transfer operation to be completed. At this time any secondary tens-transfers induced by the primary tens-transfers will be promptly completed, the whole tens-transfer operation being driven by the springs 522.

A "fugitive-one" transfer from the highest to the lowest order is provided for permitting the readout of true negative values, or true "credit balances," as is well known. Similar tens-transfer and fugitive-one transfer mechanism is provided for negative entries, which mechanism includes a live tip 511 (FIG. 56) for each order, arranged to be actuated by the same tens-transfer cam 504 that initiates the positive tens-transfer.

The accumulator includes an indicator of a well-known type, responsive to the fugitive-one transfer, for indicating the sign of the number in the accumulator. The bellcrank 536′ (FIGS. 14 and 13) turns free on the main register shaft 449 and has a tongue 538 (see also FIG. 56) that lies in alignment with the pawl ends of the lever arm 516 and the corresponding arm of the negative tens-transfer lever in the lowest (right-hand) order. Tongue 538 will be rocked in opposite directions by these fugitive-one transfer pawls when the register goes through "0" in the positive and negative directions. Bellcrank 536′ will lie in a clockwise or counter-clockwise position to indicate that the last fugitive-one transfer was negative or positive, respectively. The indicator 536′ includes an upward extending lever 540 which will be sensed by the mechanism shown in FIG. 13 during the readout of the totals and subtotals. The indicator 536′ also includes a notch in which lies a pin 557 of a bail 558 (FIG. 59) journalled on the register gear shaft 449, which carries the sign indication to the left side of the accumulator for controlling the division operation, as will be described. There, a notch 559 engages a pin 561 on a lever arm 562 fixed to a bushing 563 which is also journalled on the register gear shaft 449. A second arm 564 on the bushing 563 has a notch 565 for engagement with a pin 2096 on a bellcrank 2094 (FIG. 30), journalled on a shaft 2095 concentric with the shaft 449. The separate levers 564 and 2094, and the notch 565, facilitate the insertion and removal of the accumulator as a separate unit.

The present accumulator includes so-called "zero" blocks of a well-known type consisting of bails 542 journalled on shafts 544 for blocking the live tips 510 and 511 during readout operations. For example, when the register gear 448′ and tens-transfer cam 504 rotate (clockwise in FIG. 41) for the readout of a positive number, they will be stopped when the tens-transfer cam 504 abuts tip 510, which is, in turn, blocked by the bail 542, then in a position (clockwise or to the right of the position shown in FIG. 56) for blocking the tip 510. As shown in FIG. 14, the two bails 542 are connected to a slide 546 which includes an abutment 548 at its extreme left, as seen in FIG. 14. The slide 546 is spring-urged to the left in this figure for normally holding the blocking bails 542 (FIG. 56) clear of the tips 510 and 511 so that normally the blocks are in position to permit entry of numbers into the accumulator. The righthand frame 430 of the gear pendant 420 (FIG. 14) carries an interponent 550, which is connected thereto by a pin 552 on the pendant frame for guiding a slot 554 in the interponent.

The upper end of interponent 550 is pinned to an arm 556 fixed to a total-subtotal shaft 560. Whenever a total or subtotal is to be taken, the shaft 560 is rotated counter-clockwise as seen in FIG. 14. The rotation is greater for the subtotal, but either motion is sufficient to place the lower end of interponent 550 opposite the abutment 548 of the zero block 546, so that the rearward motion (to the right in FIG. 14) of the gear pendant 420 moves the slide 546 rearward for setting the blocking bails 542 (FIG. 56) behind the tips 510 and 511.

(XI) MECHANISM FOR CONTROLLING ENTRIES INTO, AND READOUTS FROM, THE ACCUMULATOR

The principal mechanism for controlling the transfer of numbers into and out of the accumulator is located to the right of the accumulator and appears in FIGS. 10, 11, 12, 19, 21 and 25. Parts of it also appear in the exploded perspective of FIG. 42. The function of this mechanism is to move the rear pendant 420 into and out of engagement with the drive gears 444, to move the drive gears 444 to their lower position when required for negative entries and positive readouts, and to test the sign of the number in the accumulator, all in response to the actuation of other controls which simply call for addition, subtraction, total, or subtotal. This mechanism, and particularly that shown in FIG. 12, also controls the printing of symbols, as will be described.

(1) *Swinging the rear gear pendant*

The swinging of the rear gear pendant 420 is effected by a pair of box cams 436 and 438 (FIGS. 25 and 42), which are rocked down (counter-clockwise in FIG. 42) for moving the pendant rearward for engaging the drive gears 444 of the accumulator. As best shown in FIG. 42, the box cams 436, 438 are fixed to the shaft 440 controlled by a bellcrank 600. A spring 602 connected to bellcrank 600 continuously urges the shaft 440, counter-clockwise in FIG. 42, for urging the gear pendant 420 to engaged position.

Bellcrank 600 is connected at 622 to a lever 614, journalled at 618 and carrying a roller 620 arranged to ride a cam 616 on the main drive shaft 90. With the shaft 90 at its home position, cam 616 holds the box cams 436 and 438 in their upper position for holding the gear pendant 420 disengaged from the accumulator. During subtotal operations, the cam 616 permits the bellcrank 600, shaft 440 and box cams 436 and 438 to be rocked, counter-clockwise in FIG. 42, by the spring 602, and permits the rear gear pendant to remain in engagement with the accumulator during both the first and second halves of the machine cycle.

A lever 626, also journalled at 618 alongside lever 614, is pinned at 634 to a hook member 633. This hook member carries a hook portion 640 which is biased by a spring 636 into engagement with a pin 642 on the lever 614. During subtotal operations, the hook member 633 is rocked by a pin 760 for disengaging hook portion 640 from pin 642 so that the rear gear pendant 420 is controlled by lever 614 alone, as has been described. During addition, subtraction and total operations, the hook portion 640 remains in its normal position in engagement with the pin 642 so that the action of spring 602 for engaging the rear pendant is restrained by both the levers 614 and 626. Lever 626 is controlled by a cam 628 on the main drive shaft 90 and the action of the two cams 616 and 628 together is to permit engagement of the rear gear pendant 420 during only the first half of the machine cycle. Normally, a pin 608 on the bellcrank 600 (FIG. 42) is blocked, for holding the rear gear pendant 420 disengaged from the accumulator, by a hook plate 604 journalled at 605 (FIG. 11).

(2) Shifting the accumulator drive gears

The shifting of the drive gears 444 is controlled by two similar blocking members 652 and 654 journalled on the total-subtotal shaft 560 (FIGS. 19 and 42). These blocking members are normally held in the position shown in FIG. 19, but when a shift of the drive gears 444 is required, one or the other of these blocking members moves rearward. Their position is then tested by a dog 658 that is journalled on a pin 659 on a lever 660. This lever is journalled on a stud 662 and its forward end (left in FIGS. 19 and 42) has a cam surface 664 arranged to be engaged at the start of each machine cycle by a roller 666 between the two actuator cams 348 and 349. Lever 660 also carries a roller 668 that is held depressed by the periphery of cam 348 until about mid-cycle. Lever 660 is biased to its lower position, and the dog 658 is biased against a pin 661 (clockwise as seen in these figures) by a spring 672 that is fastened to an ear 674 on the dog 658 and extends over the pin 659 and down to the frame of the machine. A tail portion 676 of the dog 658 lies forward of a roller 648 (FIGS. 19 and 42) on the lower end of the right-hand arm 456 of the drive gear assembly.

Promptly at the beginning of each machine cycle, the roller 666 on the cams 348 and 349 depresses the cam surface 664 on the lever 660 for lifting the dog 658 to test the positions of the blocks 652 and 654. If these blocks are in their normal, forward positions, shown in FIG. 19, so that no shifting of the drive gears 444 is required, the ear 674 on the dogs 658 will simply rise to the rear of the two blocking members 652 and 654. But if either blocking member has been moved rearward, it will overlie the ear 674. Under this condition, when the lever 660 is rocked to lift the dog 658, the ear 764 is blocked and the dog 658 must turn (counter-clockwise in FIGS. 19 and 42). This action swings the tail 676 rearward against the roller 678 for swinging the arm 456 counter-clockwise for lowering the drive gears 444. This shifting takes place promptly at the start of the machine cycle and is completed before cam 616 (FIG. 42) permits the pendant 420 to be engaged.

(3) Interlocking the drive gears and rear pendant

An interlock action between the motions of the drive gear assembly and the gear pendant 420 is provided by a curved arm 680 (FIGS. 12 and 42) fixed to box cam shaft 440 and co-operating with a pin 682 (see also FIG. 19) on the lever 660. In FIG. 12, these parts are shown in their normal position with pin 682 lying in a slot 684 provided by the hook-shaped lower end of the arm 680. The initial action is the lifting of the rear end of the lever 660 (FIG. 42), and since the lever turns about its support 662, the pin 682 swings substantially free in the slot 684. In the highest position of pin 682, it is clear of the end surface 686 of the crook portion of arm 680, so that shaft 440 and arm 680 can turn (counter-clockwise in FIG. 42) for lowering the box cams 436 and 438 and bringing the gear pendant 420 into engagement with the drive gears 444. This movement of arm 680 brings the end surface 686 under the pin 682, so that the arm 680 prevents return movement of arm 660 as long as the box cams 436 and 438 hold the gear pendant 420 in engagement with the drive gears 444. This interlock action between arm 680 and pin 682, among other things, holds lever 660 in its upper position until shaft 440 lifts the box cams 436 and 438 for disengaging the gear pendant 420. During a subtotal operation this interlock keeps the rear gear pendant 420 in engagement with the drive gears 444 until near the end of the machine cycle, even though cam 348 releases lever 660 near mid-cycle.

(4) Accumulator entries

The plate 604 is biased counter-clockwise, as seen in FIG. 42, by a spring 610 (FIG. 11) to the limit permitted by an add-subtract control link 612 (FIG. 10) for blocking the pin 608 (FIG. 42). A slot 690 in the hook plate 604 embraces a pin 692 carried by a lever 694 fixed to an add-subtract shaft 696 to which is also fixed a lever 698. At the top of this lever is an ear 702 which is part of the symbol control mechanism (FIG. 12), as will be described. Below the shaft 696, the lever 698 has a slot 704 which embraces a pin 706 on the blocking member 652 (see also FIG. 19).

For an additive entry, the plate 604 and lever 694 are rocked a few degrees (plate 604 counter-clockwise, and lever 694 clockwise in FIG. 42). This action lowers a hook 606 for unblocking pin 608 (FIGS. 11 and 42). It also moves the block 652 rearward slightly (right in FIGS. 19 and 42), but not enough for intercepting ear 674 of dog 658. Consequently, for this additive operation, the drive gears 444 will be left in their upper, normal position, and since nothing has disengaged the hook 633 from the pin 642, the machine will perform an addition operation as previously described.

For a subtractive operation the plate 604 and lever 694 rock through substantially twice the angle as for an additive operation. This action produces a greater rearward movement of block 652 for bringing it into blocking position for intercepting the dog 658 (FIG. 19) and causing the drive gears 444 to be shifted to their lower position for the negative entry.

The add-subtract control shaft 696 (FIGS. 11 and 42) extends through to the left side of the machine for actuation by the division control (FIG. 32) as will be described, and by the multiplication control (FIG. 39), as is more fully described in the copending applications previously referred to.

(5) Total and subtotal

The main total-subtotal shaft 560 (FIG. 42) also extends to the left side of the machine (FIG. 37) for actuation by the division and multiplication controls. At its right end, the shaft 560 carries a bellcrank 752 (see also FIG. 10) through which it is actuated by a cam 750 and a bellcrank 745 under control of the total (T) and subtotal (S) keys 30 and 32 (FIG. 1), as is more fully described in the copending applications Serials Nos. 117,096 and 138,645 previously referred to. The shaft 560 is rotated counter-clockwise in FIGS. 10 and 42, a few degrees for causing a total operation of the machine, and is rotated in the same direction through substantially twice that angle for causing a subtotal operation. Shaft 560 carries a control lever 758 (FIG. 42) which carries the pin 760. As previously described, in a subtotal operation, the pin 760 rocks the hook lever 633. The pin 760 also lies in a slot 762 in the hook plate 604 (FIG. 42) and, in both total and subtotal operations, operates against the cam edge 763 for rotating plate 604 to the same position that it occupies for additive operations. In a subtotal or total operation, the position of the drive gears 444 must correspond to the sign of the number that is being withdrawn from the accumulator, and that sign is indicated by the indicator 536' (FIG. 13) which stands in the position in which it was set by the most recent fugitive-one transfer. If the number in the accumulator is negative, the upward extending arm 540 of the indicator 536′ stands directly under an ear 768 on the rear end of a bail arm 770 on a bail 772 journalled on a shaft 774 (see also FIG. 12). Bail arm 770 carries a pin 777 which lies in a slot 775 of blocking member 654 (see also FIG. 19). Also journalled on the shaft 774 is a lever 776 (FIGS. 12 and 13) having a notch that embraces a pin 778 on the total-subtotal control lever 758 (FIGS. 12 and 42). A spring 780 connected between the pin 778 and a pin 782 on the bail arm 771 of bail 772 biases the bail 772 (clockwise as seen in FIGS. 12 and 13) and normally holds the pin 782 against the lever 775, as seen, for example, in FIG. 12. When the lever 758 (FIG. 42) is rocked counter-clockwise in either a total or subtotal operation, the engagement of the pin 778 in the notch of the lever 776 causes that lever to turn (clockwise in FIG. 12). The lever 771, being urged by spring 780, tends to follow this movement, but if the number in the accumulator is negative, the ear 768 (FIG. 13) immediately abuts the upper end of the arm 540 of the sign indicator. The bail 772 then is unable to follow the motion (clockwise in these figures) of the lever 776 and so does not transmit any motion to the blocking member 654. Consequently, the block 654 (FIGS. 19 and 42) remains clear of the dog 658, and the drive gears 444 are left in their upper position which is correct for reading out the negative number.

However, if there is a positive number in the accumulator, the arm 540 of indicator 536′ (FIG. 13) will stand clear (to the left in FIG. 13) of the ear 768 of the bail 772. Accordingly, this bail, urged by spring 780, will follow the motion of lever 776 (see FIG. 12). This action swings blocking member 654 toward the rear and puts it in position to block the ear 674 of the dog 658. Consequently, as the arm 660 rises, dog 658 rotates about its support 659 and drives the roller 678 rearward for shifting the drive gears 444 to their lower position for the readout of a positive number.

(6) *Aligning lever 792*

In FIGS. 11 and 19, an aligning lever 792 journalled at 793 is urged up by a spring 794. A pin 795 on the lever 792 underlies the lever 660 (FIG. 19). Consequently, the spring 794 holds the lever 792 up so that the pin 795 rides on the bottom of lever 660. Lever 792 includes a blade, or ear, 796 which engages the lower ends of the control levers 698 and 758 (FIGS. 12 and 42) for aligning and locking them. For example, during an "ADD" operation blade 796 (FIG. 12) lies in notch 797 of lever 698 for locking it, and this lock is released when cam 628 (FIG. 42) returns arm 680 to normal for thereby releasing the interlock pin 680 and thereby permitting lever 660 to return to normal and in so doing depresses lever 792 (FIGS. 19 and 12).

(XII) RIGHT SIDE CONTROL KEYS

The simplest machine operation is print-only (N) initiated by key 22 (FIGS. 1 and 6). The stem of this key carries a pin 810 lying above an inclined cam surface 812 on the main clutch control bar 138. When key 22 is depressed, pin 810, acting against cam surface 812, forces the bar 138 forward for releasing the main clutch for operating the machine through a single cycle, as is described in the copending applications, Serial Nos. 117,096 and 138,645, previously referred to. Since the ear 400 (FIG. 10) of the front gear pendant is normally engaged by the link 710, the operation of the machine, through one cycle, causes the cam 720, through the bellcrank 714 and link 710, to engage the pendant with the selector so that the number in the selector is transferred to the actuator for printing, and then cleared from the machine.

The addition key 14 (FIG. 11) has a stem 814 carrying a pin 816 which overlies a tongue 818 on a lever 820 fixed to the clutch control shaft 186. Accordingly, depression of the addition key 14 rotates the shaft 186 (counter-clockwise in this figure) and, through the arm 140 (FIG. 6), drives the clutch control bar 138 forward for initiating a single machine cycle. Again, because the link 710 (FIG. 10) normally engages the ear 400 of the front gear pendant 390, this action causes the number in the selector to be transferred to the actuator for printing. The pin 816 (FIG. 11) on the add key stem also carries a roller 817 which overlies a cam surface 824 (FIG. 10) on the forward end of the add-subtract link 612. The depression of the add key thus moves link 612 forward and rocks hook plate 604 (FIGS. 11 and 42) the single unit of distance required for putting the machine into an addition operation, as has been described. Consequently, the number in the selector is transferred by the actuator to the accumulator simultaneously with its receipt from the selector.

The subtraction key 16 (FIG. 10) has a stem 832 carrying a pin 834 overlying a cam edge 836 on the add-subtractor 612. Depression of the subtraction key 16 causes the pin 834 to act against the came edge 836 for driving the link 612 forward the two units of distance required, rocking the plate 604 (FIG. 42) enough to put the rear pendant control mechanism into subtract operation. Key stem 832 (FIG. 10) also carries a pin 838 which lies in a notch 840 of a rearward extending arm 842 of a bellcrank 844 which carries a pin 848 at the lower end of downward extending arm 846. As shown in FIG. 11 this pin 848 lies to the rear of a tongue 852 of a lever 850 fixed to the clutch control shaft 186. Consequently, depression of the key 16, through the bellcrank 844 and lever 850, rocks the clutch control shaft 186 (counter-clockwise as seen in these figures) and through lever 140 (FIG. 6) moves the clutch bar 138 forward for initiating a single machine cycle for entering the number from the selector subtractively into the accumulator.

The repeat (R) key 20, by itself, initiates a repeat-add operation. It is mounted on a bellcrank 916 (FIG. 10) journalled at 917. It includes an arm 918 at its rear end, having an inclined cam surface 919 which overlies a pin 920 (FIG. 6) on the clutch control bar 138. Thus depression of the repeat key 20 causes cam surface 919 to drive the pin 920 forward for releasing the clutch and setting the machine into operation. The forward arm 922 (FIG. 10) of the bellcrank 916 carries a pin 923 which lies to the rear of an upward extending arm 926 of a bellcrank 930 journalled free on the shaft 186. Another upward extending arm 927 of the bellcrank 930 lies behind a pin 932 on the add-subtract slide 612. Thus depression of the repeat key, and consequent rocking of the bellcrank 916 (clockwise in FIG. 10) also causes pin 923 to drive against the arm 926, swing the bellcrank 930 (counter-clockwise in this figure), and drive arm 927 against pin 932 for moving the add-subtract bar 612 forward the distance required for initiating an addition operation. The third arm 928 of the bellcrank 930 carries a pin 933 that is spaced below the arm 934 fixed to the repeat shaft 936 for rocking that shaft, clockwise in FIG. 10. As was described under "Single Cycle Action," this rocking of shaft 936 acts through levers 938 and 161 (FIGS. 6 and 8) to lift hook 154 clear of pin 117 on clutch dog 114 for preventing the single cycle action from disengaging the main drive clutch.

Shaft 936 also extends through to the left side of the machine where a lever 944′ (FIG. 28) is fixed to it. This lever has an ear 945 overlying a tongue 946 of a lever arm 947 of a bail 950, journalled on a shaft 953, so that when the shaft 936 is rocked upon depression of the repeat key (counter-clockwise in FIG. 28), it rocks the bail 950 (clockwise in FIG. 28). Bail 950 includes the arm 314 (FIGS. 40 and 41) which disables the selector carriage return, as previously described, by blocking the lever 264 to prevent it from rocking (counter-clockwise in FIG. 40). Returning to FIG. 28, arm 947 includes another extension 948 carrying the pin 949 which overlies the came edge 955 of the blocking bail 962 for the zero latches 199 (FIGS. 25 and 26) of the selector unit. As previously explained in connection with the selector unit, this action moves both of the bails 962 and 964 for blocking all of the zero latches 199 so that none of the selector sectors are reset to "0". Although the extension 951 is also a part of bail arm 947, it does not move far enough during a repeat operation to move the pin 956.

Accordingly, depression of the repeat key, through cam edge 919, engages the main drive clutch that puts the machine in operation, through bellcrank 930 and add-subtract link 612 sets the rear pendant control for the addition operation, and through lever 934 rocks the shaft 936 which disables the single cycle control, prevents the return of the selector unit to its home position and prevents the resetting of the sectors of the selector unit.

It is to be noted that no interlocks are required or provided between any of the keys 22, 14, 16 and 20 whose actions have just been described. The addition key 14 sets up the same controls as does the print-only key 22 and, in addition, moves the link 612. Depression of these two keys 22 and 14 simultaneously results in an addition operation. Depression simultaneously of the print-only and subtraction keys 22 and 16 similarly results in a subtraction operation. The subtraction and addition operations differ in the distance that the link 612 is moved forward, so that simultaneous depression of the two keys 14 and 16 results in a subtraction operation. Similarly, the depression of the repeat key 20 performs the actions of the print-only and addition keys 22 and 14, plus other operations, so the depression of the repeat key with either or both of the others produces a repeat operation.

For the action of the total and subtotal keys 30 and 32, reference is made to the copending applications, Serial Nos. 117,096 and 138,645, previously identified.

(XIII) OPERATIONAL CONTROL OF SYMBOLS FOR RIGHT SIDE OPERATIONS

The symbols for the operations controlled by the addition, subtraction, repeat, print-only, total and subtotal keys 14, 16, 20, 22, 30 and 32 (FIG. 1) are provided on a separate print wheel 1698 (FIG. 20) and controlled by a separate actuator sector in a well-known manner. A bail arm 1700 (FIG. 19) is provided with a series of steps 1701 for stopping the symbol actuator sector at various positions. The arm 1700 is part of a bail 1703 journalled at 1702. A second arm 1704 of this bail appears in FIG. 12. For rocking this bail during each machine cycle, a link 1705 is pinned at 1706 to the actuator gear sector 360 (FIG. 19). The other end of the link has a slot 1707 embracing a pin 1708 on the bail arm 1704. A spring 1709 urges the pin 1708 toward the forward end of the slot. Thus during the first half of each machine cycle, as the actuator gear sector 360 is rocked (counter-clockwise in FIG. 19), the link 1705 (FIG. 12) is pulled forward, and the spring 1709 pulls the pin 1708 with it for rocking the bail 1703. Stops are provided for stopping the motion of this bail 1703 in various positions for controlling the printing of the different symbols by the positioning of the shoulders 1701 (FIG. 19).

The add-subtract control lever 698 (FIG. 12) is provided at its upper end with the ear 702 which lies under the lower edge of the bail arm 1704. In the home position of lever 698, the ear 702 blocks the motion of the bail 1704 for printing a symbol "N," for indicating a print-only operation. It will be recalled that the machine is normally set for a print-only operation which can be initiated simply by engaging the power drive clutch.

It will be recalled that the addition key 14 (FIG. 1), in addition to engaging the clutch, also rocks the lever 604 (FIG. 11). The rocking of lever 604 also rocks the lever 694 (FIG. 42) which is fixed to the plus-minus shaft 696, to which the lever 698 (FIG. 12) is also fixed. This rocking of the lever 698 for additional operation aligns the ear 702 (FIG. 12) with a slot 1715 of the bail arm 1704. This is a deep slot and it permits the bail 1703 the maximum swing for printing a plus sign. For a subtraction operation, the control lever 604 (FIG. 11) and with it, the lever 698 (FIG. 42), are rocked through a greater angle. This action brings the ear 702 (FIG. 12) under an ear 1716 of the bail arm 1704 for stopping the arm 1704 in still a different position for printing a subtraction symbol.

It will be recalled that shaft 560 rocks one amount (counter-clockwise in FIGS. 12 and 42) for a total operation, and approximately twice that for a subtotal. This action rocks the control lever 758. The pin 760 carried by the lever 758 (FIG. 42) acts on a cam edge 762 of the lever 604 for rocking that lever and also lever 694 to the same position it occupies during an addition operation. Thus during a total or subtotal operation, the ear 702 (FIG. 12) is aligned with the deep slot 1715 of the bail arm 1704. The position of the arm 1704, during total and subtotal operations, is then controlled by an ear 1717 on the arm 1704, which abuts shoulders on the two lever arms 771 and 776 (see also FIG. 13). When lever 758 (FIG. 12) is rocked, its pin 778 also rocks lever 776 (clockwise in FIG. 12) and bail arm 771 (see also FIG. 13) is urged by spring 780 to follow. If the number in the accumulator is positive, the arm 540 of the credit balance indicator will not be aligned with the ear 768 on the bail 772 and consequently that bail will be free to move under the force of its spring 780 for following the movement of the lever 776. Under this condition the smaller swing of the lever 776, in response to a total operation, will swing the end abtument 1718 on the lever 771, and also the abutment 1719 on the lever 776, into alignment with the ear 1717, but the abutment 1718 will control the operation for printing the symbol "T" for a positive total. Similarly, the greater angular motion of the levers 758, 776 and 771 for a subtotal operation will align the shoulder 1720 on the lever 771, and the shoulder 1721 on the lever 776, with the ear 1717, but the shoulder 1720 will control the operation for printing a positive subtotal symbol "S."

If the number in the accumulator is negative, the arm 540 of the credit balance indicator (FIG. 13) will block the motion of ear 768 and prevent the lever 771 from moving substantially out of its home position. This action will hold the abutment 1718 and the shoulder 1720 clear of the ear 1717 so that the abutments 1719 and 1721 will control, for printing the symbols "T" and "S" for negative totals and negative subtotals, respectively.

It will be noted that these right side symbols are not controlled directly by the keys 14, 30, etc., but rather by the add-subtract shaft 696, the total-subtotal shaft 560, and the credit-balance indicator 536', which control the accumulator operations. Because of this arrangement, no extra controls are required for matching the symbols to operations initiated by the left side control keys, particularly the enter dividend operation (key 33, FIG. 1) and the printing of the divisor, quotient and remainder in the division operation, which operations will be described.

(XIV) CLEAR KEYBOARD AND BACKSPACE

The clear keyboard operation initiated by key 24 cycles the machine for clearing the selector. It is essentially a print-only operation with printing suppressed in the applications Serial Nos. 117,096 and 138,645 previously referred to.

The backspace key 26 has a key stem 1585 (FIG. 28) with a shoulder 1586 that overlies a pin 1567 of the clear keyboard key (FIG. 25) so that depression of the backspace key depresses also the clear keyboard key. The backspacing key stem 1585 also has a pin 1587 (FIG. 28) that co-operates with an inclined slot in the clutch bar 1083 so that the clutch bar locks the backspacing key 26 down. Another pin 1588 (FIG. 28) on the backspacing key stem 1585 overlies the arm 948 of the bail 950, which was described in connection with repeat operations. The backspacing key swings the bail 950 through approximately twice the angle that the setting for the repeat operation does, and so initiates additional operations. Thus, while pin 949 (FIGS. 25 and 26) rocks the bail 962 as in the repeat setting, arm 951 (FIGS. 26 and 28) now swings far enough to engage the pin 956 and prevents the bail 964 from operating, so that the lowest order of the number in the selector will be cleared. As in the repeat setting, the hook 316 (FIG. 40) swings over the ear 267 for preventing the selector unit from being driven home, and the additional motion also brings a one-order backspacing drive into operation. An arm 1591 of the bail 950 (FIG. 40) has journalled thereon a pawl 1592 which, when the bail 950 is swung through the double angle for backspace, engages rack teeth 1593 of the rack bar 242 (see also FIG. 41). The pawl 1592 is aligned with a cam 1594 on the main drive shaft 90 (see also FIG. 3). Thus, with the backspace key depressed, and the arm 1591 in its upper-most position, the cam 1594 drives the pawl 1592 during the second half of the machine cycle (FIG. 40) and through rack bar 242 and other mechanism described in connection with FIG. 41, drives the selector carriage one order to the right. The single cycle action described in connection with FIGS. 6 and 8, limits the operation to one cycle for each depression of the key. A spring-urged stop pawl 1596 (FIG. 40) is arranged to engage shoulders 1597 and 1598 of the arm 1591 during the repeat and backspace operations, respectively. A roller 1599 on the cam 270 releases this pawl 1596 as the machine returns to home position. Thus, the pawl 1596 ensures that the bail 950 remains in its operative position through substantially the whole machine cycle, and further, steadies the arm 1591 against the forces exerted on it in driving the rack 242. In its uppermost position the arm 1591 also rests against fixed pins 1601 and 1602 (FIG. 40) for further steadying it.

As will be described, the backspace action is used in the division operation, first for re-engaging the selector escapement after the divisor-aligning action, and then for shifting the divisor-by-order during the division calculation. These actions initiate the backspace action through the link 2070 (FIG. 40) connected to a depending arm 2071 of the bail 950.

(XV) ENTER DIVIDEND

With a number in the selector, an enter dividend key 33 (FIG. 1) may be depressed for entering that number at the left of the accumulator. In FIG. 25, key 33 has a stem 1875 with a cam edge 1876, shown in dotted lines, which overlies a pin 1877 on a lever 1878 journalled at 1879. The forward end of lever 1878 underlies the extension 210 (FIGS. 61 and 62) of the selector escapement lever 208. Thus depression of the enter dividend key 33, through lever 1878 (FIG. 25), rocks the escapement lever 208 (counter-clockwise in FIG. 39) for disengaging the teeth of the escapement rack 204 and releasing the selector carriage for movement to its extreme left position under the action of spring 183 (FIG. 41).

In FIG. 25, a dog 1882 is journalled at 1883 on the enter dividend key stem 1875 and urged (clockwise in FIG. 25) against a stop pin 1884 by a spring 1885. When the enter dividend key is in its lowermost position, the upper forward corner of the dog 1882 engages under a lip 1886 at the rear end of a lever 1887 journalled at 1888 and biased (counter-clockwise in FIG. 25) into the normal position, shown, by a spring 1889. When the key 33 is released, it rises and drives the dog 1882 against the lip 1886 for rocking the lever 1887 clockwise in FIG. 25. Lever 1887 includes a downward extending arm 1890 (FIG. 25) pinned at 1891 to a link 1892 which extends rearward in the machine (left in FIG. 25). At its rear end, link 1892 (FIG. 39) is aligned with a pin 1893 on a lever 1381 on the plus-minus control shaft 696. At its forward end, the lever 1887 (FIG. 25) carries a pin 1894 which extends to the left and lies above a slot 1895 (FIG. 28) in the clutch bar 1083. Thus, when the lever 1887 is rocked (clockwise in FIG. 25) by the dog 1882, as the "ENT DVD" key 33 rises, the link 1892 moves rearward against the pin 1893 (FIG. 39) for rotating the plus-minus shaft 696 and the add-subtract control lever 698 (FIG. 42) to the add position. Also, the pin 1894 (FIG. 25) moves down into the slot 1895 (FIG. 28) for driving the cutch bar 1083 forward, and through a lever 1084, shaft 186 and arm 140 (FIG. 6), moving the clutch bar 138 forward for setting the machine into operation. In a well-known manner the operation of the clutch control holds the clutch bars 138 and 1083 forward during most of the operating cycle so that slot 1895 (FIG. 28) holds the lever 1887 (FIG. 25) in its clockwise, or fully operated, position until near the end of its cycle. In the meantime, the dog 1882 (having lifted the lip 1886 of the lever 1887 for putting the machine in operation, slips past the lip 1886 so that the key 33 is free to rise to its uppermost normal position. As the cycle ends, the selector is cleared and returned to home as in an addition cycle.

As was previously explained in connection with the zero interlock for the selection unit, the cam surface 320 (FIG. 41) engages the lever 322 whenever the selection carriage is in its home position, for rocking the lever 322 (counter-clockwise in FIG. 25) and, through spring 325, rocking the lever 326. This action lifts an ear 1583 (FIG. 25) on the lever 326 into engagement with an interlock bar, not shown, for preventing, in a well-known manner, the depression of the enter dividend key 33 whenever the selector unit is in its home position. This interlock, plus the zero interlock, previously described, that prevents a "0" from being entered in the first order of the selector, ensures that the enter dividend key 33 can be operated only when a non-zero entry stands in the selector.

Thus, with a number in the selector, the enter dividend key 33 may be depressed. The depression of the key through the lever 1878 releases the selector to let it run free to its leftmost position and then, when the key is released, the dog 1882 rocks the lever 1887 for setting the add-subtract mechanism for positive entry and for cycling the machine. Consequently the most significant digit of the dividend is entered in the sixteenth order of the accumulator.

(XVI) MEMORY UNIT AND QUOTIENT REGISTER

The storage, or memory, unit, or quotient register, includes seventeen, identical, differentially settable, storage sectors 970 (FIGS. 21, 23, 25 and 43) mounted for free rotation on a common shaft 972 supported in the frame of the machine. In FIG. 21, these sectors are shown in their "0" position. Numbers are transferred between these sectors and the actuator sectors 340 by means of actuator pawls 974 pinned at 975 to the actuator sectors. Each pawl has a pair of gear teeth 976 arranged to be lifted into engagement with gear 977 in the lower edge of its storage sector 970.

As shown in FIG. 43, each sector 970 of the memory unit is provided with a detent 1055 journalled on a shaft 1056 and rocked by a spring 1057 (counter-clockwise in FIG. 43) for urging the corner of an ear 1058 at its forward end into engagement with the notched edge 1059 of an arcuate slot in the storage sector 970. Thus the ear 1058, by resting in a notch of the edge 1059, tends to hold the sector 970 in any digit position in which it is set. When the sector 970 is rotated by the pawl 974 in the entry and readout of numbers, or by the division counter, as will be described, the detent 1055 is simply rocked by the inclined edges of the notches.

(1) Operation of actuator pawls 974

The rear ends of the pawls 974 (FIGS 21 and 43) are supported and guided in slots 978 in plates which are raised and lowered for controlling the engagement and disengagement of the pawls with the teeth 977 of the sectors 970. During each operating cycle of the machine the pawls 974 are moved by the actuator segment 340, rearward during the first half of the cycle and forward during the second half.

The plates that contain the slots 978 are assembled in a basket-like structure 980 (FIGS. 21 and 25) which includes similar end brackets 981 and 982, each of which has a slot 983 at its upper end, embracing a hub on the shaft 972. The lower portions of these end plates carry trunnion rollers 985 and 986 which lie in slots 987 (FIGS. 19 and 28) in the frame of the machine. The basket 980 is thus guided by the slots 983 embracing the shaft 972 and the slots 987 embracing the rollers 985 and 986. The motion of the basket is controlled by a pair of cam follower rams 991 and 992 (FIGS. 19 and 28) having slots 993, also embracing the trunnion rollers 985 and 986. These followers carry rollers 994 which ride on right and left basket control cams 995 and 996 (FIGS. 19 and 29) on the rear drive shaft 110. Springs 997 normally urge the follower arms 991 and 992 (clockwise in FIG. 19) for lifting the basket 980 and thereby engaging the actuator pawls 974 with the sectors 970. The cams 995 and 996 each have two high portions 998 and 999 which drive the basket to its lower position at the full-cycle and mid-cycle positions.

The follower bellcranks 991 and 992 are also controlled by latches 1003 and 1004' (FIGS. 19, 28 and 29) which are fixed to the same shaft 1005 so that they operate in unison, and are normally held in the position shown by a spring 1006 which acts on a lever 1009' to urge it counter-clockwise (as viewed in FIG. 28). Lever 1009' is connected by a light spring 1011 to a pin on latch lever 1004' for normally holding the latch lever against an ear 1010' on lever 1009' (FIG. 29), but at times permitting the lever 1009' to be swung rearward without the latch 1004'. Normally the spring 1006 urges the ear 1010' forward against the rear edge of latch lever 1004' for holding this latch, and also the similar latch 1003 (FIG. 19) forward in the positions shown so that their shoulders 1015 overlie ears 1016 on the bellcranks 991 and 992 for latching the basket 980 in its lower position.

Lever 1009' can be swung rearward so that spring 1011 urges latches 1004' (FIG. 28) and with it, latch 1003 (FIG. 19) rearward for unblocking the basket-lifting cam followers 992 and 991. This action is performed during all memory input operations (keys 36, 44, 46 and 48) by a projection 1051 (FIG. 29) on a memory clearing drive link 1028 which drives against ear 1010' on lever 1009', and is performed during memory output operations initiated by key 50 by an abutment 1019 (FIG. 27) on a memory control link 1020 which drives against an ear 1018' on lever 1009', substantially in the manner described in applications, Serial Nos. 117,096 and 138,645 previously referred to. This same action is performed during memory clearing and quotient print-out in a division operation by a lever 1903 (FIGS. 27 and 28) journalled on rod 1702 and carrying a pin 1904 which drives against an edge 1905 of lever 1009', as will be described.

Latches 1003 and 1004' also have shoulders 1097 which, when the latches are moved rearward, can underlie the ears 1016 for latching the basket 980 upward. Since the cams 995 and 996 drive the basket down, these shoulders 1097 cannot be left in latching position when the cam lobes 998 come under rollers 994. Therefore, rollers 1095 and 1145 (FIG. 29) are provided on cam 996 for striking the tail 1096 of the latch lever 1004' for swinging shoulders 1097 clear of the ears 1016 just before the cams pull the basket down.

In FIG. 19, a bellcrank 1021, journalled on a pin 1022, is rocked (counter-clockwise in this figure) just before the end of each machine cycle, by a pin 1023 on cam 995. As the bellcrank so rocks, its forward end 1033 drives against an ear 1034 on the latch lever 1003, for ensuring that the latches 1003 and 1004' are firmly in the home positions.

(2) Memory clearing bail

The memory register is provided with a clearing bail 1025 (FIGS. 21 and 25) supported on bail arms 1026 fixed to the shaft 972. This bail normally lies in the position shown in these figures, and is swung rearward (counter-clockwise in FIG. 21) for rotating all of the memory storage sectors 970 to their "0" positions, in which they are shown in FIG. 21 where they stop against a frame tie rod 971. This clearing operation is utilized for clearing one number from the memory before inserting a new one, and it is also utilized as a drive mechanism for ensuring positive operation when a number is read out of the memory unit into the actuator. For operating this clearing bail, the shaft 972 carries a lever arm 1027 (FIG. 29) to which is connected the drive link 1028 which, at its forward end, has a curved slot 1029 embracing a roller 1030 carried by a rocking plate 1035', journalled at 1032.

The rocking plate 1035' is arranged to be rocked (counter-clockwise in FIG. 29) for lifting the roller 1030 for, in turn, lifting the drive link 1028. In the lifted position of link 1028, a curved shoulder, or seat, 1045 on the link lies behind a roller 1046 of the actuator gear segment 376. It will be recalled from the previous description that the gear segment 376 is rocked (clockwise in FIG. 29) during the first half of each machine cycle and then is returned (counter-clockwise in FIG. 29) to its home position during the second half of the machine cycle. Therefore, when the link 1028 is held in its lifted position by the roler 1030, the roller 1046, during the first half of the machine cycle, drives rearward against the seat 1045 of the link 1028, for rotating the shaft 972, and with it the memory clearing bail 1025 (FIG. 21) for driving the memory segments 970 to their "0" position. As the gear segment 376 rotates to its home position (counter-clockwise in FIG. 29) during the second half of the machine cycle, a spring 1047 returns the clearing bail 1025 to its normal position. The curve of slot 1029 permits link 1028 to follow the arcuate motion of roller 1046.

The rocking of plate 1035' for lifting link 1028, as just described, may be effected by the action of memory control link 1020 against pin 1036 or 1038 (FIG. 27) during an operation initiated by any of keys 36, 44, 46, 48 and 50 (FIG. 1) as described in the applications, Serial Nos. 117,096 and 138,645, previously referred to. During an antomatic division operation, a pin 1906 (FIG. 27) on the lever 1903 drives rearward against a lever 1130 which drives against the pin 1036 on the rack plate 1035'. Springs 1040 urge the pins 1036 and 1038 on rock plate 1035' against their respective shoulders 1037 and 1039 on link 1020 for centralizing the link 1020 and for holding the rock plate 1035' in its normal position, shown in FIG. 27.

(3) Input cycle

For the operation of entering a number in the memory unit, from the selector or from the accumulator, as described under "General Operation," reference is made to the copending applications, Serial Nos. 117,096 and 138,-645, previously referred to.

(4) Clearing cycle

For clearing the memory unit at the beginning of the division operation (early in the second one of four program cycles for the division operation, which will be described), a lobe 1911 of a cam 1910 (FIG. 30) engages lever arm 1912 of the lever 1903 (FIGS. 27 and 28) for rocking it (counter-clockwise in these figures). This motion of lever 1903 drives the pin 1906 (FIG. 28) against the lever 1130 for swinging it rearward. Lever 1130 drives against pin 1036 on the rock plate 1035' for rotating it, counter-clockwise in FIG. 28, for lifting the drive link 1028 (FIG. 29) to place the seat 1045 in alignment with the roller 1046 on the actuator gear 376. Although pin 1904 (FIG. 28) on the lever 1903 drives the lever 1009' rearward, lever 1004' cannot follow because a lobe 1916 of a cam 1917 (FIGS. 29 and 32) blocks the rearward movement of ear 1017 on the latch 1004' (FIG. 29). Accordingly, as the cycle begins, the drive link 1028 (FIG. 29) is driven rearward by the actuator gear 376 for driving all the memory sectors 970 to their "0" positions, their full clockwise position as seen in FIG. 25. At the same time the latches 1004' and 1003 are blocked in their normal positions, shown in FIGS. 19 and 28, so that the basket levers 991 and 992 are prevented from lifting the pawls 976 (FIGS. 21 and 44) into engagement with the memory sectors 970. Cam 1917 (FIG. 29) continues to block lever 1004' throughout the whole cycle so that the pawls 976 (FIG. 21) are kept disengaged from sectors 970. Accordingly no number is entered, and the memory is left clear, with all its sectors at "0."

(5) Readout cycle

One occasion for reading the number out of the memory unit is the printing out of the quotient in a division operation. This action occurs in the third division program cycle, that is, the first of the two programmed print-out cycles that follow the completion of the division calculation. At the beginning of this cycle a second lobe 1913 of cam 1910 (FIG. 30) engages the arm 1912 and rocks the lever 1903 (FIG. 28) similarly to the action in the clearing cycle. However, for readout, lobe 1916 of cam 1917 (FIG. 32) is clear of the ear 1017 of the lever 1004' so that, as lever 1009' is driven rearward, the latch lever 1004', and with it the lever 1003, is free to follow it under the force of spring 1011. Accordingly the latch levers disengage the ears 1016 of the cam follower levers 991 and 992 (FIGS. 19 and 29).

The cams 995 and 996 (FIGS. 19 and 29) quickly run out from under the rollers 994 to permit the springs 997 to lift the basket 980 for raising the pawls 976 (see also FIG. 43) into engagement with the memory sectors 970, and spring 1011 pulls the latch levers 1004' and 1003 rearward to latch ears 1016 in their upper position. Promptly thereafter, the actuator gear segment 376 (FIG. 29) begins rotating (clockwise in this figure) for swinging the actuator bail 344 (FIG. 21) down and driving the actuator segments. At the same time roller 1046 (FIG. 29) drives rearward against the drive link 1028 for driving the clearing bail 1025 (FIG. 21) of the memory unit rearward. It is to be noted that the drive exerted by the actuator bail 344 (FIG. 21) is a yielding drive in that it drives through the spring-loaded, sickle-shaped levers 345, whereas, the clearing bail 1025 of the memory unit positively drives all the memory sectors 970 to "0" and so ensures that the number is properly transferred to the actuator unit.

At mid-cycle the cam lobes 999 must pass rollers 994 and, therefore, the hooks 1097 must release ears 1016 of bellcranks 991 and 992 (FIGS. 19 and 29). As link 1028 approaches its rear position, projection 1051 (FIG. 29) comes against ear 1010', but lever 1009' is already held in its extreme rear position by lever 1903. Accordingly as the machine approaches mid-cycle, the roller 1145 on the cam 996 (FIG. 29) strikes the tail 1096 of the lever 1004' for disengaging the latch shoulder 1097 from the ear 1016 of the bellcrank 992, and similarly disengages the latch lever 1003 from the bellcrank 9991 of FIG. 19. Then as the lobes 999 pass the rollers 994, the basket is lowered for disengaging the pawls 976 (FIG. 44) from the storage sectors 970, and immediately raised for re-engaging them. During this temporary disengagement, the memory sectors 970 are held in their "0" positions by the clearing bail 1025, and the actuator sectors 340 are held by the detents or back-up pawls 466 (FIG. 21), as previously described. At this mid-cycle, the number thus brought into the accumulator from the memory storage unit is printed in a well-known manner. As the machine goes into the second half of the cycle, the basket 980 is again in its upper position so that the pawls 976 are in engagement with the memory sectors 970 for connecting them to the actuator. During this second half-cycle, the actuator bail 344 (FIG. 21) moves up to its home position and positively drives all of the actuator sectors 340 to their "0" positions, and in so doing, transfers the number back to the sectors 970 of the memory unit. As the machine approaches its full-cycle position, the roller 1095 (FIG. 29) on cam 996 strikes the tail 1096 of the latch lever 1004' for unhooking the basket bellcranks 991 and 992, as previously described. The basket is then lowered by the cams 995 and 996 as they come to their home position. Also, at the end of this cycle, lobe 1913 (FIG. 30) runs out of engagement with arm 1912 of lever 1903 (FIG. 28) so that this lever returns to its home position and permits latches 1003 and 1004' and drive link 1028 to return to their home positions, shown in FIGS. 27 and 28.

An operation of printing out the number from the memory, under control of the "MO" key 50, is similar, and is described in the copending applications Serial Nos. 117,096 and 138,645 previously referred to.

(XVII) GENERAL OPERATION IN DIVISION

With the divisor in the selector, the division (÷) key 34 may be depressed. The depression of the key engages a clutch 1264, 1265 (FIGS. 23 and 41) for connecting the selector carriage with a rear carriage 1194 that is associated with the memory unit. The machine first goes through two division preparatory cycles under control of cams on the division program shaft 100 (FIGS. 5, 30, 32, 33 and 35). During the first of these two cycles the divisor in the selector is printed with a division symbol. Shortly after the mid-point of this first cycle, the escapement lever 208 (FIG. 62) of the selector is rocked for releasing the selector carriage, and the rear carriage which is clutched to it, to let them run free to the left for the divisor aligning operation. Usually, the carriages are stopped by the mechanism of FIG. 57 with the divisor in the selector in correct alignment with the number in the accumulator. However, if the dividend is too far to the right in the accumulator, aligning will be impossible and the carriages will be blocked as in FIG. 58.

In the second cycle, printing is blocked, the memory is cleared, and a back-space operation takes up the lost motion in the carriage mechanism (FIG. 41) to let the selector escapment tooth re-engage. During the division calculation which will follow, the position of the two carriages is to be controlled by the selector escapement. Also in the second cycle, a second test is made of the accumulator (FIG. 59). If there is a non-zero digit in the seventeenth order, or if the credit balance indicator 536' is at negative, the problem will be rejected. Near the end of the cycle, a main division lever 1936 (FIGS. 32, 45 and 48) is set and, if the problem is not rejected, this division lever is latched. The setting of this lever interrupts the operation of the program shaft and unblocks various division controls. With the program shaft stopped in "division-calculate" position, the machine is shifted to high speed, and printing continues to be blocked.

With the division lever 1936 latched in its set position, the division calculation proceeds under control of the sign indicator 536' of the accumulator (FIGS. 13 and 59). If, at the beginning of a cycle, the indicator 536' stands at positive, the divisor is subtracted from the dividend in the accumulator, and such subtractive cycles continue until an overdraft occurs, that is, until the number in the accumulator turns negative. Then with the sign indicator 536' at negative, the divisor in the selector is entered additively in the accumulator for restoring the overdraft. This addition occurs in the first half of the cycle, and during the second half of the same cycle, the carriages are backspaced for, in effect, dividing the divisor by "10."

In general, this one addition cycle will carry the accumulator through "0" and set the indicator 536' to positive so that the subtractive operation proceeds similarly in the next order.

A division counter ratchet pawl 2115 (FIGS. 18 and 21) is moved rightward by the rear carriage 1194 from one to the next of the memory sectors 970 as the selector carriage is backspaced. The operation of the counter ratchet is timed so that it makes no count for the first subtraction cycle in each order but counts all subsequent subtractions including the overdraft. It makes no count in the addition cycle. In the next order it again omits the count of the first subtraction cycle. This counting pattern, with the aligning operation and the requirement for "0" in the seventeenth order, permits the operation of the quotient register, or memory, without a tens-transfer. Thus in each order, the count entered in the memory is equal to the net number of subtractions.

This automatic calculation routine can begin and continue only while the main division lever is latched. If the problem must be rejected because the accumulator has a non-zero in the seventeenth order, or because the credit balance indicator 536' stands at negative, the latch is lifted and the calculation never begins. The latch of the main division lever will be released for ending the calculation when a backspace operation attempts to carry the rear carriage to the right beyond its home position. This action occurs when the calculation has run full length. It also occurs for ending an attempted calculation promptly when aligning is impossible (FIG. 58), as when the dividend is at the right side of the accumulator.

The main division lever 1936 will also be unlatched for ending the calculation as soon as a "0" remainder has been obtained, that is, when the number in accumulator has been reduced to exactly "0." When the restoration of the overdraft leaves the accumulator at "0," it will be a "negative 0," and in this one situation, the sign indicator 536' will remain at "negative" after an addition cycle. The machine responds to the two successive negative indications for stopping the calculator with a "0" remainder.

If the division stop (DIV STOP) key 35 (FIG. 1) is depressed at any time after the depression of the division key 34, a tripping mechanism is set that unlatches the division lever at the next occurrence of an addition cycle which restores the overdraft in the division calculation.

The release of the main division lever 1936 in any of these situations, blocks the various calculating controls, and causes the division program shaft 100 to resume operation. Thus upon termination of the calculating routine, or immediately after the two preparatory cycles if the problem is rejected, the machine begins the division print-out, consisting of two cycles controlled by the cams on the program shaft 100, during which action, printing is unblocked and the machine runs at low speed. In the first of these print-out cycles, the quotient is printed out of the memory and then transferred back to the memory where it remains at the end of the operation. During the second of these cycles, the remainder is printed out in a total operation for leaving the accumulator clear, the divisor is cleared out of the selector, the two carriages are unclutched, and the selector and rear carriage are returned home.

Division can be attempted with any number that happens to be in the accumulator, or with "0" as a dividend, but typically the dividend will have been entered by an enter dividend operation initiated by key 33 (FIG. 1) and will be printed with a plus symbol. An interlock prevents a depression of the division key 34 when there is no number in the selector, and so prevents any attempt to divide by "0."

The symbols "N÷" will be printed with both the divisor and the quotient. The remainder will be printed out with the symbols "T+," except that a "0" remainder will be indicated as negative, thus: ".00T—." The record of the division operation for a rejected problem, or one in which aligning was impossible, will consist of the divisor, a "0" quotient, and the full dividend as a remainder.

(XVIII) REAR CARRIAGE

The carriage frame 1194 (FIGS. 23 and 41) at the rear of the machine, slides on the two transverse rails 1251 and 1252 (FIGS. 21, 23 and 25). This carriage carries the multiplier sensors 1150 (FIGS. 22 and 23), 1160 (FIGS. 21 and 23), and 1165 (FIGS. 23, 24 and 25), as described in the copending applications Serial Nos. 117,096 and 138,645 previously referred to. It moves, but does not carry, the division counter pawl 2115 (FIGS. 16, 18 and 21). Carriage frame 1194 is biased toward the left of the machine by a spring 1253 (FIGS. 23 and 24). A gear rack 1254 (FIGS. 23 and 41), carried by the carriage frame 1194, is in mesh with a spur gear 1255 (see also FIG. 28) on a shaft 1256 which carries a bevel gear 1257 in engagement with a second bevel gear 1258 fixed to a shaft 1259 (see also FIG. 38).

(1) Carriage clutch

Shaft 1259 has a square portion carrying a sliding, toothed, clutch plate 1264 with a grooved hub engaged by a control bellcrank 1262 (FIGS. 23, 38 and 41). The teeth of clutch plate 1264 are arranged to engage the teeth 1265 of a spider fixed to the gears 246 and 250. As was previously described in connection with FIG. 41, gears 250 and 246 are connected through rack bars 242 and 232 to the frame 179 of the selector unit. Thus during multiplication and division, the clutch 1264, 1265 serves to connect the rear carriage with the selection unit carriage, which will contain the multiplicand or the divisor.

The right-hand end 1266 of the bellcrank 1262 (FIG. 38) engages the upper end of a lever 1267' journalled at 1268 (FIGS. 36 and 37). Lever 1267' has an ear 1269 at its lower end, by which it is engaged for operation by bar 1050 (FIG. 37) upon initiation of a multiplication operation, as described in the applications, Serial Nos. 117,096 and 138,645 previously referred to. An arm 1277 of lever 1267' is arranged to be engaged (FIG. 36) for setting the clutch for division, as will be described. A spring 1270 (FIG. 36) at the lower end of the lever 1267', biases the lever end 1266 (FIGS. 38 and 41) forward for biasing the plate 1264 away from, and clear of, the spider 1265 for disconnecting the rear carriage from the selector unit. A latching bellcrank 1271 (FIG. 37) carried on the same journal 1268 as lever 1267', has a depending arm 1272 which is connected by a spring 1273 to the lever 1267', for biasing the bellcrank 1271 (clockwise in FIG. 37) and for normally holding it against a stop 1274. When in this normal position, the latch 1271 intercepts a pawl 1275 which is fixed to the shaft 1259. Since shaft 1259 (FIGS. 38 and 41) is geared to the rear carriage 1194, this engagement of the pawl 1275 (FIG. 37) by the latch 1271, prevents leftward movement of the rear carriage. Specifically, the parts are so adjusted that the latch 1271 holds the multiplier sensors 1150 and 1160 (FIG. 23) and the division counter 2115 (FIG. 21) in alignment with the first, right-hand, or lowest order of the memory unit, which constitutes the home position of the rear carriage.

When a multiplication or division operation is initiated, the lever 1267' is turned (counter-clockwise in FIG. 37), and as it turns, it immediately begins moving the clutch plate 1264 (FIG. 38) for bringing it into engagement with the spider teeth 1265. Considerable lost motion is provided between the lever 1267' (FIG. 37) and the lower arm 1272 of the latch 1271, so that that latch does not move immediately. Consequently, as the lever 1267' is swung (counterclockwise in FIG. 37), the spring 1273 continues to hold the latch 1271 in engagement with the pawl 1275. After the clutch 1264, 1265 has been firmly engaged, the lever 1267' abuts an ear 1276 on the arm 1272 and withdraws the latch 1271 from the pawl 1275, thereby freeing the rear carriage 1194 for movement with the selector unit during the multiplication or division operation.

(2) *Homing the rear carriage*

At the end of the multiplying or division operation, the lever 1267' will be restored to its normal position shown in FIG. 36. This action will disengage the clutch 1264, 1265 (FIG. 38) and will restore latch 1271 to its pawl-intercepting position. However, the pawl 1275 may be out of its normal position, and if so, the carriage 1194 will run free (FIGS. 24 and 41) under the force of the spring 1253, toward the left until roller 1281' on the frame 1194 abuts the upper end 1282' of a restoring lever 1283'. The lower end of lever 1282' is connected by a link 1288 (FIGS. 24 and 41) to a slide 1289 which has a rack meshing with a pinion 1290. In mesh with pinion 1290 is a gear sector 1291 fixed to a pinion 1292 which is in mesh with a sector 1293 journalled on pin 1294. Sector 1293 carries a pin 1295 which is held by a spring 1296 against the edge of a sector 1070' also journalled on pin 1294. Teeth 1071 of sector 1070' mesh with similar teeth 1072 of a segment 1073 (FIGS. 40 and 41) of a bellcrank 1074'. The bellcrank 1074', includes an upward extending arm carrying a gear segment 1076 in mesh with gear 250 which, as previously described is continuously coupled to the selector carriage. As the selector carriage is restored toward the right of the machine, lever 1283' is rocked (counter-clockwise in FIG. 24) for driving the carriage 1194 to the right of the machine (toward the left in FIG. 24). It will be recalled from the applications previously referred to that the selector unit, when restored, is moved to the right beyond its home position. This motion similarly carries the rear carriage 1194 to the right beyond its home position, and in so doing, swings the pawl 1275 (clockwise in FIG. 36) through the position shown in that figure. The pawl 1275 rocks the latch 1271 down and then catches behind it. This action leaves the rear carriage 1194 in its rightmost, or home position.

The spring 1296 (FIG. 41) provides a force-limiting resilience in the power train that drives the rear carriage 1194 to its home position. A spring 1297 (FIG. 24) takes up the backlash in the train from lever 1283' to the rack 232 (FIG. 41) connected to the selector carriage, particularly for ensuring the proper positioning of a plate 1066' (FIG. 24) which is used in an over-capacity test for multiplication, as described in the copending applications, Serial Nos. 117,096 and 138,645 previously referred to.

(XIX) DIVISION PROGRAM SHAFT AND MAIN DIVISION LEVER

The division program shaft 100 (FIG. 5) is driven from the rear drive shaft 110 through gears 107 and 108 and the clutch comprising the ratchet 109 and pawl 99. It turns at one-fourth the speed of drive shafts 90 and 110, that is, at one-quarter turn per machine cycle. As shown in FIG. 35 the clutch pawl 99, in its home position, is held clear of the ratchet 109 by an arm 1930 of a bell crank 1931 journalled at 1932. Upon depression of the division key 34 (FIG. 1), as will be described, the bellcrank 1931 is rocked (clockwise in FIG. 35) for releasing the pawl 99 for engagement with the the ratchet 109, and at the same time, the machine is put into operation. As the machine operates through the first two cycles, the program shaft 100 (FIGS. 5 and 35) turns through one-half revolution. Late in the second of these two cycles, a lobe 1933 on a cam 1934 (FIGS. 5 and 32), rotating clockwise in FIG. 32, engages a tip 1935 of the main division lever 1936 which is fixed to the shaft 1702 which is biased clockwise by a spring 1937 (FIG. 35). The engagement of lobe 1933 with the tip 1935 is indicated by the dotted line position 1933–a in FIG. 48. This action rocks the lever 1936 (counter-clockwise in FIG. 32) for setting the machine for the division calculation. Lever 1936 is latched in its position, as shown in FIG. 48, by a latch 1940 journalled at 1941 and biased (counter-clockwise in these figures) by a spring 1942.

Also fixed to shaft 1702 is a clutch dog 1943 (FIG. 35) which, when lever 1936 and shaft 1702 (FIG. 32) are rocked counter-clockwise to the division-set position, swings into the position shown in FIG. 48 for intercepting the clutch pawl 99. As pawl 99 rotates against the dog 1943 at the end of the second cycle, it disengages the pawl 99 from the ratchet 109 and stops the operation of the division program shaft. The division calculation takes place while the clutch 99, 109, lever 1936 and dog 1943 are in this position shown in FIG. 48.

The division calculating routine is stopped by an operation of the latch 1940 (FIG. 48) for releasing the lever 1936 and thereby permitting the dog 1943 to disengage the clutch pawl 99. This action permits the pawl 99 to re-engage the ratchet 109 so that operation of the program shaft 100 is resumed. During the two cycles required for driving the division program shaft home, the cams on the program shaft control the print-out of the quotient and the remainder, as will be described.

(XX) DIVISION KEY

The division key 34 (FIG. 1) is depressed for initiating the automatic division operation. Its depression without a number in the selector is prevented by the same interlock bar (not shown) that is interlocked with the ear 1583 (FIG. 25), as explained under "Enter Dividend." This action, plus the zero block 330, permits the division key to be depressed only when there is a non-zero entry in the selector, and so prevents any attempted division by "0."

Key 34 has a key stem 1950 (FIG. 31) guided on pins 1951 and biased upward by a spring 1952. A pin 1953 (FIG. 35) extends to the right from the key stem 1950 for engagement with a slot 1954 (FIG. 28) in the clutch bar 1083, so that depression of the key 34 initiates operation of the machine, and the clutch mechanism locks the bar 1083 forward and the key 34 down in a well-known manner.

A second pin 1955 (FIG. 35) on the division key stem 1950 extends to the left, and controls a lever 1957 (FIG. 34) which is journalled at 1958 and biased (counter-clockwise in FIG. 34) by a spring 1959. A pin 1961 on lever 1957 stops against a division control bar 1962. A live tip 1960 is journalled on lever 1957 at 1965, and is biased (counter-clockwise in FIG. 34) by a spring 1963 against a stop pin 1964 on lever 1957. A slot 1966 in the live tip 1960 contains the pin 1955 on key stem 1950.

The front division control bar 1962 (FIG. 35) is supported on a link 1971 journalled on the shaft 953, and at its rear end is connected to a rear division control bar 1972 which is guided on two pins 1973. At 1974, the bar 1972 is connected to the lever 1931, arm 1930 of which constitutes the home dog for clutch 99, 109 of the division program shaft 100, as was described. A hook 1975 (FIG. 35) at the rear end of bar 1972 is aligned with a pin 1976 on a lever 1977 (FIG. 32) that carries a roller 1979 that rides the cam 1917 on the division program shaft 100.

Near it forward end, the division control bar 1962 (FIG. 34) has a shoulder 1985 which, in the home position shown, rests against the pin 1961 on the lever 1957. Pin 1961 thus defines the home position of the bars 1962 and 1972, which are urged forward by a spring 1970 (FIG. 35). The rear end of lever 1957 (FIG. 34) carries a roller 1986 which lies behind a cam edge 1987 of an arm 1988 of a bellcrank 1989 journalled on the shaft 953. A second arm 1990 of the bellcrank 1989 overlies a tongue 1413 of the lever 944' on the shaft 936 (see also FIG. 28) which may be rocked for putting the machine into repeat condition, that is, for disabling the single cycle action and for preventing the selector from being cleared, as has been described.

Figure 53:
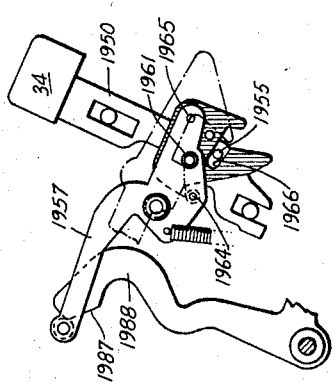
Figure 52:
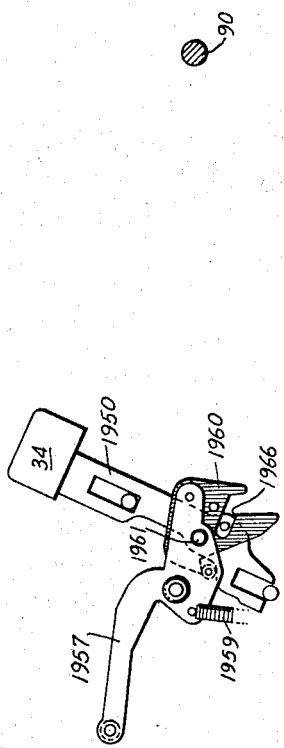

The action of the lever 1957 and its live tip 1960 is shown in FIGS. 52, 53, 54 and 55. In FIG. 52 the parts are shown in their home position. In FIG. 53 the key 34 is partially depressed. There, the pin 1955 on the stem 1950 driving against the lower edge of the slot 1966 of the live tip 1960 has caused the lever 1957 to rotate (clockwise in these figures) for lowering the pin 1961 with respect to the shoulder 1985 on the division control bar 1962. This motion of lever 1957 has swung the arm 1988 of the bail 1989 (see also FIG. 34) forward for rotating the arm 944' and the shaft 936 for setting the machine to repeat condition.

The direction of the force applied by the pin 1955 against the edge of the slot 1966 is so aligned with journal 1965 of the live tip 1960 that this action tends to hold the live tip 1960 against its stop pin 1964 so that the pin 1965 continues to drive the forward end of the lever 1957 downward. As the depression of the key 34 continues, the pin 1961 descends below the shoulder 1985 (FIG. 54) and thereby releases the division control bar 1962 to move forward under the action of its spring 1970. The division control bars 1962 and 1972 stop with the hook 1975 (FIG. 35) against the pin 1976 of the lever 1977 (FIG. 32) so that the position of the control bars 1962 and 1972 are now controlled by the cam 1917. This action drives the key 34 to its fully depressed condition, and puts the parts in the position shown in FIG. 54.

Pin 1955 (FIG. 35) on the division key stem 1950, as shown in FIG. 31, also overlies a forward extending arm 1956 of a left side symbol control lever 1746'. Depression of the division key rotates the lever 1746' (clockwise in FIG. 31) for controlling the printing of the division symbol (÷), as will be described.

The forward motion of bars 1962 and 1972 has also engaged the carriage clutch 1264, 1265 (FIGS. 38 and 41). A pin 1980 (FIGS. 35 and 36) on the link 1972 lies in a slot at the upper end of an upward extending arm of a bellcrank 1981 journalled at 1982. A rearward extending arm of this bellcrank has a pin 1983 underlying the arm 1277 of the lever 1267' (see also FIG. 38). Accordingly, the forward movement of bar 1972 (FIG. 35) rocks the bellcrank 1981 (clockwise in FIG. 36) for rocking lever 1267' (counter-clockwise in FIG. 36). As previously described, this action of lever 1267' through bellcrank 1262 (FIG. 38), moves the clutch plate 1264 into engagement with the teeth 1265 for connecting the rear carriage to the selector carriage (FIG. 41), and it also disengages latch arm 1271 (FIG. 37) from the pawl 1275 for releasing the rear carriage for movement leftward out of its home position.

With key 34 fully depressed, the machine begins operation and with the bar 1972 (FIG. 35) pulled forward, the dog 1930 is free of the clutch pawl 99 so that the program shaft 100 rotates at a speed of a quarter turn per machine cycle. During the first half of the first cycle the divisor is transferred from the selector to the actuator for printing, and at about mid-cycle the roller 1979 (FIG. 32) drops from the initial dwell 2002 to a second dwell 2003 for permitting the division control bar 1962 to be pulled forward by its spring 1970 to a selector release position. In this position a dog 2004 (FIG. 35), journalled at 2005 on the control bar 1962 and guided on the upper pin 1951, has swung counter-clockwise beyond the position shown in 217 (FIG. 54) for lifting the end 210 of the selector carriage pawl 208 (FIGS. 61 and 62). This action disengages the holding pawl 209 from the escapement rack 204 of the selector carriage and permits the carriage to run free to the left for the division aligning operation, which operation will be described. The forward movement of bars 1962 and 1972 causes an excess rotation of bellcrank 1981 (FIG. 36), but at this time, the roller 1983 is in engagement with an edge 1984 of the lever arm 1277 that lies substantially parallel to the motion of roller 1983, so that substantially no additional motion is imparted to lever 1267' or the carriage clutch mechanism.

Figure 55:
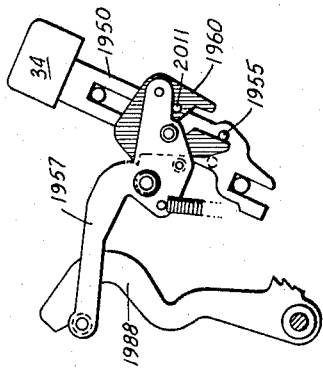

Shortly after the beginning of the second machine cycle a rise 2008 (FIG. 32) of cam 1917 comes under the roller 1979 for driving the bar 1962 rearward for returning the parts to the position of FIG. 55. During this second cycle the division aligning is completed and the accumulator is tested for the acceptance or rejection of the problem, as will be described. Also, late in this second cycle, if the problem is not rejected, the division lever 1936 (FIG. 32) is set by the cam 1934 and latched (FIG. 48), as previously described, and this action places the dog 1943 in position for intercepting the clutch pawl 99 (FIG. 48) and stopping the operation of the division program shaft 100 at the end of the second machine cycle. However, the operation of the machine continues for the calculation, during which the roller 1979 (FIG. 32) rests on the dwell 2009 of cam 1917, and the lever 1957 remains in the position shown in FIG. 55.

At the end of the division calculation, as will be described, the latch 1940 (FIG. 48) releases the division lever 1936 for, among other things, withdrawing the dog 1943 (see also FIG. 35) and permitting the clutch pawl 99 to re-engage ratchet 109 so that operation of the program shaft 100 resumes. During this first cycle of resumed operation (the third program cycle) of shaft 100, the quotient is printed out.

Figure 54:
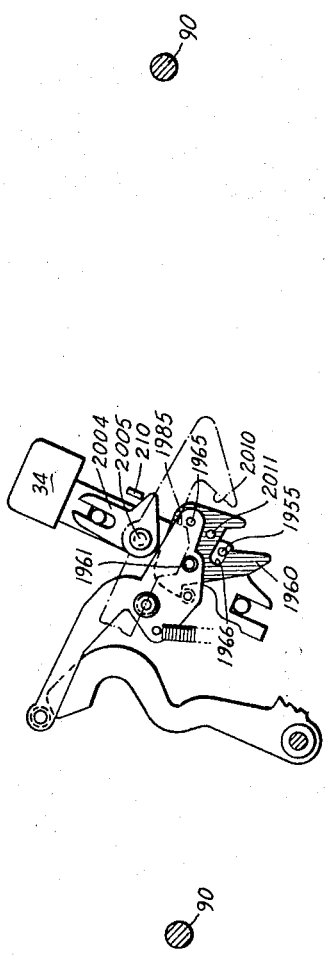

At the beginning of the next cycle, the fourth program cycle and the last cycle of the division operation, the lobe 1916 (FIG. 32) of the cam 1917 comes under the roller 1979 and drives the division control bars 1962 and 1972 rearward past their home position to an overstroke position. In FIG. 54, this action drives a hook portion 2010 at the forward end of the bar 1962 rearward against a pin 2011 on the live tip 1960 for rotating the live tip (clockwise in FIG. 54) about its journal 1965 for carrying the slot 1966 free of the pin 1955 on the division key stem 1950. In this situation, the control bar 1962 being rearward of its home position, the shoulder 1985 is to the rear of the pin 1961 and the live tip 1960 is free of the pin 1955. Consequently the lever 1957 is free to rotate (counter-clockwise in FIG. 54) to its home position under the action of its spring 1959. The return of the lever 1957 to its home position, as shown in FIG. 55, lets the arm 1988 return to home and returns the repeat control lever 944' (FIG. 34) to its home position. This release of lever 944' occurs near the beginning of the fourth program cycle, and so occurs well after the machine is committed to the fourth cycle (by the failure of hook 154, FIG. 8, to engage pin 117 at about the five-sixths position of the third cycle) but in ample time for causing hook 154 to set the clutch dog 114 (FIG. 8) for stopping the machine at the end of this fourth cycle. The release of lever 944' also occurs early enough to return the bails 962 and 964 (FIGS. 25 and 26) and the lever arm 314 (FIGS. 40 and 41) to home for letting the selector be cleared and the carriages returned home during this fourth cycle. The clutch control mechanism continues to hold the clutch bar 1083 (FIG. 28) forward so that pin 1955 and the key 34 are still locked down.

As this last cycle is completed the cam 1917 (FIG. 32) completes its rotation, and the lobe 1916 runs out from under the roller 1979 for releasing the division control bars 1962 and 1972 from their overstroke position so that they return under that action of the spring 1970 (FIG. 35) to their home position in which the shoulder 1985 rests against the pin 1961 on the lever 1957. As the operation ends, the main clutch mechanism releases the pin 1955 for letting the key 34 rise to its normal position. The pin 1955, in rising, lets the symbol control arm 1956 (FIG. 34) return to its home position.

(XXI) ALIGNING THE DIVISOR WITH THE DIVIDEND

The clutch plate 98 (FIG. 5) serves as the cam for controlling a divisor aligning operation, a dividend test, and a backspacing operation during the two, programmed, division-preparatory cycles.

As shown in FIG. 33 a lever 2016, journalled at 2017 and biased by a spring 2018, has a roller 2019 that rides the cam edge of the clutch plate 98. The lower end of this lever 2016 is connected by a link 2020 to a bellcrank 2022 fixed to a shaft 2023. A bail 2024, also fixed to the shaft 2023 (FIG. 57), controls a series of sensing levers 2025 and probes 2026 for testing the accumulator (see also FIGS. 21, 24 and 25). A lever 2025 and a probe 2026 are provided for each register wheel of the accumulator except the lowest and the highest orders, that is, for the second to sixteenth orders, inclusive. (A similar lever and probe for the seventeenth order come into operation during the dividend test as will be described.) Each of the register wheels for the second to sixteenth orders has two notches 2027, one of which is aligned with probe 2026 when the register wheel stands at either of its two "0" positions. Each sensing lever 2025 is urged forward against the bail 2024 by a spring 2028.

In the home position of the cam plate 98 (FIG. 33), and therefore in the home position of the bail 2024 shown at 2024–a in FIG. 63, the sensing probes 2026 are withdrawn rearward and held clear of the register wheels 448' of the accumulator. As the machine begins a division operation in response to the depression of the division key 34, the division program shaft rotates, as previously described, and a rise 2040 of the cam plate 98 (FIG. 33) quickly comes under roller 2019 of the lever 2016 for rocking the bail 2024 to the divisor-aligning position 2024–b (FIG. 63). The springs 2028 urge the sensing levers 2025 to follow this motion of the bail 2024. Each register wheel 448' that stands at "0" will have one of its notches 2027 in alignment with the forward end of its probe 2026, and the forward motion of the probe into the notch will permit the probe to be carried to a forward position, such as shown for probe 2026–a in FIGS. 57 and 63. Probes that encounter register wheels standing in any position other than "0" will be stopped in a more rearward position, such as the position of probe 2026–b in FIGS. 57 and 65. Each sensing lever 2025 includes an ear 2041 which extends to the left and behind its neighbor in the next higher order (right in FIG. 57) so that the neighbor can hold it rearward. Thus in FIG. 57 the probe 2026–c is aligned with a notch 2027 of its register wheel, but its sensing lever 2025–c is held rearward by the lever 2025–b just to the left of it (right in FIG. 57) and lever 2025–c will, in turn, hold the lever of the next lower order (left in FIG. 57) rearward, which will hold the next one, etc. Accordingly, the lever, such as 2025–b, at the highest non-zero order (highest significant order) and all orders below it, will be held rearward, and since all higher orders of the accumulator (to the right in FIG. 57) will be at "0," their levers, such as 2025–a, will move forward.

Each sensing lever 2025 (FIG. 57) includes an upward extending ear 2042 which, when in its forward position, such as shown for ear 2042–a, can provide a stop for a projection 2043 on a slide 2044 (FIG. 4). Rack 2044 is geared to the pinion 1290 which, as previously described, is geared through the sector 1070' and the mechanism in FIG. 41 to the selector carriage. The projection 2043 is at all times aligned with the leftmost, or highest, order of the selector, and because of the zero interlock 330 (FIG. 25) previously described, that leftmost order will contain a non-zero digit.

Promptly after the bail 2024 has been moved to the divisor aligning position 2024–b (FIG. 64) for sensing the second to sixteenth orders, as shown in FIGS. 57, 64 and 65, the end 210 (FIGS. 53 and 61) of the selector escapement latch is lifted for letting the selector run free to the left, as was described. This motion of the selector carriage carries the projection 2043 (FIGS. 24 and 57) leftward with it and the motion continues until the projection 2043 strikes an ear 2042 in the forward position, or until the selector runs to the end of its travel. (Although a sensing lever 2050, FIG. 66, to be described, in the seventeenth order has an ear 2048 similar to the ears 2042, FIGS. 57 and 60, that ear does not serve as a stop for the selector in the division-aligning operation, because the selector reaches the left end of its travel before projection 2043, FIG. 57, reaches ear 2048.)

If the dividend was placed at the extreme left of the accumulator, as described under the heading "Enter Dividend," the selector carriage will run to the end of its travel. In other situations, if the highest order of the selector lies to the right (left in FIG. 57) of the highest non-zero order of the number (dividend) in the accumulator, the projection 2043 will be stopped, as in FIG. 57 (stopped by ear 2042–a in that figure) with the highest orders of the dividend and divisor in alignment. Since the clutch 1264, 1265 (FIG. 41) was engaged by the action of the division (÷) key 34 for connecting the two carriages, the rear carriage 1194 moves leftward with the selector during this divisor aligning operation.

If the highest order of the selector lies to the left of the highest non-zero order in the accumulator, a situation, such as that shown in FIG. 58, will arise, in which alignment is impossible. There, the highest non-zero order is the one tested by probe 2026–f, and for proper alignment, projection 2043 should stop against ear 2042–e. But because the selector has digits entered in too many orders, projection 2043 was too far left (right in FIG. 58) before the bail 2024 was rocked forward for the test of the accumulator. As shown in FIG. 58, the forward movement of ear 2042–e is blocked by projection 2043, and that projection stops against the next ear 2042–d. In this situation the machine cannot perform the division calculation. Since the selector cannot move to the left, the rear carriage is left in its home position and the attempted calculation will be terminated after a single subtraction and addition.

(XXII) BACKSPACE AFTER DIVISOR-ALIGNING

During the aligning operation just described, bellcrank 2022 (FIG. 35) occupies position 2022–b. At about the middle of the second program cycle, a rise 2045 of cam plate 98 runs under roller 2019 for rocking bellcrank 2022 to position 2022–c. In this motion, bellcrank 2022 engages an ear 2066 of a bellcrank 2067, which has a square stud 2068, and rocks it (counterclockwise in FIG. 35) about a journal 2069. As shown in FIG. 40, the link 2070, connected to the depending arm 2071 of the bail 950, has a hook portion 2072 overlying the stud 2068. When the bellcrank 2022 (FIG. 35) is rocked to the position 2022–c, stud 2068 (FIG. 40) pulls link 2070 rearward for setting the backspace mechanism, which then operates in the latter part of that same cycle, the second program cycle.

The purpose of this backspace operation is to permit the selector escapement lever 208 (FIG. 62) to engage the proper tooth-space of the carriage rack 204. When the slide 2044 (FIG. 24) stops the aligning motion, the slack, or backlash, in the several gear pairs connecting that slide to the selector frame 179 (FIG. 41), lets the selector overrun its correct position. The backspace operation takes up this slack and lets the escapement engage properly.

When the alignment operation takes the selector to its extreme left position, the selector cannot overrun, and in that situation, the backspace operation is prevented by an ear 2073 on the bellcrank 1074' (see also FIG. 41), which engages an ear 2074 on the link 2070 (FIG. 40) for lifting the hook 2072 clear of the pin 2068.

(XXIII) TESTING THE DIVIDEND

The movement of bellcrank 2022 to position 2022–c (FIG. 35) for the backspace operation just described, also moves the bail 2024 (FIGS. 58 and 63) forward to position 2024–c for testing the acceptability of the dividend.

For this test, bail 2024 carries a pin 2051 on which is journalled a lever 2052 (FIG. 59) that carries a fulcrum pin 2053 that lies in a hole 2054 in a sensing lever 2050 in the seventeenth order. The lower end of this lever 2052 carries a pin 2055 which lies in front of a hook portion 2057 of a link 2058 which, as shown in FIGS. 30 and 32 is connected to the lower end of a tail 2059 of the latch 1940 for the main division lever 1936.

When the bail 2024 is swung to its extreme forward position indicated at 2024-c in FIG. 63, pin 2051 is carried forward and rocks the lever 2052, clockwise in FIGS. 59 and 63, about its fulcrum pin 2053 to swing pin 2055 rearward. The position of fulcrum pin 2053, which is controlled by sensing lever 2050, determines whether pin 2055 will swing far enough rearward to drive link 2058.

Extending forward from sensing lever 2050 (FIG. 59) is a probe 2049, similar probes 2026 (FIG. 57) but slightly shorter. This probe tests for a notch 2027 in the seventeenth order register wheel 448' of the accumulator and also tests the sign indication at pin 561 (see also FIG. 60).

As previously described the bail 558 in FIG. 59 carries the accumulator sign indication from the indicator 536', that responds to the fugitive one transfers, to the left side of the accumulator (right in FIG. 59), and the movement of this bail carries the pin 561 up and down.

As the bail 2024 moves forward to position 2024-c (FIG. 66), the sensing lever 2050 is urged forward (right in FIGS. 59, 60 and 66) by its spring 2028 for driving its probe 2049 forward. If the seventeenth order wheel 448' stands at "0," as in FIG. 66, its notch 2027 will be aligned with the probe. Also, if the sign indicator 536' (FIG. 59) is at positive, pin 561 will lie above and clear of the probe 2049 (FIG. 66). Accordingly, with "0" in the seventeenth order and the sign indicator at positive, probe 2049 is free to move forward and it lets lever 2050 carry the fulcrum pin 2053 forward so that pin 2055 does not drive the link 2058.

On the other hand, if the register wheel 448' of the seventeenth order stands in a non-zero position, such as shown in FIG. 67, the forward motion of the probe 2049 will be obstructed by wheel 448'' so that the sensing lever 2050, and therefore the fulcrum pin 2053, will be stopped in a more rearward position. Therefore, the action of the bail 2024, in rocking the lever 2052 about the pin 2053 as a fulcrum, swings the lower end of the lever 2052 farther rearward and the pin 2055 drives the link 2058 rearward, as indicated in FIG. 67. This motion of link 2058 rocks the latch lever 1940 (clockwise in FIGS. 30, 32 and 48) for holding it clear of the main division lever 1936.

Bail 2024 is held in its extreme forward position by the rise 2045 of the cam 98, for this test of the seventeenth order and the sign of the dividend, during the time that the lobe 1933 (FIG. 32) of the cam 1917 rocks the main division lever 1936 for attempting to set the lever for the division calculation. Accordingly, if the probe 2049 is prevented from moving forward, as in FIG. 67, the latch 1940 is prevented from engaging the lever 1936, which immediately returns to its home position as the cam lobe 1933 moves past it (FIG. 32). Consequently the calculation is prevented from being carried out and the problem is rejected.

If the sign indicator 536' (FIGS. 59 and 60) is at negative, it will hold pin 561 in its lower position, in line with probe 2049, as shown in FIG. 68, where it will similarly block the probe 2049 for causing the problem to be rejected.

During the dividend testing operation, the sensing levers 2025 for the second to sixteenth orders (FIGS. 57 and 63) are also urged by their springs 2028 to follow the motion of bail 2024 as it moves to its forward position 2024-c, but they are stopped by the abutment of their probes 2026 against their register wheels 448'.

(XXIV) DIVISION CALCULATION

As was explained under "DIVISION PROGRAM SHAFT AND MAIN DIVISION LEVER," during the division preparatory cycles, the cam 1934 (FIG. 32) rocks the lever 1936 and shaft 1702 to the position shown in FIG. 48 where it is held by the latch 1940. Free on the shaft 1702 is a blocking lever 2080, biased clockwise in FIGS. 33 and 48 by a spring 2081. Pin 2082 on the lever 2080 stops against an arm of the lever 1936 (see FIG. 45) so that lever 2080 turns with lever 1936. In the home position, shown in FIG. 33, the lower end of lever 2080 overlies an ear 2083 of a lever 2084 journalled at 2085 and biased (counter-clockwise in FIG. 32) by a spring 2086. With the parts set for the division calculation as shown in FIG. 48, blocking lever 2080 is swung clear of the ear 2083 to leave the lever 2084 free to operate. This lever includes an ear 2087 which, when the lever is unblocked, rides a cam 2088 on the rear drive shaft 110. As shown in FIG. 48, cam 2088 is in its full-cycle position, and promptly after the beginning of each cycle during the division calculation, the cam 2088 permits lever 2084 to swing (counter-clockwise in FIG. 48) under the action of its spring 2086.

A lever 2100 (FIG. 32) is fixed to add-substract shaft 696 which extends through to the right side of the machine (FIGS. 11 and 42) for controlling entries into the accumulator, as previously described. In the home position of the mechanism, shown in FIG. 32, the rear edge of the upper arm of lever 2100 is abutted by a pin 2102 on the main division lever 1936. When the division lever 1936 is rocked (counterclockwise in FIG. 32) by the cam 1934 and latched in its set position by the latch 1940, the pin 2102 moves forward and turns lever 2100 (clockwise in FIG. 32) to its "add" position shown in solid lines in FIG. 48. In this position the shaft 696 holds the lever 698 (FIG. 42) and hook plate 604 in position for causing positive entries into the accumulator.

Figure 49:
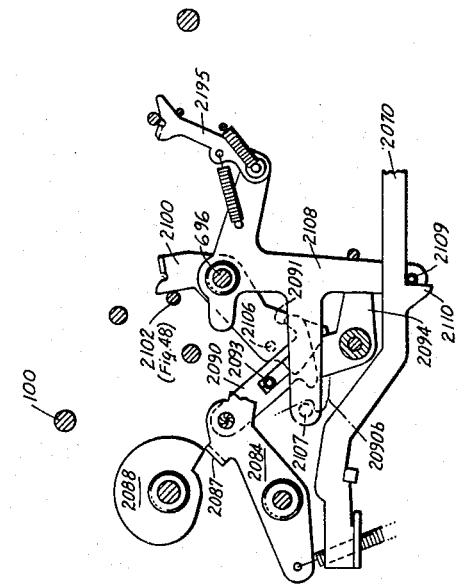

Pinned to the lever 2084 at 2089 is a link 2090 having hook portions 2091 and 2092. As shown in FIGS. 32, 48 and 49, link 2090 is arranged to be reciprocated longitudinally by lever 2084 and in this reciprocation, to be guided by a pin 2093 embraced by a slot in the link 2090. Pin 2093 is carried on the upper arm of the bellcrank 2094 journalled at 2095 and having on a forward extending arm the pin 2096 which lies in the slot 565 (FIG. 59) of the bellcrank 564 controlled by the sign-indicating mechanism of the accumulator, as previously described. Thus the positions of the bellcrank 2094 and of the guide pin 2093 (FIGS. 48 and 49) are controlled by the sign of the number in the accumulator. They stand in the clockwise position for a positive number and in the counter-clockwise position for a negative number.

Thus, for a positive dividend in the accumulator, the guide pin 2093 swings the link 2090 to the right to the position shown in solid lines in FIG. 49 so that the hook 2091 is aligned with a pin 2106 on the add-subtract lever 2100. With the hook 2091 so aligned with the pin 2106, when the cam 2088 runs out from the ear 2087 at the very beginning of the cycle, the spring 2086 swings lever 2084, pulls the hook 2091 against the pin 2106 and rotates the lever 2100 (clockwise in FIG. 49) for setting the add-substract shaft 96 to the position for a negative entry to the accumulator. Thus at the very beginning of the machine cycle, the machine is set for entering the divisor from the selector into the accumulator subtractively during that cycle.

At the beginning of the next cycle, if the sign indicator of the accumulator remains in the positive position, the lever 2084 (FIG. 49) and link 2090 will again set the mechanism of FIG. 42 for a substractive entry. In this way repeated subtractions will occur until the accumulator is taken through "0" and the sign indicator moves to a negative indication.

For a negative number in the accumulator, the bellcrank 2094 in FIG. 49 stands in a position counter-clockwise from the position there shown so that pin 2093 holds the link 2090 rearward in the position 2090–b shown as a partially dotted outline in FIG. 49.

In this position of link 2090, hook 2091 cannot engage pin 2106 and so leaves the add-subtract lever 2100 in the "add" position in which it is held by pin 2102 (FIG. 48) on the main division lever 1936. Also, in this dotted-line position 2090–b (FIG. 49) of the link 2090, the hook 2092 is aligned with a pin 2107 on a bellcrank 2108 which swings free on the shaft 696. A downward extending arm of the bellcrank 2108 carries a pin 2109 which lies in front of a shoulder 2110 of the backspace link 2070 which, as shown in FIG. 40, extends forward and connects to the arm 2071 of the bail 950. Thus, with a negative number in the accumulator at the beginning of a machine cycle, the lever 2084 is released by the cam 2088 so that spring 2086 drives the hook 2092 against the pin 2107 for rocking the bellcrank 2108 (clockwise in FIG. 49) for driving the backspace link 2070 rearward.

Accordingly with the accumulator negative, during the first half of the cycle the machine enters the divisor from the selector into the accumulator additively for restoring the overdraft. Then in the second half of this same machine cycle the backspacing mechanism (FIG. 40) operates, as previously described, for moving the selector carriage one space to the right for effectively dividing the divisor by "10." If it does not leave a "0" remainder, the additive cycle for restoring the overdraft will leave a positive number in the accumulator so that the next machine cycle, the first cycle with the selector in its new position, will be a subtractive cycle and this division calculating routine will continue until terminated in one of several ways, which will be described.

(XXV) DIVISION COUNTER

The division counter generates each digit of the quotient in the memory by counting the number of times that each tens multiple of the divisor in the selector is subtracted from the dividend in the accumulator. As was previously described, the memory sectors 970 (FIGS. 23, 43 and 44) are set to their "0" positions during the division preparatory cycles. Then during the division calculation, a counter pawl indicated generally at 2115 counts each quotient digit into a separate one of the memory sectors 970.

As shown, for example, in FIGS. 16, 17 and 18, counter pawl 2115 includes a formed body portion 2116 and a clasp portion 2117 nesting in the body portion, with both of these parts supported on a bail rod 2118 for free sliding and rotation thereon. A spring 2119 urges the body portion 2116 and clasp 2117 toward each other so that they embrace a guiding bail rod 2120. A slotted ear 2121 (FIGS. 15, 17 and 18) extends up from the body 2116 and embraces a flat nose portion 2122 of the rear carriage frame 1194 (FIG. 41). Thus the movement of the pawl 2115 on the two bail rods 2118 and 2120, laterally of the machine, is controlled by the rear carriage. In the home, extreme right position of the rear carriage, a tooth 2123 on the body 2116 of the pawl is aligned with the rightmost, of lowest order, memory sector 970.

Driving motion of the pawl 2115 is provided by an up-and-down motion of the bail rod 2118 which is carried by a bail 2130 (FIGS. 16 and 17) journalled at 2131. An upward extending arm 2132 of the bail 2130 is connected at 2133 to a slotted link 2134 (see also FIG. 23) which, at its forward end, is connected to the pin 1706 (FIGS. 19 and 15) on the actuator gear sector 360. A spring 2135 (FIG. 15) holds the pin 2133 forward in the slotted link 2134.

Early in each cycle of operation of the machine, the actuator gear sector 360 (FIG. 15) is rotated (counter-clockwise in this figure). This action draws the link 2134 forward, and the spring 2135 urges the bail 2130 to follow. The bail 2130 rocks (counter-clockwise in this figure) about its support 2131 for lowering the bail rod 2118, and with it the counter pawl 2115. Ordinarily the bail 2132 follows the full stroke of link 2134, but since the actuator sector link 2134 operates during every cycle of the machine, even in non-division operations, the slotted connection 2133 and the spring 2135 are included as a precaution against jamming.

The pawl 2115, in its up-and-down motion, is guided by the bail rod 2120 (FIG. 17) carried on a pair of arms 2137 fixed to a shaft 2138 which, in turn, has a lever arm 2139 fixed to it (also FIGS. 23 and 24). A spring 2140 biases the lever 2139 counter-clockwise in these figures for biasing the counter pawl 2115 away from the memory sectors (FIG. 16). During a series of counting strokes for one memory sector 970, the lever 2130 and bail rod 2120 (FIG. 16) are held forward continuously, as will be described. The bail 2120 holds the clasp 2117 and the pressure of spring 2119 holds the tooth 2123 resiliently in engagement with ratchet teeth 2114 in the edge of the sector 970. During the upward motion from one tooth position to the next on the sector 970, the sector is restrained only by the extent 1055 and its spring 1057 (FIG. 43). Accordingly the spring 2119 of the pawl is made sufficiently light that the upward force exerted by the tooth 2123 will not unseat the detent 1058.

For swinging the counter pawl 2115 forward into engagement with the memory sector 970, a pawl 2142 (FIG. 11) is provided on a lever 2143 journalled at 2144. This lever is biased by a spring 2145 (clockwise in FIG. 11) to its home position, shown, where it stops against the rear frame member 2146. A cam 2147 on the rear drive shaft 110 carries a roller 2148 which, at about the mid-point of each machine cycle, engages the lever 2143 and rocks it (counter-clockwise in FIG. 11) for driving a shoulder 2149 on the pawl 2142 against an ear 2150 on the arm 2139.

Additionally, a lever 2154 journalled at 2155 has a hook 2156 arranged to engage the ear 2150 for holding the lever 2137 forward. Lever 2154 carries a pin 2157 which overlies the pawl 2142, and a spring 2158 connected to the pawl urges the pawl and the lever 2154 upward into co-operation with the ear 2150. However, lever 2154 carries a pin 2159 which is normally engaged by an arm 2160 fixed to the same shaft 1702 as the main division lever 1936 (FIG. 32). With the division lever 1936 in its home position, shown for example in FIG. 32, the arm 2160 (FIG. 11) bears against the pin 2159 and holds the lever 2154 and the pawl 2142 in their home positions, shown in FIG. 11, clear of the ear 2150. When the division lever 1936 is set and latched for the division calculation, as shown in FIG. 48, the tip of the arm 2160 (FIG. 11) is moved from the dotted position 2160–a shown in FIG. 69 to the solid line position 2160–b and permits the spring 2158 to raise the pawl 2142 and the latch 2154 into operating position, as shown in FIG. 69.

The pawl 2142 and hook lever 2154 are also arranged to be controlled accordingly to the addition and subtraction operations during the division calculation. To this end the lever 2154 (FIG. 11) has pinned to it at 2162 an interponent link 2163. In the home position of this link, shown in FIG. 15, an ear 2164 at the lower end of the interponent overlies a lever 2165 journalled at 2144 and carrying a roller 2166 that rides the cam 2147 on the rear drive shaft 110. The position of the interponent 2163 with respect to the tip 2167 of the lever 2165 is controlled through a link 2168 which is pinned at 2169 to the lever 698 that controls the addition and subtraction operations (see also FIG. 42).

FIG. 69 shows the position of the counter control mechanism immediately after the main division control lever 1936 (FIG. 32) has been set by the cam 1934 and latched by the latch 1940, as shown in FIG. 48, late in the second division preparatory cycle. The rotation of the shaft 1702 with the lever 1936 rocks the lever 2160 to the solid line position 2160–b shown in FIG. 69 for letting the lever 2154 rock from the position of FIG. 11 to that of FIG. 69 thereby lowering the interponent 2163. At the same time the action of pin 2102 (FIG. 32) on the lever 1936, in setting the lever 2100 and the add-subtract shaft 969 to the add position, rotates the lever 698 (counterclockwise in FIG. 15) for swinging the interponent 2163 forward (to the left in FIG. 15) so that the ear 2164 moves from the dotted line home position 2164–a in FIG. 69 to the solid line "division set" position 2164–b. In both the 2164–a and 2164–b positions in FIG. 69, which correspond to the home and "add" positions, respectively, of the add-subtract control lever 698, the ear 2164 of interponent 2163 lies over the tip 2167 of the lever 2165.

The lever 2165 is lifted by the cam 2147 during the first half of every machine cycle and if, in rising, it engages the ear 2164, it drives the lever 2154 (clockwise in FIG. 69) for disengaging the hook 2156 and the pawl 2142 from the ear 2150 of the counter control lever 2139, thereby permitting the lever to be returned to its home position by its spring 2140 for retracting the counter pawl 2115 from engagement with the memory sector 970. On the other hand, when the add-subtract lever 698 is rotated (counter-clockwise in FIG. 69) to its subtraction position, the ear 2164 is moved to its extreme forward position 2164–c where it is clear of the lever 2165. Accordingly, when the machine is set for subtraction during division, the hook lever 2154 and pawl 2142 are permitted to operate.

(XXVI) DIVISION COUNTING OPERATION

In the latter part of the second division preparatory cycle, the main division lever 1936 (FIG. 32) will be set as previously described, for moving the counter control mechanism from the position of FIG. 11 to the solid line position of FIG. 69. The first cycle of the division calculation will be a subtraction. At the beginning of this cycle, link 2090 (FIG. 49) rocks the lever 2100 and the shaft 696 (clockwise in FIG. 49) for setting the machine for subtraction. This action rotates the lever 698 (counter-clockwise in FIGS. 49 and 70) and moves the ear 2164 of the interponent 2163 to the position 2164–c and clear of the lever 2165 for permitting operation of the hook 2154 and pawl 2142.

As the first half cycle of the division calculation continues, the counter pawl 2115 (FIG. 15) is driven downward by the action of the actuator gear sector 360 and the link 2134, as previously described, but the spring 2140 in FIG. 69 still holds the lever 2139 and the guide rod 2120 (FIG. 17) to the rear for holding the counter pawl 2115 clear of the memory sector 970, as shown, for example, in FIG. 17, so that no count is entered in this first subtraction cycle. At about mid-cycle the roller 2148 on the cam 2147 rocks the lever 2143 (counter-clockwise in FIG. 69) for driving the pawl 2142 to the left and swinging the arm 2139 (clockwise in FIG. 69). This action permits the hook lever 2154 to rise so that its hook 2156 engages the ear 2150 and holds the lever 2139 in its forward position. The setting of the lever 2139 also swings the counter pawl 2115 (FIG. 17) forward so that its tooth 2123 engages the teeth of the memory sector 790 (FIGS. 16 and 43). At this time the tooth 2123 will be in the lower dotted position shown in FIG. 43 and the hook lever 2154 and pawl 2142 will be in the position shown in FIG. 70. At about this same time, early in the second half of the first subtraction cycle, the cam 628 (FIG. 42) returns the shaft 40 and the box cams 436 to their normal positions, thereby permitting the add-subtract lever 698 to return to its add position in which it is stopped by the pin 2102 (FIG. 48) on the main division lever 1936. This action returns the interponent 2163 (FIG. 69) to the position 2164–b, but by this time, the lever 2165 has already been lowered to its normal position so that no interference occurs between the tip 2167 and the ear 2164.

Now, as long as the interponent 2163 (FIG. 69) is not lifted to disengage the hook 2156 from the ear 2150 of the lever 2139, the counter pawl 2115 is held in engagement with the memory sector 970, as shown in FIG. 43, so that one count is entered in the memory sector during the first half of each machine cycle. This situation will continue as long as the add-subtract lever 698 (FIGS. 69 and 70) is set for subtraction at the beginning of each machine cycle so that the ear 2164 is clear of the lever 2165 as it is lifted by the cam 2147 slightly later during the first half of the machine cycle. Accordingly, the pawl 2123 enters one count in the memory sector 970 for each subtraction cycle in a consecutive series, except during the first such cycle.

One of these subtraction cycles will turn the accumulator negative. When it does, there will have been one subtraction cycle too many, but the number of counts entered in the memory sector 970 will be correct. Because the accumulator turns negative, the link 2090 (FIG. 49) is swung to the left in FIG. 49 by the sign indicator, as previously described, so that lever 2084 and link 2090 drive against pin 2107 for setting the backspace operation, as previously described, and for leaving the lever 2100 and the add-subtract shaft 696 in the plus position in which they are stopped by the pin 2102 on the main division lever 1936 (FIG. 48). Accordingly, the machine begins an addition cycle, and because the lever 698 (FIG. 69) is at the plus position, the ear 2164 will be in position 2164–b where it is engaged early in the cycle by the lever 2165. This action lifts the interponent 2163 for swinging the hook lever 2154 (clockwise in FIG. 69) for disengaging the hook 2156 from the ear 2150 of the lever 2139, thereby permitting the spring 2140 to rotate the lever 2139 and carry the bail rod 2120 (FIG. 17) rearward for withdrawing the counter pawl 2115 from its engagement with the memory sector 970. This disengagement occurs before the downward motion of the pawl 2115 (FIG. 15), driven by the actuator gear sector 360, is begun. Consequently, no count is entered in the memory sector 970 during an addition cycle.

It is to be noted that proper counter operation depends on the sequences of certain actions. Thus lever 698 (FIG. 69) is set before lever 2165 rises so that hook 2156 (FIG. 70) will not be disengaged from lever 2139 in any "SUBTRACT" cycle. The cam 2147 lifts the lever 2165 before the actuator gear 360 begins moving (which drives the counter pawl) so that during the add cycle, hook 2156 will be disengaged from the ear 2150 for causing retraction of the counter pawl 2115 before it begins its downstroke. The counter pawl begins its downstroke before pawl 2142 begins its stroke, for preventing a count in the first "SUBTRACT" cycle. And lever 2165 stays up for holding the hook 2154 and pawl 2142 down long enough to prevent lever 2139 from becoming latched forward during an "ADD" cycle. For this purpose it is sufficient that lever 2165 stays up until after lever 2143 begins its stroke so that pawl 2142 will not move the lever 2139 forward.

The lever 2165 need not be lowered before the cam 628 (FIG. 42) returns the box cams 436 to normal, and before lever 698 (FIG. 42) is released by the aligner 792 (FIG. 19) because if ear 2164 (FIG. 69) does stop against the end of lever 2165, the lever will simply slip past the ear and disengage it.

No timing requirements are imposed on the division counter by any of the several methods by which latch 1940 (FIG. 48) may be lifted for releasing the main division lever 1936 for either preventing or ending a division calculation, because all those actions take place during machine cycles in which no count is being entered in the memory, or quotient register.

(XXVII) STOP AFTER FULL LENGTH DIVISION CALCULATION

As the division calculation proceeds, generating one quotient digit, backspacing the selector and rear carriages, generating another quotient digit, backspacing, etc., the operation will generally continue until the quotient digit is being generated in the rightmost order of the memory. Under this condition the rear carriage will be substantially in its home position. The subtraction will be made that turns the accumulator to negative. The next cycle will be an addition cycle for restoring the overdraft and, as explained in connection with FIG. 49, will initiate a backspace operation. This attempted backspace beyond home is utilized for interrupting the division calculation.

Fixed to the shaft 1259 (FIG. 23) is a cam 2175 (FIGS. 33 and 35) on which rides a roller 2176 which is carried by a lever 2177 (FIG. 35) journalled at 2178. The lower end of this lever is aligned with an ear 2180 on the latch 1940 (FIG. 32) which holds the division lever 1936 in its set position (FIG. 48) during the division calculation. As seen in FIG. 41, as the rear carriage 1194 is moved toward the right, it drives the gear 1258 and shaft 1259 clockwise. As shown in FIG. 33 the cam 2175 is in its home position. As the backspace mechanism described in connection with FIG. 40 drives the selector carriage, and with it the rear carriage 1194 (FIG. 41), rightward beyond home position, the cam 2175 (FIG. 33) is driven clockwise beyond the position shown so that a rise 2181 of the cam causes movement of the roller 2176. This action turns the lever 2177 (counter-clockwise in FIG. 35) so that the lower end of the lever moves forward against the ear 2180 for rocking the latch 1940 (clockwise in FIG. 48) for releasing the main division latch 1936 so that it returns to its normal position (FIG. 32) under force of the spring 1937 (FIG. 35) for ending the division calculation, and withdrawing the dog 1943 from the pawl 99.

Since this action is caused by the backspace operation, it occurs shortly before the end of a machine cycle. As the machine comes to the end of that cycle and begins another, one of the teeth of the clutch ratchet 109 will come against the tooth of the pawl 99 and resume the drive of the program shaft 100 for the print-out cycles previously described.

Accordingly, the division calculation is ended after both the generation of the complete quotient digit in the rightmost order of the memory and the restoration of the overdraft, so that both the quotient and the remainder will be correct.

(XXVIII) EARLY STOP WITH DIVISION STOP KEY

It will be recalled that during the entire division operation, which includes the two division preparatory cycles, the division calculation and the two print-out cycles, the division key 34 is locked down by the clutch mechanism. Under this condition the pin 1955 (FIG. 31) on the stem of the division key 34 will occupy a lowered position indicated at 1955–b in FIG. 36. Under this condition the division stop key 35 may be depressed to set the machine for an early stop. As the key 35 moves down, a hook 2185 journalled on a pin 2186 on the division stop key stem 2187, engages the pin 1955 in its lower position. This action latches the division stop key down and holds it there until the division key 34 rises at the end of the division operation. When the division key 34 does rise, the division stop key 35 will rise with it. A cam edge 2188 on the hook 2185 will ride against a pin 2189 for swinging the hook 2185 (clockwise in FIG. 36) for disengaging it from the pin 1955 for returning these two parts to normal.

The pin 2186 on the division stop key stem 2187 also overlies a forward extending arm of a bellcrank 2190, the other arm of which is connected to a link 2191 which is connected at its rear end to a lever 2192, which is journalled at 1941 and biased rearward (counter-clockwise in FIG. 36). The depression of the division stop key 35 draws the link 2191 forward and rotates the lever 2192 (clockwise in FIG. 36) to the position to which it is shown in FIG. 51. In this position a tooth 2193 at the forward edge of the lever 2192 is aligned with a claw 2194 of a pawl 2195 carried by the backspacing bellcrank 2108 (FIG. 49). This setting of the lever 2192 prepares for the termination of the division calculation at the time of the next backspace operation which will occur at the next addition cycle.

The lever 2192 includes a rearward extending arm 2196 which, in the position shown in FIG. 51, is aligned with a bail portion 2197 of the latch 1940. Then upon the occurrence of a cycle in which an addition is to be performed, the backspace bellcrank 2108 (FIG. 49) is set by the lever 2084 and the link 2090, the pawl 2195 is drawn downward and its claw 2194 is driven against the tooth 2193 for rocking the lever 2192 (clockwise in FIG. 51). This action causes arm 2196 to rock the latch 1940 (clockwise in this figure) for releasing the main division lever 1936. Although this action lifts the dog 1943 (FIG. 48) from engagement with the clutch pawl 99 early in the machine cycle, a tooth of the rachet 109 will come into engagement with the pawl 99 only at the end of that cycle. Accordingly at the end of the cycle in which the restoration of the overdraft occurs, the division calculation is terminated and the readout cycles, under control of the division program shaft 100, begin.

(XXIX) EARLY STOP WITH "0" REMAINDER

The present machine takes advantage of the occurrence of the so-called "negative zero" for detecting a "0" remainder.

Negative zero is a "0" print-out, in a total or subtotal operation, with a negative sign. It occurs because of the fugitive one tens-transfer out of the highest into the lowest order of the accumulator.

As was described under "DIVISION CALCULATION" the position of the link 2090 (FIGS. 48 and 49) is controlled by the position of the accumulator sign indicator 536' (FIG. 59) for setting the accumulator entry mechanism (FIG. 42) for addition or subtraction. In the division calculation there will in general be one or more subtraction cycles, then a single addition cycle, then one or more subtraction cycles, and again a single addition cycle, etc. However, in the special situation of a "0" remainder, the sign indicator 536' will stand at negative for two successive cycles for attempting two successive addition cycles. The machine responds to this situation for terminating the division calculation.

If there is to be a "0" remainder, some one of the subtraction cycles will bring all orders of the accumulator to "0." This position of the accumulator wheels corresponds to the so-called "positive zero." This action does not carry the accumulator below "0" and consequently no fugitive-one transfer occurs. Accordingly this cycle leaves the sign indicator 536' in its positive position so that the machine performs another subtraction in the next cycle. This next cycle causes the overdraft, carries the accumulator to a negative value and causes a negative fugitive-one transfer, which moves the sign indicator 536' to negative. Thus both the divisor and the fugitive-one transfer will have been subtracted from the "0" value in the accumulator. Then with the sign indicator 536' at negative, the divisor will be added into the accumulator during the next cycle for restoring the overdraft. The restoration will not include a fugitive-one, so that the accumulator does not return to "positive zero" but rather to "negative zero" condition. With the sign indicator at negative, the control attempts to cause a second addition-and-backspace cycle.

Shown, for example, in FIGS. 33 and 48, a lever 2210 journalled free on the shaft 1941 and biased (counterclockwise in these figures) by a spring 2213, has an ear 2211 which is aligned with an edge 2212 (see also FIG. 46) of the latch 1940 for the division lever 1936 (FIG. 48). The rachet pawl 2195 on the backspacing bellcrank 2108 drives against two rachet teeth 2215 at the forward side (right in FIG. 33) of the lever 2210 for driving it (clockwise in this figure). Pinned at 2216 to the lever 2210 is a latch 2217 having a hook 2218 which, during the division calculation, cooperates with an ear 2219 on the main division control lever 1936. (Note particularly FIG. 48 in which these parts are shown in the position in which they are "set" for the division calculation.) An ear 2220 on the add-subtract lever 2100 lies immediately below the latch 2217 for lifting the hook 2218 free of the ear 2219 if the lever 2100 should be next set to "subtract."

It will be recalled that when the sign indicator stands at negative, indicating that the overdraft has been made, the link 2090 (for example FIG. 49) is swung to its position 2090–b so that as the cycle begins, the lever 2084, through the link 2090, rocks the backspace bellcrank 2108 (clockwise in FIG. 49). This action leaves the lever 2100 in the positive position where it is stopped by the pin 2102 (FIG. 48) so that the divisor is added to the accumulator, and link 2070 sets the backspace action. This motion of bellcrank 2108 also causes the pawl 2195 to drive the lever 2210 from the position shown in FIG. 48 to the position shown in FIG. 50 in which it is held by the engagement of the latch 2217 with the ear 2219 on the division lever 1936.

If this action causes the accumulator sign indicator to return to positive, as it usually does, then in the next cycle, the lever 2100 will be rotated (clockwise in FIG. 49) to the subtraction position and will drive the ear 2220 against the latch 2217 for releasing it from the ear 2219 for permitting the lever 2210 to return, under force of the spring 2213, to its normal position, shown in FIG. 48.

Figure 50:
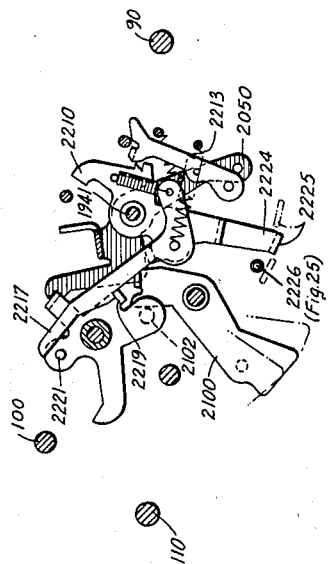

However, if, after the restoration cycle with the parts standing at the position of FIG. 50, the accumulator sign indicator 536′ still stands at negative, thereby indicating a "negative zero," the link 2090 (FIG. 49) will remain in its position 2090–b so that as the next cycle begins, the backspace bellcrank 2108 is rocked (clockwise in FIG. 49). This action causes the pawl 2195 to engage the upper tooth 2215 of the lever 2210 for driving it farther (clockwise from the position shown in FIG. 50) for driving the ear 2211 against the hook 1940 for releasing the main division lever 1936. Although this action immediately lifts the dog 1943 (FIG. 48) for letting clutch pawl 99 re-engage the ratchet 109, the program shaft 100 will not begin operation until the beginning of the next cycle, because of the spacing of the teeth on the ratchet 109.

As lever 1936 rotates (clockwise from the position of FIG. 50 to its home position shown in FIG. 33), ear 2219 is lowered and, in addition, a pin 2221 lifts the rear end (left in these figures) of latch 2217 to free the latch for permitting lever 2210 to return home.

The mechanism of FIG. 42 for engaging the actuator with the accumulator (driven by spring 602 under control of cams 616 and 628) begins operation early in the cycle. The operation of lever 2084 (FIG. 49) by its spring 2086 begins even earlier, but at the operating speed of the machine, the time taken for the setting of the backspace bellcrank 2108 (clockwise in FIG. 49) and thereby lifting latch 1940, and for the return of the division lever 1936 and add-subtract lever 2100 to home, does not permit hook plate 604 (controlled by shaft 696 and lever 694, FIG. 42) to intercept lever 600. It is, however, necessary that a second addition be prevented. Accordingly, the lever 2210 (FIGS. 48 and 50) includes a tail portion 2224 having an ear 2225 arranged to block a pin 2226 on the box cam 436 (FIGS. 25 and 42). In FIG. 50 tail portion 2224 is shown in the position it occupies at the end of the restoration cycle, that is, the first addition-and-backspace cycle. As the lever 2210 is swung clockwise from this position at the beginning of the second addition-and-backspace cycle, ear 2225 moves under the pin 2226 for blocking the box cams 436. Since these box cams are moved down by spring 602 (FIG. 42), a simple blocking of the box cam 436 is sufficient to prevent their operation and thereby to prevent their engagement of the gears of the rear pendant 420 (FIG. 56) with the drive gears 444 of the accumulator. Thus no further entry is made into the accumulator, which is therefore left at "negative zero."

Cam 2088 drives lever 2084 (clockwise in FIG. 49), for returning bellcrank 2108 and pawl 2195 to home before the cams 616 and 628 (FIG. 42) attempt to lift the box cams 436 and 438. Therefore, the ear 2225 (FIG. 50) lies at an angle to its path of motion to make it cam against the pin 2226. Since the action of spring 602 (FIG. 42), in urging the box cams 436 and 438 downward, holds the pin 2226 (FIG. 50) down against the inclined ear 2225, it also holds the ear 2225 in its blocking position. Then as soon as cams 616 and 628 (FIG. 42) begin to lift box cam 436, pin 2226 releases lever 2210 so that it is returned to home by its spring 2213.

(XXX) DIVISION PRINT-OUT CYCLES

As previously described, the second half revolution of the division program shaft 100, for controlling the two printout cycles, is initiated by lifting the latch 1940 (FIGS. 32 and 48) for releasing the main division lever 1936, and for thereby either preventing the division calculation because the problem is unacceptable, or for terminating the division calculation.

During the first of these two print-out cycles, the second lobe 1913 (FIG. 30) of the cam 1910 engages the arm 1912 for rocking the lever 1903 (FIG. 28) for causing a print-out of the number in the memory, as was described under the heading "MEMORY UNIT," subheading "Readout Cycle."

At the start of the second print-out cycle, lobe 1916 (FIG. 32) of the cam 1917 comes under the roller 1979, as previously described under the heading "DIVISION KEY," for rotating the lever 1977 (counter-clockwise in FIG. 32) to its overstroke position. As was described, this action drives the division bars 1972 and 1962 (FIG. 35) rearward and releases the lever 1957 (FIG. 34) which, in turn, through bellcrank 1988, restores the repeat controls to normal. This rearward motion of bar 1972 also, through pin 1980 (FIG. 35) and bellcrank 1981 (FIG. 36), permits lever 1267′ to return to home for disengaging the carriage clutch 1264, 1265 (FIG. 38). If, at this time, the rear carriage 1194 (FIG. 41) is home, it will be held there by the latch 1271 (FIG. 37). But if it is away from home, as it may be after a rejection of a problem after a "0" remainder, or after a stop by the "DIV STOP" key, then, when the clutch is disengaged, the rear carriage will run left under force of its spring 1253 (FIGS. 24 and 41) until it stops against restoring lever 1282′.

When the lever 1977 (FIG. 32) is thus rocked to its overstroke position, a projection 2230 at its lower end lifts a tongue 2231 of a level 2232 on the total-subtotal shaft 560, which extends through to the right side of the machine (for example, FIG. 42). This lifting of the lever 2232 rotates the shaft 560 (counter-clockwise as seen in FIG. 42) for setting the machine for a total operation. Accordingly, during this last cycle, the remainder is printed out of the accumulator. At the same time the selector is cleared by the clearing bail 386 (FIGS. 6 and 21), the selector is driven home by the mechanism of FIGS. 40 and 41, and the rear carriage, if not home, is driven there by lever 1282′ (FIG. 41). At the end of the cycle the machine stops.

(XXXI) PRINTING, RIBBON AND PAPER

The printing mechanism of the present machine is of a well-known type, similar to that shown in Patent No. 2,779,267. A number print wheel 1610 (FIGS. 21 and 25) is provided for each numerical order of the actuator and is geared to its respective actuator sector 340. The print wheel 1698 (FIG. 20) for the right side symbols is located to the right of the number print wheels, and is similarly geared to an actuator sector, as has been described. A print wheel 1738 (FIG. 19) for the left side symbols is at the extreme right of the print wheel cluster and has a separate actuator mechanism, to be described. Each such print wheel is carried on a separate print wheel carrier 1611 (FIG. 25) journalled on a shaft 1612 and biased by a spring 1613 to drive its wheel 1610 against a printing roller 1614. A print ball rod 1617 underlies the tails 1605 of all of the print wheel carriers 1611 for controlling them. The rod 1617 is carried by a pair of bail arms 1616 and 1618 (FIGS. 19 and 28). The arms are pinned to shaft 1612, and a spring 1615 (FIG. 28), attached to arm 1618, biases these arms and the bail 1617 down. Arm 1618 carries a roller 1619 overlying an arm 1620 of a bell crank 1621 (FIG. 32) having a roller 1622 riding a print control cam 1623. When the roller 1622 is on the high part of cam 1623, bellcrank 1621 supports the arm 1618 which, in turn, supports the bail rod 1617 for holding all the print wheels 1610 out of print position. A single deep narrow notch with an abrupt drop-off in the cam 1623 lets the print wheels be driven, under force of their springs 1613, for printing at mid-cycle.

Bail arm 1618 (FIG. 28) has a forward extension with an ear 1628 arranged to be intercepted by a hook 1629 (FIG. 31) on a lever 1627 journalled on the shaft 1624. A spring 1625 urges the lever 1627 counter-clockwise in FIG. 28 and an ear 1626 on lever 1627 stops against a lever 1630 which carries a roller 1631 that rides a gear-aligning cam 1632. Fastened to the lever 1630 at 1633 is a bail 1634, also journalled on the shaft 1624. As shown in FIG. 21, this bail 1634 is arranged to engage the actuator drive gears previously mentioned for aligning the print wheels 1610 just before the printing operation. If the bail 1634 fails to enter the intertooth spaces of the actuator drive gears for aligning the gears, the arm 1630 (FIG. 31) will be unable to swing (clockwise in this figure) for unblocking the ear 1628.

A two-color inked ribbon, not shown, is threaded through guides 1650 of two lifters 1651 and 1652 (FIGS. 36 and 11). A ribbon-feed mechanism, not shown but of well-known construction, includes a lever 1636 (FIG. 36) driven by a bellcrank 1637 rocking on the shaft 356 and connected by a screw 1745 to the actuator drive lever 372 (FIG. 28). The right ribbon lifter 1652 (FIG. 11) is pinned at 1653 to a lever arm 1654 on a shaft 1655 which extends through the machine (FIG. 32). The left lifter 1651 (FIG. 36) is pinned at 1656 to a lever arm 1657 (FIG. 32) which is also fastened to the shaft 1655. A spring 1658 (FIG. 36) is connected to the pin 1656 for lifting the ribbon. Each lifter 1651 and 1652 has, at its upper end, an angular slot 1648 (FIG. 11) embracing a guide pin 1649. In its lowermost position, the ribbon 1650 is below the last printed line, and is also clear of the print roller 1614. When the ribbon is partially lifted, the upper halves of slots 1648 guide the ribbon toward the print roller 1614, and also align the upper half of the ribbon with the print wheels for printing black. When the ribbon is lifted to its uppermost position, the last half of the motion is guided by the lower halves of slots 1648 for maintaining the ribbon the correct distance from the roller 1614. With the ribbon in its uppermost position, its lower half is aligned with the print wheels for printing red.

The lever 1657 (FIG. 32) has a lost motion connection with a second lever 1662 which is free on the shaft 1655. This lost motion connection includes a spring 1663 and a pin 1664. The lever 1662 carries a roller 1665 which, as shown in FIG. 28, rides a cam surface 1666 of the actuator gear 376. It will be recalled that during each machine cycle the gear 376 rocks, first, clockwise in FIG. 28 and then counter-clockwise. Thus, the gear 376 normally holds the ribbon in its lowermost position, but during each machine cycle, releases it to be lifted by the spring 1658 (FIG. 36). Stops are provided for permitting only partial lifting of the ribbon when black printing is desired.

The machine of the present invention also employs a paper feed mechanism of well-known construction. In FIG. 6 a bellcrank 1670, journalled at 1671, has a roller 1672 riding a cam 1673 on the main drive shaft 90 (see also FIG. 3). The bellcrank 1670 is biased clockwise in FIG. 6 against the cam 1673 by a spring 1674. A pin 1675 on bellcrank 1670 is connected to a link 1676 which, in turn is connected to another bellcrank 1677 fixed to a shaft 1678 and carrying a drive pawl 1679 which drives a ratchet wheel 1680 connected to the print roller 1614. The motion which the cam 1673 is capable of imparting to the drive pawl 1679 is sufficient for rotating the ratchet wheel 1680 for "double spacing" the printed numbers on the paper tape. To provide single spacing, a bail arm 1685 overlies a pin 1684 on the link 1676 for limiting its motion. This bail arm is part of a bail 1686 which, as shown in FIG. 10, is biased (counter-clockwise) to a single spacing position by a spring 1687, and arranged to be set to the double spacing position by a manual lever 1688.

The lever 1657 (FIG. 32) has an arm 1659, the upper end of which, in its home position, blocks the print bail 1617. Accordingly, the lever 1657 may be blocked for preventing the lifting of the ribbon, and also the operation of the print wheels. For clear keyboard and backspace operations, a lever, not shown, blocks a pin 1650 (FIG. 32) as described in the copending applications, Serial Nos. 117,096 and 138,645 previously mentioned. During the division operation, an arm 1831 of lever 1657 is blocked, as will be described.

The bail 1686 (FIG. 10) also includes an arm 1689 which overlies the pin 722 on the lever 724. The lever 724 is rocked (clockwise in FIG. 10) by a pin 754 on the bellcrank 752 during each total and subtotal operation. This action lifts the pin 722 for lifting the arm 1689 for moving the bail arm 1685 (FIG. 6) to the double space position so that a blank follows each printed total and subtotal.

It will be recalled that pin 722 (FIG. 10) is also lifted during a memory-output operation, for which a single space is wanted. A short lever 1690 (FIG. 10) having an ear 1699, is fixed to the shaft 1131 which supports the lever 1130 (FIG. 28) and which is rotated thereby during memory readout operations, as was described under the heading "MEMORY UNIT," subheading "Clearing Cycle." Lever 1690, when so rotated, blocks a lever 1692 on the shaft 1678 to which the paper feed bellcrank 1677 (FIG. 6) is fixed. Accordingly, during a memory-output operation, ear 1691 (FIG. 10) limits the motion of feed pawl 1679 (FIG. 6) to advance the paper only one space. For the nonprinting clear keyboard and backspace operations, the paper feed is blocked by lever 1681 (FIG. 6) on the ribbon control shaft 1655 (see also FIG. 32), which is blocked during those operations. Lever 1681 (FIG. 6), when home, blocks pin 1675 on the paper feed bell crank 1670, but swings clear during printing operations.

(XXXII) DIVISION SYMBOL

The print wheel 1738 (FIG. 19), at the extreme right of the print wheel cluster, carries the symbols for the left side control keys. It is the only print wheel for which no actuator sector is included in the main actuator. The drive gear 1739 for this print wheel is fixed to a gear sector 1740 which, in turn, is driven by a sector 1741 on a shaft 1742. The shaft extends through to the left side of the machine where it carries a gear sector 1743 (FIG. 28) in mesh with gear teeth on an arcuate lever 1744 which rocks free on the shaft 356. The screw 1745 on the forward extension of the actuator gear sector 372 overlies one arm of the lever 1744 for rocking it (clockwise in this view) to its home position shown, as the actuator gear sector 372 rocks to its home position. The screw 1745 moves up during the first part of each machine cycle for freeing the lever 1744 for rotation (counter-clockwise in FIG. 28) for setting the symbol print wheel 1738 (FIG. 19). A stop lever 1746' (FIG. 31) has an ear 1747 that is arranged to be positioned over various steps 1751, 1752, 1753 and 1754 on the lever 1744 for limiting its motion and thereby determining which symbol will be printed. A spring 1749 connected between the levers 1744 and 1746' (FIGS. 28 and 31) urges both of them counter-clockwise in these figures. Thus during the second half of each machine cycle, as the actuator drive lever 372 returns to its home position, the screw 1745 drives the symbol setting lever 1744 clockwise to its home position, as shown in FIG. 28, where it is held by the stop lever 1746' (FIG. 31) if that lever is free to be swung to its home position by spring 1749. In this position the lever 1744 sets the symbol wheel 1738 (FIG. 19) for printing an "X" to indicate the number in the multiplier storage, or memory unit, as described in the copending applications, Serial Nos. 117,096 and 138,645 previously referred to. As is also described in those copending applications, the ear 1747 (FIG. 31) of the stop lever 1746' is arranged to engage the steps 1753 and 1754 on the lever 1744 for setting the symbol print wheel 1738 (FIG. 19) for printing negative multiplication (—=) and multiplication (=) symbols, respectively.

As previously described herein under the heading "DIVISION KEY" the lever 1746' (FIG. 31) includes the arm 1956 which underlies the pin 1955 on the stem of the division key 34. The depression of the division key aligns the ear 1747 of the lever 1746' with a step 1752 of the symbol control lever 1744 for controlling the lever 1744 and the symbol print wheel 1738 (FIG. 19) for printing the division symbol (+). Inasmuch as division key 34 (FIG. 31) is locked down during the entire division operation, the print wheel is set to position for printing the division symbol during each cycle of the division operation.

The print wheel 1738 is, of course, blocked whenever all printing is blocked. In addition it is arranged to be blocked separately. Its print wheel carriers 1779 (FIG. 19) is similar to carriers 1611 for the number print wheels, and carries a pin 1780 which lies in a slot 1781 in a bellcrank 1782 which is journalled at 1783. The bellcrank 1782 includes an ear 1784 which is arranged to abut a pin 1785 on an arm 1786 on a shaft 1800. Pin 1780 and slot 1781 connect the bellcrank 1782 to the carrier 1779 of the print wheel 1738 so that they rock together. Pin 1785 normally blocks bellcrank 1782 to prevent wheel 1738 from printing, but at times is swung clear of ear 1784 to permit such printing.

(XXXIII) CONTROL OF PRINTING, SYMBOLS AND SPEED DURING DIVISION

Shaft 1800 (FIG. 19) extends through the machine and at its left end (FIG. 32) is fixed to a lever 1801 which is biased (counter-clockwise in this figure) by a spring 1802. Lever 1801 is stopped, in its home position shown, by a latch (not shown) which is released during multiplication operations. The control of the lever 1801 during multiplication, and also during memory input and output operations controlled by keys 48 and 50 (FIG. 1), is described in the copending applications, Serial Nos. 117,096 and 138,645, previously referred to.

During division operations the lever 1801 is controlled by a lever 2240 (FIG. 30) which is journalled on the shaft 1702 and biased, counter-clockwise in this figure, by a spring 2241 against a cam 2242 on the division program shaft 100. A pin 1811 on the lever 1801 (FIG. 30) lies in the path of the upper end of the lever 2240. In the home position shown in FIG. 30, a lobe 2243 of the cam 2242 holds the lever 2240 spaced forward (right in FIG. 30) from the pin 1811 to permit forward movement of the pin 1811 during multiplication operations.

As the division program shaft 100 begins rotating at the beginning of the division operation, the cam lobe 2243 quickly runs out from under a roller 2239 and drops it to a dwell 2244 so that spring 2241 pulls the lever 2240 against the pin 1811 for rotating the lever 1801 and the shaft 1800 clockwise in FIG. 32 sufficiently for swinging the lever 1786 (FIG. 19) clear of the gear 1784 on the bellcrank 1782 for unblocking the print wheel 1738 so that the division symbol will print. Accordingly, the division symbol (+) is printed with the divisor from the selector during the first division preparatory cycle. At the beginning of the second division preparatory cycle, the dwell 2244 (FIG. 30) runs out from under the roller 2239 and lets it drop to a lower dwell 2245. This action permits the lever 2240 to swing farther rearward (counterclockwise in FIG. 30) for rotating the lever 1801 (FIG. 32) an additional distance clockwise. This motion brings a shoulder 2246 of the lever 1801 under an ear 1830 of the arm 1831 of the print blocking lever 1657. Accordingly during the second division preparatory cycle, shoulder 2246 prevents lever 1657 from following the actuator cam 376 (FIG. 28) and thereby blocks all printing.

At the end of the second division preparatory cycle, a depression 2247 of the cam 2242 (FIG. 30) comes under the roller 2239 and permits still further rotation (counter-clockwise in this figure) for driving the lever 1801 (FIG. 32) still farther clockwise. This action swings a lever 1812 (FIG. 11) on shaft 1800 for moving a roller 1813 against a speed-control bellcrank 1815. A pin 1817 on this bellcrank is driven down against the lever 1818 of the high speed switch 62 (FIGS. 10 and 7) for causing the machine to run at high speed. It continues to run at high speed all through the division calculation.

It will be recalled that the division program shaft resumes operation at the end of the division calculation. As this resumed operation begins, a dwell 2248 (FIG. 30), at the same radius as dwell 2244, runs under the roller 2239 for swinging the lever 2240 forward (clockwise in FIG. 30) so that shaft 1800 rotates (clockwise in FIG. 11) for releasing the high-speed bellcrank 1815 and permitting the machine to resume low-speed operation. In this position of the levers 2240 and 1801, shoulder 2246 (FIG. 32) of the lever 1801 is clear of the ear 1830 and permits printing to take place. In addition, the pin 1785 (FIG. 19) of the lever 1786 remains clear of the ear 1784 of the bellcrank 1782 so that the print wheel 1738 is unlocked to permit the division symbol to be printed. Dwell 2248 remains under roller 2239 until near the end of the last cycle so that printing, and also printing of the division symbol, is permitted for both the quotient and the remainder which are printed out during these last two program cycles. At the end of the last program cycle, lobe 2243 (FIG. 30) of the cam 2242 again comes under the roller 2239, rocks the lever 2240 (clockwise in FIG. 30) clear of the pin 1811 and permits the lever 1801 to return to its home position in which the lever 1786 (FIG. 19) again blocks the printing action of the print wheel 1738.

(XXXIV) MULTIPLICATION

The construction and operation of the machine of the present invention for performing multiplication is disclosed in the copending applications, Serial Nos. 117,096 and 138,645, previously referred to. As has been pointed out herein, and as will be apparent from the disclosures of those copending applications and of the present application, much of the mechanism of the machine is used in both division and multiplication. Furthermore, some parts and mechanisms concerned particularly with multiplication appear in the present drawings. These include some of the cams on the rear drive shaft 110 (FIG. 4), a print-blocking lever 1766 for the right side symbol print wheel 1698 (FIG. 20), multiplier sensors 1150, 1160 and 1165 (FIGS. 21, 22, 23, 25 and 44) and associated mechansm 1216, 1233 and 1245 (FIGS. 23 and 24), a compact cluster 1305 (FIGS. 23, 37 and 39) of the multiplication controls, a slide 106′ (FIGS. 24 and 44) for an over-capacity test, a memory locking bail 1063 (FIG. 43) and multiplication key mechanism (FIG. 37).

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

We claim:
1. In a printing calculator for performing division having:
   (1) division calculation means,
   (2) cam means operable through a division preparatory sequence,
   (3) third means responsive to said cam means for stopping said cam means at the end of said preparatory sequence and causing operation of said division calculation means, and
   (4) fourth means responsive to said division calculation means for stopping said division calculation means and causing operation of said cam means through a print-out sequence;
   the improvement wherein
   (5) said third means includes a first member set by said cam means to a division calculation position, and wherein,
   (6) said fourth means includes a second member actuated by said division calculation means for returning said first member to its home position.

2. The combination of claim 1 wherein there is included a register for a dividend and means for testing a number therein, wherein said third means is actuated by said testing means.

3. The combination of claim 2 wherein said division calculation means includes digitation control means and digitation counting means set to an operative condition by said first member.

4. In a calculating machine for dividing having:
   (1) dividing means,
   (2) a movable member movable to an operated position during a division operation and returnable to a home position at the end of said division operation,
   (3) and division stop means including a manual control element therefor and including also means coacting with said dividing means to respond automatically to an over-draft-restoration cycle for terminating the division calculation;
the improvement which comprises:
   (4) means operable upon actuation of said manual control element for connecting said manual control element to said movable member only in its operated position for holding said manual control element in actuated position,
   (5) said movable member being operable upon return to said home position for releasing said manual control element,
whereby said manual control element of said division stop means will be retained in actuated position only while a division operation is in progress and will be released from said actuated position at the end of said division operation.

References Cited by the Examiner
UNITED STATES PATENTS

| | | | |
|---|---|---|---|
| 2,695,134 | 11/1954 | Sundstrand | 235—60.25 |
| 3,128,945 | 4/1964 | Malavazos et al. | 235—63 |

RICHARD B. WILKINSON, *Primary Examiner.*

S. J. TOMSKY, *Examiner.*